US012509717B2

(12) United States Patent
Bava

(10) Patent No.: US 12,509,717 B2
(45) Date of Patent: Dec. 30, 2025

(54) METHODS AND COMPOSITIONS FOR MULTIMODAL IN SITU ANALYSIS

(71) Applicant: 10x Genomics, Inc., Pleasanton, CA (US)

(72) Inventor: Felice Alessio Bava, Rome (IT)

(73) Assignee: 10X GENOMICS, INC., Pleasanton, CA (US)

( * ) Notice: Subject to any disclaimer, the term of this patent is extended or adjusted under 35 U.S.C. 154(b) by 588 days.

(21) Appl. No.: 17/547,925

(22) Filed: Dec. 10, 2021

(65) Prior Publication Data

US 2022/0186300 A1 Jun. 16, 2022

Related U.S. Application Data

(60) Provisional application No. 63/124,619, filed on Dec. 11, 2020.

(51) Int. Cl.
*C12Q 1/6841* (2018.01)
*C12Q 1/6886* (2018.01)

(52) U.S. Cl.
CPC ......... *C12Q 1/6841* (2013.01); *C12Q 1/6886* (2013.01); *C12Q 2600/112* (2013.01); *C12Q 2600/158* (2013.01)

(58) Field of Classification Search
CPC ................ C12Q 1/6841; C12Q 1/6886; C12Q 2600/112; C12Q 2600/158; C12Q 1/6816; C12Q 2543/10; C12Q 2565/601
See application file for complete search history.

(56) References Cited

U.S. PATENT DOCUMENTS

| | | | |
|---|---|---|---|
| 4,683,195 A | 7/1987 | Mullis et al. |
| 4,683,202 A | 7/1987 | Mullis |
| 4,800,159 A | 1/1989 | Mullis et al. |
| 4,965,188 A | 10/1990 | Mullis et al. |
| 5,512,462 A | 4/1996 | Cheng |
| 5,599,675 A | 2/1997 | Brenner |
| 5,635,352 A | 6/1997 | Urdea et al. |
| 5,695,940 A | 12/1997 | Drmanac et al. |
| 5,750,341 A | 5/1998 | Macevicz |
| 6,054,274 A | 4/2000 | Sampson et al. |
| 6,172,218 B1 | 1/2001 | Brenner |
| 6,265,552 B1 | 7/2001 | Schatz |
| 6,291,187 B1 | 9/2001 | Kingsmore et al. |
| 6,306,597 B1 | 10/2001 | Macevicz |
| 6,323,009 B1 | 11/2001 | Lasken et al. |
| 6,344,329 B1 | 2/2002 | Lizardi et al. |
| 6,368,801 B1 | 4/2002 | Faruqi |
| 6,391,937 B1 | 5/2002 | Beuhler et al. |
| 6,534,266 B1 | 3/2003 | Singer |
| 6,969,488 B2 | 11/2005 | Bridgham et al. |
| 7,057,026 B2 | 6/2006 | Barnes et al. |
| 7,255,994 B2 | 8/2007 | Lao |
| 7,264,929 B2 | 9/2007 | Rothberg et al. |
| 7,345,159 B2 | 3/2008 | Ju et al. |
| 7,473,767 B2 | 1/2009 | Dimitrov |
| 7,534,991 B2 | 5/2009 | Miller et al. |
| 7,544,794 B1 | 6/2009 | Benner |
| 7,555,155 B2 | 6/2009 | Levenson et al. |
| 7,566,537 B2 | 7/2009 | Balasubramanian et al. |
| 7,655,898 B2 | 2/2010 | Miller |
| 7,709,198 B2 | 5/2010 | Luo et al. |
| 7,893,227 B2 | 2/2011 | Wu et al. |
| 7,910,304 B2 | 3/2011 | Drmanac |
| 7,941,279 B2 | 5/2011 | Hwang et al. |
| 7,989,166 B2 | 8/2011 | Koch et al. |
| 8,124,751 B2 | 2/2012 | Pierce et al. |
| 8,199,999 B2 | 6/2012 | Hoyt et al. |
| 8,268,554 B2 | 9/2012 | Schallmeiner |
| 8,330,087 B2 | 12/2012 | Domenicali |
| 8,415,102 B2 | 4/2013 | Geiss et al. |
| 8,431,691 B2 | 4/2013 | McKernan et al. |
| 8,460,865 B2 | 6/2013 | Chee et al. |
| 8,462,981 B2 | 6/2013 | Determan et al. |
| 8,481,258 B2 | 7/2013 | Church et al. |
| 8,519,115 B2 | 8/2013 | Webster et al. |
| 8,551,710 B2 | 10/2013 | Bernitz et al. |
| 8,604,182 B2 | 12/2013 | Luo et al. |
| 8,632,975 B2 | 1/2014 | Vander Horn et al. |
| 8,658,361 B2 | 2/2014 | Wu et al. |
| 8,771,950 B2 | 7/2014 | Church et al. |
| 8,951,726 B2 | 2/2015 | Luo et al. |
| 8,986,926 B2 | 3/2015 | Ferree et al. |
| 9,201,063 B2 | 12/2015 | Sood et al. |
| 9,273,349 B2 | 3/2016 | Nguyen et al. |
| 9,371,563 B2 | 6/2016 | Geiss et al. |
| 9,371,598 B2 | 6/2016 | Chee |
| 9,376,717 B2 | 6/2016 | Gao et al. |
| 9,512,422 B2 | 12/2016 | Barnard |
| 9,541,504 B2 | 1/2017 | Hoyt |
| 9,551,032 B2 | 1/2017 | Landegren et al. |

(Continued)

FOREIGN PATENT DOCUMENTS

| | | |
|---|---|---|
| WO | WO 2016/138496 | 9/2016 |
| WO | WO 2017/079406 | 5/2017 |

(Continued)

OTHER PUBLICATIONS

Alon et al. "Algorithmic construction of sets for k-restrictions", ACM Trans. Algorithms (ACM) (2006) 2(2): 153-177.

(Continued)

*Primary Examiner* — Juliet C Switzer
*Assistant Examiner* — Brian Ellis Young
(74) *Attorney, Agent, or Firm* — WILSON SONSINI GOODRICH & ROSATI

(57) ABSTRACT

The present disclosure in some aspects relates to methods for assessing multi-modal in situ transcriptomics by combining microscopy and sequencing technologies and methods. In some aspects, the methods provided herein involve analyzing one or more analyte panels in a sample using a first imaging modality or set of imaging modalities. Based on said analysis, a different analyte panel and/or one or more different imaging modalities can be selected for subsequent analysis.

21 Claims, 8 Drawing Sheets

(56) References Cited

U.S. PATENT DOCUMENTS

| | | |
|---|---|---|
| 9,593,365 B2 | 3/2017 | Frisen et al. |
| 9,624,538 B2 | 4/2017 | Church et al. |
| 9,650,406 B2 | 5/2017 | Zhou et al. |
| 9,714,446 B2 | 7/2017 | Webster et al. |
| 9,714,937 B2 | 7/2017 | Dunaway |
| 9,727,810 B2 | 8/2017 | Fodor et al. |
| 9,778,155 B2 | 10/2017 | Gradinaru et al. |
| 9,783,841 B2 | 10/2017 | Nolan et al. |
| 9,868,979 B2 | 1/2018 | Chee et al. |
| 9,879,313 B2 | 1/2018 | Chee et al. |
| 9,889,422 B2 | 2/2018 | Smith et al. |
| 9,909,167 B2 | 3/2018 | Samusik et al. |
| 9,970,055 B2 | 5/2018 | Fedurco et al. |
| 10,002,316 B2 | 6/2018 | Fodor et al. |
| 10,030,261 B2 | 7/2018 | Frisen et al. |
| 10,032,064 B2 | 7/2018 | Hoyt |
| 10,041,949 B2 | 8/2018 | Bendall et al. |
| 10,059,990 B2 | 8/2018 | Boyden et al. |
| 10,126,242 B2 | 11/2018 | Miller et al. |
| 10,138,509 B2 | 11/2018 | Church et al. |
| 10,179,932 B2 | 1/2019 | Church et al. |
| 10,227,639 B2 | 3/2019 | Levner et al. |
| 10,246,700 B2 | 4/2019 | Dunaway et al. |
| 10,266,888 B2 | 4/2019 | Daugharthy et al. |
| 10,267,808 B2 | 4/2019 | Cai |
| 10,308,982 B2 | 6/2019 | Chee |
| 10,309,879 B2 | 6/2019 | Chen et al. |
| 10,317,321 B2 | 6/2019 | Tillberg et al. |
| 10,364,457 B2 | 7/2019 | Wassie et al. |
| 10,370,698 B2 | 8/2019 | Nolan et al. |
| 10,415,080 B2 | 9/2019 | Dunaway et al. |
| 10,457,980 B2 | 10/2019 | Cai et al. |
| 10,465,235 B2 | 11/2019 | Gullberg et al. |
| 10,494,662 B2 | 12/2019 | Church et al. |
| 10,495,554 B2 | 12/2019 | Deisseroth et al. |
| 10,501,777 B2 | 12/2019 | Beechem et al. |
| 10,501,791 B2 | 12/2019 | Church et al. |
| 10,510,435 B2 | 12/2019 | Cai et al. |
| 10,526,649 B2 | 1/2020 | Chen et al. |
| 10,545,075 B2 | 1/2020 | Deisseroth et al. |
| 10,550,429 B2 | 2/2020 | Harada et al. |
| 10,580,128 B2 | 3/2020 | Miller |
| 10,640,816 B2 | 5/2020 | Beechem et al. |
| 10,640,826 B2 | 5/2020 | Church et al. |
| 10,669,569 B2 | 6/2020 | Gullberg et al. |
| 10,710,046 B2 | 7/2020 | Liu et al. |
| 10,724,078 B2 | 7/2020 | Van Driel et al. |
| 10,746,981 B2 | 8/2020 | Tomer et al. |
| 10,774,372 B2 | 9/2020 | Chee et al. |
| 10,774,374 B2 | 9/2020 | Frisén et al. |
| 10,794,802 B2 | 10/2020 | Gradinaru et al. |
| 10,802,262 B2 | 10/2020 | Tomer et al. |
| 10,815,519 B2 | 10/2020 | Husain et al. |
| 10,829,814 B2 | 11/2020 | Fan et al. |
| 10,844,426 B2 | 11/2020 | Daugharthy et al. |
| 10,858,698 B2 | 12/2020 | Church et al. |
| 10,872,679 B2 | 12/2020 | Cai et al. |
| 10,953,379 B2 | 3/2021 | Smith et al. |
| 10,964,001 B2 | 3/2021 | Miller |
| 10,995,361 B2 | 5/2021 | Chen et al. |
| 11,008,608 B2 | 5/2021 | Samusik et al. |
| 11,174,281 B1 | 11/2021 | Graham et al. |
| 11,287,422 B2 | 3/2022 | Previte et al. |
| 11,434,525 B2 | 9/2022 | Glezer |
| 11,459,603 B2 | 10/2022 | Tyagi et al. |
| 11,499,185 B2 | 11/2022 | Vijayan et al. |
| 11,643,679 B2 | 5/2023 | Glezer et al. |
| 11,999,999 B2 | 6/2024 | Ju et al. |
| 2002/0051986 A1 | 5/2002 | Baez et al. |
| 2003/0013091 A1 | 1/2003 | Dimitrov |
| 2005/0100900 A1 | 5/2005 | Kawashima et al. |
| 2006/0188901 A1 | 8/2006 | Barnes et al. |
| 2006/0240439 A1 | 10/2006 | Smith et al. |
| 2006/0281109 A1 | 12/2006 | Barr et al. |
| 2007/0166705 A1 | 7/2007 | Milton et al. |
| 2007/0166708 A1 | 7/2007 | Dimitrov et al. |
| 2010/0015607 A1 | 1/2010 | Geiss et al. |
| 2010/0047924 A1 | 2/2010 | Webster et al. |
| 2010/0055733 A1 | 3/2010 | Lutolf et al. |
| 2010/0112710 A1 | 5/2010 | Geiss et al. |
| 2010/0261026 A1 | 10/2010 | Ferree et al. |
| 2010/0262374 A1 | 10/2010 | Hwang et al. |
| 2011/0223585 A1 | 9/2011 | Gullberg et al. |
| 2012/0270305 A1 | 10/2012 | Reed et al. |
| 2013/0079232 A1 | 3/2013 | Kain et al. |
| 2013/0171621 A1 | 7/2013 | Luo et al. |
| 2013/0260372 A1 | 10/2013 | Buermann et al. |
| 2013/0288249 A1 | 10/2013 | Gullbert |
| 2013/0323729 A1 | 12/2013 | Landegren et al. |
| 2014/0371088 A1 | 12/2014 | Webster |
| 2016/0024555 A1 | 1/2016 | Church et al. |
| 2016/0108458 A1 | 4/2016 | Frei et al. |
| 2016/0305856 A1 | 10/2016 | Boyden et al. |
| 2016/0369329 A1* | 12/2016 | Cai ...................... C12Q 1/6841 |
| 2016/0376642 A1 | 12/2016 | Landegren et al. |
| 2017/0009278 A1 | 1/2017 | Söderberg et al. |
| 2017/0029872 A1 | 2/2017 | Bhattacharyya et al. |
| 2017/0029875 A1 | 2/2017 | Zhang et al. |
| 2017/0081489 A1 | 3/2017 | Rodriques et al. |
| 2017/0101672 A1 | 4/2017 | Luo et al. |
| 2017/0220733 A1 | 8/2017 | Zhuang et al. |
| 2017/0241911 A1 | 8/2017 | Rockel et al. |
| 2017/0253918 A1 | 9/2017 | Kohman |
| 2018/0051322 A1 | 2/2018 | Church et al. |
| 2018/0052081 A1 | 2/2018 | Kohman |
| 2018/0080876 A1 | 3/2018 | Rockel et al. |
| 2018/0208967 A1 | 7/2018 | Larman et al. |
| 2018/0237864 A1 | 8/2018 | Imler et al. |
| 2018/0245142 A1 | 8/2018 | So et al. |
| 2018/0251833 A1 | 9/2018 | Daugharthy et al. |
| 2018/0320226 A1 | 11/2018 | Church et al. |
| 2018/0372736 A1 | 12/2018 | Hennek et al. |
| 2019/0017106 A1 | 1/2019 | Frisen et al. |
| 2019/0032121 A1 | 1/2019 | Daugharthy et al. |
| 2019/0032128 A1 | 1/2019 | Chen et al. |
| 2019/0055594 A1 | 2/2019 | Samusik et al. |
| 2019/0112599 A1 | 4/2019 | Church et al. |
| 2019/0119735 A1 | 4/2019 | Deisseroth et al. |
| 2019/0155835 A1 | 5/2019 | Daugharthy et al. |
| 2019/0161796 A1 | 5/2019 | Hauling et al. |
| 2019/0177718 A1 | 6/2019 | Church et al. |
| 2019/0177800 A1 | 6/2019 | Boutet et al. |
| 2019/0194709 A1 | 6/2019 | Church et al. |
| 2019/0218608 A1 | 7/2019 | Daugharthy et al. |
| 2019/0249248 A1 | 8/2019 | Beechem et al. |
| 2019/0264270 A1 | 8/2019 | Zhuang et al. |
| 2019/0271028 A1 | 9/2019 | Khafizov et al. |
| 2019/0276881 A1 | 9/2019 | Zhuang et al. |
| 2019/0339203 A1 | 11/2019 | Miller et al. |
| 2019/0367969 A1 | 12/2019 | Belhocine |
| 2020/0010891 A1 | 1/2020 | Beechem et al. |
| 2020/0071751 A1 | 3/2020 | Daugharthy et al. |
| 2020/0080136 A1 | 3/2020 | Zhang et al. |
| 2020/0080139 A1 | 3/2020 | Cai et al. |
| 2020/0123597 A1 | 4/2020 | Daniel |
| 2020/0140920 A1 | 5/2020 | Pierce et al. |
| 2020/0190583 A1* | 6/2020 | Mohammed .......... C12Q 1/6804 |
| 2020/0224243 A1 | 7/2020 | Desai et al. |
| 2020/0224244 A1 | 7/2020 | Nilsson et al. |
| 2020/0239946 A1 | 7/2020 | Dewal |
| 2020/0332368 A1 | 10/2020 | Ferree et al. |
| 2020/0354774 A1 | 11/2020 | Church et al. |
| 2020/0354782 A1 | 11/2020 | Dewal |
| 2020/0362398 A1 | 11/2020 | Kishi et al. |
| 2020/0393343 A1 | 12/2020 | Kennedy-Darling et al. |
| 2021/0017587 A1 | 1/2021 | Cai et al. |
| 2021/0115042 A1 | 4/2021 | Cai et al. |
| 2021/0164039 A1 | 6/2021 | Wang et al. |
| 2021/0238662 A1 | 8/2021 | Bava |
| 2021/0238674 A1 | 8/2021 | Bava |
| 2021/0254140 A1 | 8/2021 | Stahl et al. |
| 2021/0262018 A1 | 8/2021 | Bava et al. |
| 2021/0277460 A1 | 9/2021 | Bava |
| 2021/0340618 A1 | 11/2021 | Kuhnemund et al. |

(56) References Cited

U.S. PATENT DOCUMENTS

| | | |
|---|---|---|
| 2021/0340621 A1 | 11/2021 | Daugharthy et al. |
| 2021/0388423 A1 | 12/2021 | Bava et al. |
| 2021/0388424 A1 | 12/2021 | Bava |
| 2022/0049302 A1 | 2/2022 | Daugharthy et al. |
| 2022/0049303 A1 | 2/2022 | Busby et al. |
| 2022/0083832 A1 | 3/2022 | Shah |
| 2022/0084628 A1 | 3/2022 | Shah |
| 2022/0084629 A1 | 3/2022 | Shah |
| 2022/0136049 A1 | 5/2022 | Bava et al. |
| 2022/0195498 A1 | 6/2022 | Kuhnemund et al. |
| 2022/0213529 A1 | 7/2022 | Kuhnemund et al. |
| 2022/0228200 A1 | 7/2022 | Bava |
| 2022/0235403 A1 | 7/2022 | Costa |
| 2022/0282306 A1 | 9/2022 | Bava et al. |
| 2022/0282316 A1 | 9/2022 | Bava et al. |
| 2022/0282319 A1 | 9/2022 | Verheyen et al. |
| 2022/0372570 A1 | 11/2022 | Costa |
| 2022/0380838 A1 | 12/2022 | Kuhnemund et al. |
| 2022/0403458 A1 | 12/2022 | Bava et al. |
| 2023/0012607 A1 | 1/2023 | Kuhnemund et al. |
| 2023/0013775 A1 | 1/2023 | Chen |
| 2023/0015226 A1 | 1/2023 | Chen |
| 2023/0026886 A1 | 1/2023 | Chen |
| 2023/0031305 A1 | 2/2023 | Hernandez Neuta et al. |
| 2023/0031996 A1 | 2/2023 | Hernandez Neuta et al. |
| 2023/0035685 A1 | 2/2023 | Hernandez Neuta et al. |
| 2023/0037182 A1 | 2/2023 | Bava et al. |
| 2023/0039148 A1 | 2/2023 | Verheyen et al. |
| 2023/0041485 A1 | 2/2023 | Hernandez Neuta et al. |
| 2023/0044650 A1 | 2/2023 | Dockter |
| 2023/0057571 A1 | 2/2023 | Costa et al. |
| 2023/0061542 A1 | 3/2023 | Kuhnemund et al. |
| 2023/0084407 A1 | 3/2023 | Neuta et al. |
| 2023/0159997 A1 | 5/2023 | Belhocine et al. |
| 2023/0160794 A1 | 5/2023 | Dockter et al. |
| 2023/0183787 A1 | 6/2023 | Bava et al. |
| 2023/0242974 A1 | 8/2023 | Costa et al. |
| 2023/0279465 A1 | 9/2023 | He et al. |
| 2023/0279475 A1 | 9/2023 | Kuhnemund et al. |
| 2023/0279480 A1 | 9/2023 | Kuhnemund et al. |
| 2023/0287478 A1 | 9/2023 | Bava |
| 2023/0314327 A1 | 10/2023 | Hoffman |
| 2023/0314328 A1 | 10/2023 | Costa |
| 2023/0323427 A1 | 10/2023 | Levin |
| 2023/0323430 A1 | 10/2023 | Shastry |
| 2023/0323437 A1 | 10/2023 | Chen |
| 2023/0374573 A1 | 11/2023 | Qian et al. |
| 2023/0374580 A1 | 11/2023 | Costa |
| 2023/0416821 A1 | 12/2023 | Bava et al. |
| 2024/0002902 A1 | 1/2024 | Jakobsen et al. |
| 2024/0026426 A1 | 1/2024 | Costa |
| 2024/0026427 A1 | 1/2024 | Kuhnemund et al. |
| 2024/0026439 A1 | 1/2024 | Sasaki et al. |
| 2024/0026448 A1 | 1/2024 | Costa |
| 2024/0035070 A1 | 2/2024 | Christopherson |
| 2024/0035071 A1 | 2/2024 | Delaney et al. |
| 2024/0035072 A1 | 2/2024 | Christopherson |
| 2024/0043910 A1 | 2/2024 | Shastry |
| 2024/0043914 A1 | 2/2024 | Chen |
| 2024/0060119 A1 | 2/2024 | Bava et al. |
| 2024/0084373 A1 | 3/2024 | Shastry |
| 2024/0084378 A1 | 3/2024 | Marks et al. |
| 2024/0101978 A1 | 3/2024 | Boghospor |
| 2024/0132938 A1 | 4/2024 | Kuhnemund et al. |
| 2024/0141418 A1 | 5/2024 | Mielinis |
| 2024/0150816 A1 | 5/2024 | Feng et al. |
| 2024/0158852 A1 | 5/2024 | Belhocine et al. |
| 2024/0167081 A1 | 5/2024 | Bava et al. |
| 2024/0175082 A1 | 5/2024 | Costa |
| 2024/0175083 A1 | 5/2024 | Bava et al. |
| 2024/0191297 A1 | 6/2024 | Christopherson et al. |
| 2024/0209330 A1 | 6/2024 | Shastry et al. |
| 2024/0218424 A1 | 7/2024 | Costa et al. |
| 2024/0218437 A1 | 7/2024 | Belhocine et al. |

FOREIGN PATENT DOCUMENTS

| | | | |
|---|---|---|---|
| WO | WO 2017/143155 | 8/2017 | |
| WO | WO 2018/091676 | 5/2018 | |
| WO | WO 2019/199579 | 10/2019 | |
| WO | WO-2019199579 A1 * | 10/2019 | .......... C12Q 1/6841 |
| WO | WO 2020/047005 | 3/2020 | |
| WO | WO 2020/076976 | 4/2020 | |
| WO | WO 2020/076979 | 4/2020 | |
| WO | WO 2020/096687 | 5/2020 | |
| WO | WO 2020/099640 | 5/2020 | |
| WO | WO 2020/117914 | 6/2020 | |
| WO | WO 2020/123316 | 6/2020 | |
| WO | WO 2020/123742 | 6/2020 | |
| WO | WO 2020/142490 | 7/2020 | |
| WO | WO 2020/176788 | 9/2020 | |
| WO | WO 2020/240025 | 12/2020 | |
| WO | WO 2020/254519 | 12/2020 | |
| WO | WO 2021/123282 | 6/2021 | |
| WO | WO 2021/123286 | 6/2021 | |
| WO | WO 2021/138676 | 7/2021 | |
| WO | WO 2021/155063 | 8/2021 | |
| WO | WO 2021/168326 | 8/2021 | |
| WO | WO 2023/108139 | 6/2023 | |
| WO | WO 2023/141476 | 7/2023 | |
| WO | WO 2023/172915 | 9/2023 | |
| WO | WO 2023/192302 | 10/2023 | |
| WO | WO 2024/148300 | 7/2024 | |

OTHER PUBLICATIONS

Archer et al., "Selective and flexible depletion of problematic sequences from RNA-seq libraries at the cDNA stage," BMC Genomics. (2014) 15(1):401.

Baner et al., "Signal amplification of padlock probes by rolling circle replication," Nucleic Acids Res. (1998) 26(22):5073-5078.

Bolognesi et al., "Multiplex Staining by Sequential Immunostaining and Antibody Removal on Routine Tissue Sections," J. Histochem. Cytochem. (2017); 65(8): 431-444.

Chen et al., "Nanoscale imaging of RNA with expansion microscopy," Nat Methods. (2016) 13:679-684.

Chen et al., "Expansion Microscopy," Science (2015) 347(6221):543-548.

Chen et al., "RNA imaging. Spatially resolved, highly multiplexed RNA profiling in single cells," Science. (2015) 348(6233): aaa6090. 36 pgs.

Chen et al., "Efficient in situ barcode sequencing using padlock probe-based BaristaSeq," Nucleic Acids Res. (2018) 46(4): e22.

Dean et al., "Rapid Amplification Of Plasmid And Phage DNA Using Phi29 DNA Polymerase And Multiply-Primed Rolling Circle Amplification," Genome Research (2001) 11:1095-1099.

Echeverria et al., "Functional Stimuli-Responsive Gels: Hydrogels and Microgels," Gels. (2018) 4(2): 54.

Eng et al., "Transcriptome-scale super-resolved imaging in tissues by RNA seqFISH," Nature. (2019) 568(7751): 235-239.

Fang et al., "Fluoride-Cleavable Biotinylation Phosphoramidite for 5'-end-Labelling and Affinity Purification of Synthetic Oligonucleotides," Nucleic Acids Res. (2003) 31(2): 708-715.

Faruqi et al., "High-throughput genotyping of single nucleotide polymorphisms with rolling circle amplification," BMC Genomics. (2001) 2:4.

Feige, "A threshold of ln n for approximating set cover," Journal of the ACM (ACM) (2006) 45(4): 634-652.

Forcucci et al., "All-plastic miniature fluorescence microscope for point-of-care readout of bead-based bioassays," J Biomed Opt. (2015) 20(10): 105010.

Gao et al., "Q&A: Expansion microscopy," BMC Biol. (2017) 15: 50.

Glass et al., "SIMPLE: a sequential immunoperoxidase labeling and erasing method," J Histochem Cytochem. (2009) 57(10); 899-905.

Goh, J.J.L et al. (Jul. 2020, e-pub. Jun. 15, 2020). "Highly Specific Multiplexed RNA Imaging In Tissues With Split-FISH," Nat Methods 17(7):689-693. doi: 10.1038/s41592-020-0858-0. Epub Jun. 15, 2020.

(56) References Cited

OTHER PUBLICATIONS

Goransson et al., "A single molecule array for digital targeted molecular analyses," Nucleic Acids Res. 2009 37(1):e7. doi: 10.1093/nar/gkn921.
Gunderson et al. "Decoding randomly ordered DNA arrays." Genome research 14.5 (2004): 870-877.
Gupta et al., "Single-cell isoform RNA sequencing characterizes isoforms in thousands of cerebellar cells," Nature Biotechnol. (2018) 36:1197-1202.
Jamur et al., "Permeabilization of cell membranes," Method Mol. Biol. (2010) 588: 63-66 (abstract only).
Korlach et al. "Selective aluminum passivation for targeted immobilization of single DNA polymerase molecules in zero-mode waveguide nanostructures." *Proceedings of the National Academy of Sciences* 105.4 (2008): 1176-1181.
Lee et al. "Highly Multiplexed Subcellular RNA Sequencing In Situ", Science (2014) 343(6177):1360-1363.
Lee et al., "Fluorescent in situ sequencing (FISSEQ) of RNA for gene expression profiling in intact cells and tissues," Nat Protoc. (2015) 10(3): 442-58.
Levene et al. "Zero-mode waveguides for single-molecule analysis at high concentrations." science 299.5607 (2003): 682-686.
Lin et al., "Highly multiplexed imaging of single cells using a high-throughput cyclic immunofluorescence method," Nat Commun. (2015) 6:8390.
Liu et al., "Spatial transcriptome sequencing of FFPE tissues at cellular level," bioRxiv 788992, 2020.
Liu et al. Barcoded oligonucleotides ligated on RNA amplified for multiplexed and parallel in situ analyses. Nucleic Acids Res. (2021) 49(10): e58, 15 pages. doi: 10.1093/nar/gkab120.
Lizardi et al., "Mutation detection and single-molecule counting using isothermal rolling-circle amplification," Nat Genet. (1998) 19(3): 225-232.
Lundquist et al. "Parallel confocal detection of single molecules in real time." Optics letters 33.9 (2008): 1026-1028.
McGinn et al., "New technologies for DNA analysis—a review of the READNA Project," N Biotechnol. (2016) 33(3): 311-30. doi: 10.1016/j.nbt.2015.10.003.
Mitra et al., "Fluorescent in situ sequencing on polymerase colonies," Anal. Biochem. (2003) 320, 55-65.
Moffitt et al., "RNA Imaging with Multiplexed Error-Robust Fluorescence In Situ Hybridization (MERFISH)," Methods in Enzymology, (2016) 572; 1-49.
Mohsen et al., "The Discovery of Rolling Circle Amplification and Rolling Circle Transcription," Acc Chem Res. (2016) 49(11): 2540-2550.
Nallur et al., "Signal amplification by rolling circle amplification on DNA microarrays," Nucleic Acids Res. (2001) 29(23): e118.
Payne et al. "In situ genome sequencing resolves DNA sequence and structure in intact biological samples," Science. (2021) 371(6532): eaay3446. doi: 10.1126/science.aay3446. Epub Dec. 31, 2020.
Pirici et al., "Antibody elution method for multiple immunohistochemistry on primary antibodies raised in the same species and of the same subtype," J Histochem Cytochem. (2009) 57(6); 567-75.
Rajeswari et al., "Multiple pathogen biomarker detection using an encoded bead array in droplet PCR," J Microbiol Methods. (2017) 139: 22-28.
Rodriques et al., "Slide-seq: A Scalable Technology for Measuring Genome-Wide Expression at High Spatial Resolution," Science. (2019) 363(6434): 1463-1467.
Rouhanifard et al. "ClampFISH detects individual nucleic acid molecules using click chemistry-based amplification," Nat Biotechnol. (2018) 17 pages. doi: 10.1038/nbt.4286.
Schweitzer et al., "Multiplexed protein profiling on microarrays by rolling-circle amplification," Nature Biotech. (2002) 20:359-365.
Schweitzer et al. "Immunoassays with rolling circle DNA amplification: A versatile platform for ultrasensitive antigen detection," Proc. Natl Acad. Sci. USA (2000) 97:10113-119.

Shendure et al, "Accurate multiplex polony sequencing of an evolved bacterial genome," Science (2005) 309(5741); 1728-1732.
Soderberg et al. "Characterizing proteins and their interactions in cells and tissues using the in situ proximity ligation assay." *Methods* 45.3 (2008): 227-232.
Takei et al., (Feb. 2021, e-pub Jan. 27, 2021). "Integrated Spatial Genomics Reveals Global Architecture Of Single Nuclei," Nature 590(7845):344-350, 53 pages. doi: 10.1038/s41586-020-03126-2.
Trejo et al., "Extraction-free whole transcriptome gene expression analysis of FFPE sections and histology-directed subareas of tissue," PLoS One. (2019) 14(2): e0212031.
Vandernoot et al., "cDNA normalization by hydroxyapatite chromatography to enrich transcriptome diversity in RNA-seq applications," Biotechniques, (2012) 53(6) 373-80.
Wang et al., "Three-dimensional intact-tissue sequencing of single-cell transcriptional states," Science. (2018) 361(6400): eaat5691.
Wu, C. et al. "RollFISh Achieves Robust Quantification Of Single-Molecule RNA Biomarkers In Paraffin-Embedded Tumor Tissue Samples," Commun Biol. (2018) 1:(209):1-8. doi: 10.1038/s42003-018-0218-0.
Bibikova et al., "Quantitative gene expression profiling in formalin-fixed, paraffin-embedded tissues using universal bead arrays," Am J Pathol. Nov. 2004;165(5):1799-807.
Capodieci et al., "Gene expression profiling in single cells within tissue," Nat Methods. (2005) 2(9): 663-5.
Conze et al., "Single molecule analysis of combinatorial splicing," Nucleic Acids Res. (2010) 38(16): e163.
Femino et al., "Visualization of single RNA transcripts in situ," Science. (1998) 280(5363): 585-90.
Gavrilovic et al., "Automated classification of multicolored rolling circle products in dual-channel wide-field fluorescence microscopy," Cytometry A. (2011) 79(7): 518-27.
Geiss et al., "Direct multiplexed measurement of gene expression with color-coded probe pairs," Nat Biotechnol. (2008) 26(3): 317-25.
Gyllborg et al., "Hybridization-based in situ sequencing (HybISS) for spatially resolved transcriptomics in human and mouse brain tissue," Nucleic Acids Res. (2020) 48(19): e112.
Han et al., "Quantum-dot-tagged microbeads for multiplexed optical coding of biomolecules," Nat Biotechnol. (2001) 19(7): 631-5.
Itzkovitz et al., "Single-molecule transcript counting of stem-cell markers in the mouse intestine," Nat Cell Biol. (2011) 14(1): 106-14.
Itzkovitz et al., "Validating Transcripts with Probes and Imaging Technology," Nat Methods. (2011) 8(4 Suppl): S12-S19.
Lagunavicius et al., "Novel application of Phi29 DNA polymerase: RNA detection and analysis in vitro and in situ by target RNA-primed RCA," RNA. (2009) 15(5):765-71.
Larsson et al. "In situ detection and genotyping of individual mRNA molecules," Nat Methods. (2010) 7(5):395-397.
Levsky et al., "Fluorescence in situ hybridization: past, present and future," J Cell Sci. (2003) 116(Pt 14): 2833-8.
Levsky et al., "Single-cell gene expression profiling," Science. (2002) 297(5582): 836-40.
Maierhorfer et al., "Multicolor deconvolution microscopy of thick biological specimens," Am J Pathol. (2003) 162(2): 373-9.
Meade et al. "Multiplexed DNA detection using spectrally encoded porous SiO2 photonic crystal particles," Anal Chem. (2009) 81(7): 2618-25.
Raj et al., "Imaging individual mRNA molecules using multiple singly labeled probes," Nat Methods. (2008) 5(10): 877-879.
Sun et al., "Composite organic-inorganic nanoparticles as Raman labels for tissue analysis," Nano Lett. (2007) 7(2): 351-6.
Wählby et al., "Sequential immunofluorescence staining and image analysis for detection of large numbers of antigens in individual cell nuclei," Cytometry. (2002) 47(1): 32-41.
Weibrecht et al., "Simultaneous visualization of both signaling cascade activity and end-point gene expression in single cells," PLoS One. (2011) 6(5): e20148.
Wilson et al., "Encoded microcarriers for high-throughput multiplexed detection," Angew Chem Int Ed Engl. (2006) 18;45(37): 6104-17.

(56) References Cited

OTHER PUBLICATIONS

Zhao et al., "Advances of multiplex and high throughput biomolecular detection technologies based on encoding microparticles," Sci China Chem. (2011) 54(8): 1185.

* cited by examiner

METHODS AND COMPOSITIONS FOR MULTIMODAL IN SITU ANALYSIS

CROSS-REFERENCE TO RELATED APPLICATIONS

This application claims priority to U.S. Provisional Patent Application No. 63/124,619, filed Dec. 11, 2020, entitled "METHODS AND COMPOSITIONS FOR MULTIMODAL IN SITU ANALYSIS," which is herein incorporated by reference in its entirety for all purposes.

FIELD

The present disclosure relates in some aspects to methods and compositions for multiplex analysis of biological targets in a sample.

BACKGROUND

Profiling biological targets in a sample, such as genomic, transcriptomic, and/or proteomic profiling of cells, are essential for many purposes, such as understanding the molecular basis of cell identity and developing treatment for diseases. Microscopy imaging, which can resolve multiple analytes in a sample, provides valuable information such as abundance and spatial information of analytes in situ. Current in situ assays may be inefficient and time consuming, but the potential value of such in-tissue analysis could be enormous. Therefore, there is a need for new and improved methods for in situ analysis.

SUMMARY

Provided herein in some aspects are methods, compositions, devices, and systems for analyzing a biological sample in multiple modes, including a work-horse mode (e.g., a sequencer mode for acquiring data for nucleic acid sequence analysis) and a microscope mode (e.g., a mode that provides the flexibility to change field, magnification, and/or channels to visualize different analytes, in different sample regions, and/or with different resolution).

In some embodiments, a system disclosed herein comprises a microscope configured to acquire optical signals for analyzing a first set of nucleic acid sequences, for example, by in situ hybridization (e.g., sequential hybridization of detection probes) and/or in situ sequencing (e.g., using padlock probes and rolling circle amplification (RCA) of ligated padlock probes), under a first magnification in a first region of a sample. In some examples, the acquired signals are analyzed, and a second set of nucleic acid sequences, a second region of the sample, and/or a second magnification of the microscope can be selected for use in additional signal acquisition and optionally sequence analysis. In some examples, results of an in situ assay round on a sample can be used to guide the selection of parameters for a subsequent in situ assay round. For example, a user can "zoom in" by focusing on a subset of biomarkers of a biomarker panel in a previous in situ assay round, focusing on a sub-region of a region analyzed in the previous round, and/or analyzing the same region or different regions (for the same or different biomarkers as the previous round) with greater resolution. Similarly, a user can "zoom out" (e.g., by including more biomarkers, by selecting a lower magnification to view a larger area, and/or by analyzing the same region or different regions with lower resolution), "switch field" (e.g., by selecting a different region of the sample for the same or different biomarkers), and/or "change channel" (e.g., by selecting a different biomarker panel for the same or different sample regions), using a result from the previous round of in situ assay. As such, the methods and systems disclosed herein can not only acquire signals for sequence analysis as a work-horse (e.g., a sequencer), but also provide the ability to select reagents and/or parameters between assay rounds and the much needed flexibility for efficient in situ analysis.

In some embodiments, a method disclosed herein comprises profiling analytes including their spatial information (e.g., localization of the analyte), such as the transcriptome or a subset thereof, in a biological sample. Methods, compositions, kits, devices, and systems for these in situ assays, including in situ genomics and transcriptomics assays, are provided. In some embodiments, a provided method is quantitative and preserves the spatial information within a tissue sample without physically isolating cells (e.g., microdissection of a portion of a tissue sample) or using homogenates. Also provided herein are compositions and methods for detecting and/or quantifying nucleic acids in cells, tissues, organs or organisms. In some embodiments, the present disclosure provides methods for high-throughput profiling of a large number of targets in situ, including spatial information of such targets, such as RNA transcripts and/or DNA loci in a sample (e.g., a tissue slice), without the need of physically separating a portion of the sample and/or one or more analytes or reagents bound thereto for analysis. In some embodiments, the sample remains intact after one or more rounds of detecting the labeled oligonucleotides. In some embodiments, the labeled oligonucleotides (or portions of the sample containing the labeled oligonucleotides) are not removed from the sample prior to, during, and/or after one or more rounds of detecting.

In some embodiments, provided herein is a method for analyzing a sample, comprising: a) contacting the sample with a plurality of barcoded probe sets, each set for analyzing an analyte panel; b) contacting the sample with a first plurality of detectably labeled oligonucleotides for analyzing one or more sets of the plurality of barcoded probe sets; c) detecting the labeled oligonucleotides using a microscope at a first magnification; d) analyzing the one or more analyte (e.g., biomarker) panels corresponding to the one or more sets; e) based on the analysis of step d): i) selecting a second plurality of detectably labeled oligonucleotides for analyzing another one or more sets of the plurality of barcoded probe sets and contacting the sample with the second plurality of detectably labeled oligonucleotides, and/or ii) selecting a second magnification of the microscope and imaging the sample or a portion thereof at the second magnification. In some embodiments, the analyte panel is a biomarker panel.

In some embodiments, disclosed herein is a method for analyzing a sample, comprising: a) contacting a sample with a plurality of barcoded probe sets, each set for analyzing an analyte (e.g., biomarker) panel, b) contacting the sample with a first plurality of detectably labeled oligonucleotides for analyzing one or more sets of the plurality of barcoded probe sets, c) imaging the sample using a microscope at a first magnification, d) analyzing the one or more analyte (e.g., biomarker) panels corresponding to the one or more sets in a first region of the sample, e) contacting the sample with a second plurality of detectably labeled oligonucleotides for analyzing another one or more sets of the plurality of barcoded probe sets, and f) imaging the sample using the microscope at a second magnification, wherein at least one analyte (e.g., biomarker) panel corresponding to the another one or more sets is analyzed in a second region of the sample, wherein the second region, the second magnification, and/or the second plurality of detectably labeled oligonucleotides are selected based on the analysis of the one or more analyte (e.g., biomarker) panels previously analyzed (e.g., in step d)). In some embodiments, the method comprises, based on the analysis of the one or more analyte (e.g., biomarker) panels (e.g., in step d)), selecting the second region that is different from the first region (which may be the entire sample), e.g., the second region being a smaller region of the first region. In some embodiments, the method comprises, based on the analysis of the one or more analyte (e.g., biomarker) panels (e.g., in step d)), selecting the second magnification that is different from the first magnification. In some embodiments, the method comprises, based on the analysis of the one or more analyte (e.g., biomarker) panels (e.g., in step d)), selecting the second plurality of detectably labeled oligonucleotides that are different from the first plurality of detectably labeled oligonucleotides, wherein the first and second pluralities may target different analytes (e.g., biomarkers) in the sample.

In some embodiments, disclosed herein is a method for analyzing a sample, comprising: a) contacting a sample with barcoded probe sets $P_1, \ldots, P_k, \ldots,$ and $P_n$ for analyzing analyte (e.g., biomarker) panels $B_1, \ldots, B_k, \ldots,$ and $B_n$, respectively, wherein k and n are integers and $2 \leq k \leq n$; b) contacting the sample with a first plurality of detectably labeled oligonucleotides DO1 for analyzing one or more sets in the barcoded probe sets; c) detecting the first plurality of detectably labeled oligonucleotides using a microscope at a first magnification M1, d) analyzing the one or more analyte (e.g., biomarker) panels corresponding to the one or more sets in a first region R1 of the sample; and e) based on the analyzing step: i) selecting a second plurality of detectably labeled oligonucleotides DO2 for analyzing another one or more sets of the plurality of barcoded probe sets, wherein the sample or a region thereof is contacted with DO2, ii) selecting a second magnification M2, wherein the sample or a region thereof is imaged using the microscope at M2, and/or iii) selecting a second region R2 of the sample, wherein one or more analyte (e.g., biomarker) panels in R2 are analyzed, wherein one or more of DO2, M2, and R2 is different from DO1, M1, and R1, respectively.

In any of the preceding embodiments, DO2 can comprise one or more detectably labeled oligonucleotides that are not in DO1.

In any of the preceding embodiments, DO2 can comprise one or more detectably labeled oligonucleotides for analyzing at least one analyte (e.g., biomarker) panel that is not identical to the one or more analyte (e.g., biomarker) panels previously analyzed (e.g., in step d)).

In any of the preceding embodiments, M1 and M2 can be the same magnification of the microscope. In any of the preceding embodiments, M2 can be a higher magnification than M1. In any of the preceding embodiments, R1 and R2 can be the same region of the sample. In any of the preceding embodiments, R1 and R2 can be different regions of the sample.

In any of the preceding embodiments, R1 and R2 can be overlapping regions.

In any of the preceding embodiments, R2 can be a sub-region of R1.

In any of the preceding embodiments, R1 and R2 can be the same region of the sample. In any of the preceding embodiments, R1 and R2 can be the entire region of the sample or a portion thereof.

In any of the preceding embodiments, R1 and R2 can be different regions of the sample. In any of the preceding embodiments, one of R1 and R2 can be the entire region of the sample and the other can be a portion of the sample.

In any of the preceding embodiments, R1 and R2 can be overlapping regions.

In any of the preceding embodiments, R2 can be a sub-region within R1.

In any of the preceding embodiments, the detecting of the detectably labeled oligonucleotides can comprise imaging R1 using the microscope at M1.

In any of the preceding embodiments, the detecting can comprise detecting optical signals from DO1 in a hybridization reaction.

In any of the preceding embodiments, the imaging using the microscope at M2 can be of a sub-region of R1.

In any of the preceding embodiments, M2 can be higher than M1, and R2 can be imaged using M2.

In any of the preceding embodiments, two or more analyte (e.g., biomarker) panels can comprise one or more non-overlapping biomarkers.

In any of the preceding embodiments, two or more analyte (e.g., biomarker) panels of $B_1, \ldots, B_k, \ldots,$ and $B_n$ can comprise one or more non-overlapping biomarker.

In any of the preceding embodiments, two or more analyte (e.g., biomarker) panels can comprise one or more overlapping biomarkers.

In any of the preceding embodiments, two or more analyte (e.g., biomarker) panels of $B_1, \ldots, B_k, \ldots,$ and $B_n$ can comprise one or more overlapping biomarker.

In any of the preceding embodiments, the one or more analyte (e.g., biomarker) panels initially analyzed (e.g., in step d)) can correspond to a first subset of barcoded probe sets contacted with the sample.

In any of the preceding embodiments, the one or more analyte (e.g., biomarker) panels initially analyzed (e.g., in step d)) can correspond to a first subset of barcoded probe sets $P_1, \ldots, P_k, \ldots,$ and $P_n$ contacted with the sample.

In any of the preceding embodiments, the second plurality of detectably labeled oligonucleotides can be for analyzing a second subset of barcoded probe sets contacted with the sample.

In any of the preceding embodiments, DO2 can be for analyzing a second subset of barcoded probe sets $P_1, \ldots, P_k, \ldots,$ and $P_n$ contacted with the sample.

In any of the preceding embodiments, the one or more analyte (e.g., biomarker) panels corresponding to the first subset of barcoded probe sets and the second subset of barcoded probe sets can be non-overlapping.

In any of the preceding embodiments, the one or more analyte (e.g., biomarker) panels corresponding to the first subset of barcoded probe sets and the second subset of barcoded probe sets can comprise one or more common biomarkers.

In any of the preceding embodiments, the analysis of the another one or more sets of the plurality of barcoded probe sets by contacting the sample with the second plurality of detectably labeled oligonucleotides, selection of a second magnification of the microscope and imaging the sample or a portion thereof at the second magnification, and/or selection of a second region of the sample and imaging R2 of the sample can provide greater sequencing depth and/or greater resolution than the first subset of barcoded probe sets analyzed.

In any of the preceding embodiments, the one or more analyte (e.g., biomarker) panels corresponding to first and/or second subset of barcoded probe sets can be indicative of a pathway and/or a cell type.

In any of the preceding embodiments, the one or more analyte (e.g., biomarker) panels corresponding to the second subset of barcoded probe sets can comprise a subpanel of the one or more analyte (e.g., biomarker) panels corresponding to the first subset of barcoded probe sets.

In any of the preceding embodiments, the sample can be a processed or cleared biological sample. In some embodiments, the sample is chemically treatment and/or stained with a dye.

In any of the preceding embodiments, the sample can be a tissue sample. In some embodiments, the sample can be a tissue slice between about 1 µm and about 50 µm in thickness. In some embodiments, the sample can be a tissue slice is between about 5 µm and about 35 µm in thickness.

In any of the preceding embodiments, the sample can be a stabilized sample, e.g., a cross-linked sample.

In any of the preceding embodiments, the sample can be embedded in a hydrogel.

In any of the preceding embodiments, detecting the labeled oligonucleotides using a microscope at a first magnification can be performed on an intact sample. In any of the preceding embodiments, further analysis of another one or more sets of the plurality of barcoded probe sets by imaging the sample or a portion thereof, analysis of a second region of the sample, and/or analysis at a second magnification of the microscope can be performed on an intact sample.

In any of the preceding embodiments, the first plurality of detectably labeled oligonucleotides can hybridize to the one or more sets of barcoded probe sets, and/or the second plurality of detectably labeled oligonucleotides can hybridize to the another one or more sets of barcoded probe sets.

In any of the preceding embodiments, the first plurality of detectably labeled oligonucleotides can hybridize, directly or indirectly, to molecules comprising the barcode sequences or complementary sequences thereof of the one or more sets of barcoded probe sets, and/or the second plurality of detectably labeled oligonucleotides can hybridize, directly or indirectly, to molecules comprising the barcode sequences or complementary sequences thereof of the another one or more sets of barcoded probe sets. In some embodiments, the molecules are or comprise amplification products of the one or more sets and/or the another one or more sets. In some embodiments, the amplification products are rolling circle amplification products.

In any of the preceding embodiments, an image of a detected analyte (e.g. biomarker) in the one or more analyte (e.g., biomarker) panels, and/or an image of a detected analyte (e.g. biomarker) in at least one analyte (e.g. biomarker) panel, can be displayed on a display operably connected to the microscope.

In any of the preceding embodiments, the imaging can comprise detecting optical signals from the second plurality of detectably labeled oligonucleotides in a hybridization reaction.

In any of the preceding embodiments, the method can comprise detecting optical signals from the first and/or second plurality of detectably labeled oligonucleotides for sequence detection or in a sequencing reaction.

In any of the preceding embodiments, the sequence detection or sequencing reaction can comprise sequencing by ligation, sequencing by hybridization, sequencing by synthesis, or sequencing by binding, or a combination thereof.

In any of the preceding embodiments, the analysis of the one or more analyte panels corresponding to the one or more barcoded probe sets in a first region R1 of the sample (e.g., in step d)) can provide information of one or more cell types, one or more types of biomarkers, a number or level of an analyte (e.g., a biomarker), and/or a number or level of cells detected in R1 of the sample.

In any of the preceding embodiments, the subsequent analysis with a second plurality of detectably labeled oligonucleotides and/or imaging at the second magnification or of a second region (e.g., in step e)) can provide information of one or more cell types, one or more types of biomarkers, a number or level of an analyte (e.g., a biomarker), and/or a number or level of cells detected in R1 or R2 of the sample.

In any of the preceding embodiments, the method can further comprise a step f), which comprises based on the subsequent analysis with a second plurality of detectably labeled oligonucleotides and/or imaging at the second magnification or of a second region (e.g., in step e)): i) selecting a third plurality of detectably labeled oligonucleotides DO3 for analyzing a third one or more sets of the plurality of barcoded probe sets, wherein the sample or a region thereof is contacted with DO3, ii) selecting a third magnification M3, wherein the sample or a region thereof is imaged using the microscope at M3, and/or iii) selecting a third region R3 of the sample, wherein one or more analyte (e.g., biomarker) panels in R3 are analyzed, wherein one or more of DO3, M3, and R3 is different from DO3, M3, and R3, respectively.

In any of the preceding embodiments, M3 can be higher than M2 and R3 can be a sub-region of R2.

In some embodiments, disclosed herein is a method for analyzing a sample, comprising: a) contacting a sample with a plurality of barcoded probe sets, each set for analyzing a different biomarker panel, b) contacting the sample with a first plurality of detectably labeled oligonucleotides for analyzing a first set of the plurality of barcoded probe sets, c) imaging the sample using a microscope at a first magnification, wherein a first biomarker panel corresponding to the first set is sequenced in a first region of the sample, d) contacting the sample with a second plurality of detectably labeled oligonucleotides for analyzing a second set of the plurality of barcoded probe sets, wherein the second region is a sub-region of the first region, and e) imaging a second region of the sample using the microscope at a second magnification, wherein a second biomarker panel corresponding to the second set is sequenced in a second region of the sample, wherein: sequencing of the first biomarker panel provides a greater sequencing depth than sequencing of the second biomarker panel, and/or the second magnification is higher than the first magnification.

In some embodiments, disclosed herein is a method for analyzing a sample, comprising: a) contacting a sample with a plurality of barcoded probe sets, each set for analyzing a different biomarker panel, b) contacting the sample with a first plurality of detectably labeled oligonucleotides for analyzing a first set of the plurality of barcoded probe sets, c) imaging the sample using a microscope at a first magnification, wherein a first biomarker panel corresponding to the first set is sequenced in a first region of the sample, d) contacting the sample with a second plurality of detectably labeled oligonucleotides for analyzing a second set of the plurality of barcoded probe sets, wherein the second region is a sub-region of the first region, and e) imaging a second region of the sample using the microscope at a second magnification, wherein a second biomarker panel corresponding to the second set is sequenced in a second region of the sample, wherein: sequencing of the second biomarker panel provides a greater sequencing depth than sequencing of the first biomarker panel, and/or the second magnification is higher than the first magnification.

In any of the preceding embodiments, the second region, the second magnification, and/or the second plurality of detectably labeled oligonucleotides can be selected based on the analysis of the first biomarker panel in the first region.

In any of the preceding embodiments, sequencing of the first biomarker panel and/or sequencing of the second biomarker panel can provide information of one or more cell types. In any of the preceding embodiments, sequencing of the first biomarker panel and/or sequencing of the second biomarker panel can provide information of one or more types of biomarkers, a number or level of an analyte (e.g., a biomarker), and/or a number or level of cells.

In any of the preceding embodiments, the sample can be embedded in a hydrogel and/or stabilized. In any of the preceding embodiments, the sample can be crosslinked.

In any of the preceding embodiments, the plurality of barcoded probe sets may comprise a labelling agent that binds an analyte in the sample. In some embodiments, the labelling agent binds a non-nucleic acid analyte in the sample and comprises a reporter oligonucleotide that corresponds to the non-nucleic acid analyte. In some embodiments, the non-nucleic acid analyte is a protein or polypeptide. In any of the preceding embodiments, the labelling agent can be a barcoded antibody. In any of the preceding embodiments, the plurality of barcoded probe sets can comprise a plurality of barcoded antibodies that bind to proteins in the sample and a plurality of barcoded probes that hybridize to nucleic acids in the sample.

DETAILED DESCRIPTION

Figure 1:
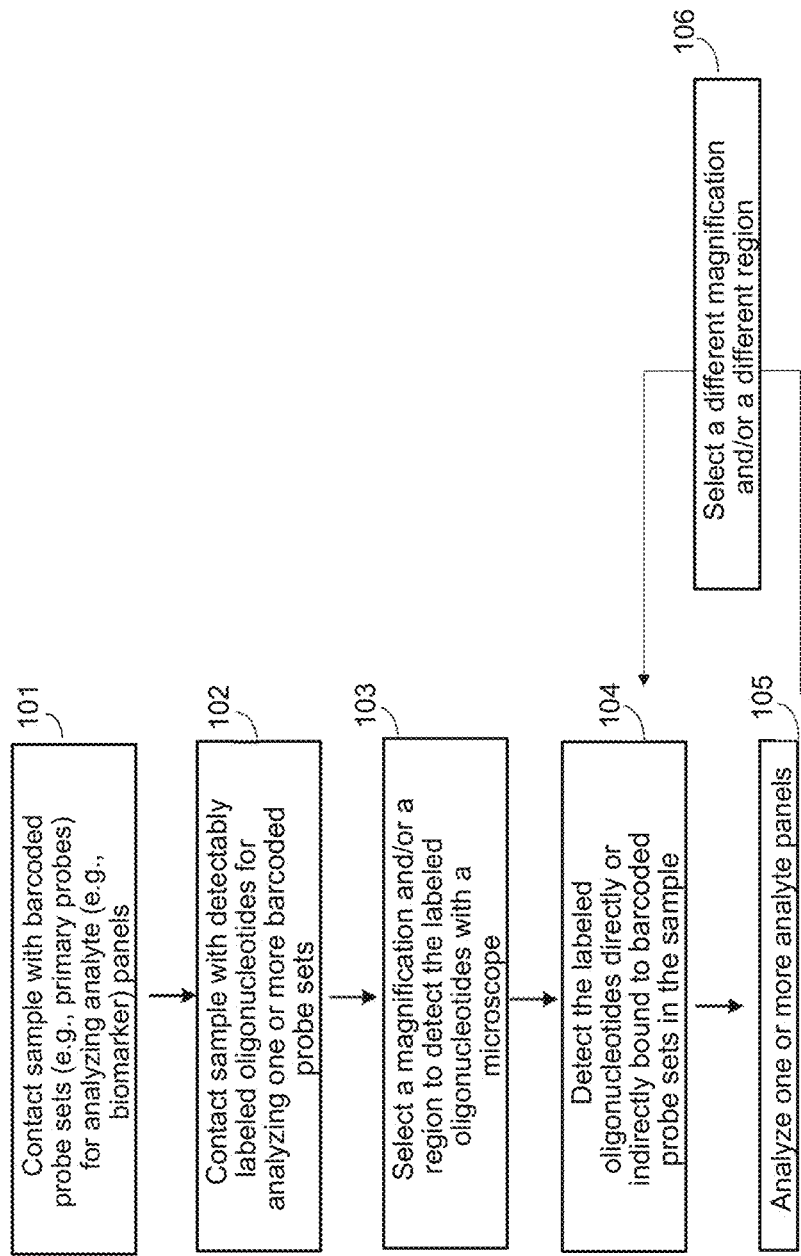
FIG. 1 shows an exemplary workflow of a method described herein.

The practice of the techniques described herein may employ, unless otherwise indicated, conventional techniques and descriptions of organic chemistry, polymer technology, molecular biology (comprising recombinant techniques), cell biology, biochemistry, and sequencing technology, which are within the skill of those who practice in the art. Such conventional techniques comprise polymer array synthesis, hybridization and ligation of polynucleotides, and detection of hybridization using a label. Specific illustrations of suitable techniques can be had by reference to the examples herein. However, other equivalent conventional procedures can, of course, also be used. Such conventional techniques and descriptions can be found in standard laboratory manuals such as Green, et al., Eds. (1999), *Genome Analysis: A Laboratory Manual Series* (Vols. I-IV); Weiner, Gabriel, Stephens, Eds. (2007), *Genetic Variation: A Laboratory Manual*; Dieffenbach, Dveksler, Eds. (2003), *PCR Primer: A Laboratory Manual*; Bowtell and Sambrook (2003), DNA *Microarrays: A Molecular Cloning Manual*; Mount (2004), *Bioinformatics: Sequence and Genome Analysis*; Sambrook and Russell (2006), *Condensed Protocols from Molecular Cloning: A Laboratory Manual*; and Sambrook and Russell (2002), Molecular Cloning: A Laboratory Manual (all from Cold Spring Harbor Laboratory Press); Stryer, L. (1995) *Biochemistry* (4th Ed.) W. H. Freeman, New York N.Y.; Gait, *"Oligonucleotide Synthesis: A Practical Approach"* 1984, IRL Press, London; Nelson and Cox (2000), Lehninger, *Principles of Biochemistry* 3rd Ed., W. H. Freeman Pub., New York, N.Y.; and Berg et al. (2002) *Biochemistry*, 5$^{th}$ Ed., W. H. Freeman Pub., New York, N.Y., all of which are herein incorporated in their entirety by reference for all purposes.

All publications, comprising patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. Overview

An in situ analysis typically involves placing a sample in a well or flow-cell connected to a fluidic device and mounted on an optical device such as a microscope. In existing methods of in situ analysis, the microscope is typically configured to work in only one modality, e.g., with a fixed objective type, light source, etc. The microscope is often optimized to address certain issues (e.g., optical crowding of the analytes of interest, signal to noise ratio, etc.) while working as a work-horse to acquire signals of as many analytes as possible in as large a region as possible in a sample. A work-horse microscope optimized for this purpose is often desired since signal acquisition in an in situ analysis typically takes a long time. However, limiting the use of the microscope as an in situ sequencer may lead to compromises relating to one or more parameters such as resolution, time of acquisition, etc.

In some embodiments, disclosed herein is a method of multi-modal iterative in situ assay, for example, for genomics and/or transcriptomics analysis of a biological sample. In some embodiments, one or more parameters and/or reagents that target different analytes for subsequent signal acquisition can be selected or modified based on analysis of signals from one or more previous rounds. In some embodiments, analytes (e.g., nucleic acid analytes and/or protein analytes) in the biological sample are analyzed in a highly multiplexed fashion, for example, while the analytes maintain their original positions in the sample. In some embodiments, the biological sample is an intact tissue sample, and the method does not require physical separation of a portion of the sample, analytes, and/or reagents (e.g., a labeling agent disclosed herein) associated therewith prior to, during, or after the sample is imaged for in situ analysis.

In some aspects, provided herein is an integrated in situ assays for analyzing a biological sample, for example, for analyzing a cell in an intact tissue. In some embodiments, a method disclosed herein comprises a plurality of in situ assay rounds, each using a microscopy readout, e.g., optical detection or sequencing of a barcode sequence of a probe directly or indirectly bound to an analyte. In some embodiments, a first in situ assay round comprises using a microscope to acquire optical signals for analyzing a first set of nucleic acid sequences, for example, by in situ hybridization (e.g., sequential hybridization) and/or in situ sequencing (e.g., using a padlock probes or circularizable probe and rolling circle amplification of ligated padlock probes), under a first magnification in a first region of a sample. Prior to subsequent in situ assay rounds, a result of the first in situ assay round is obtained and analyzed to guide the selection of one or more reagents and/or one or more parameters for a second in situ assay round, such as a second set of nucleic acid sequences, a second region of the sample, and/or a second magnification of the microscope. Likewise, a result of the second in situ assay round can be used to guide the selection of one or more reagents and/or one or more parameters for a third in situ assay round, and so on and so forth. The microscope can operate in a work-horse mode to acquire signals for sequence analysis in an in situ assay round and operate in a flexible microscope mode between in situ assay rounds. In some embodiments, the iterative data acquisition, analysis, and reagent/parameter selection permit a system to "zoom in," "zoom out," and/or "switch field," providing the much needed flexibility for efficient in situ analysis and/or to maximize information gained from the analysis.

In some embodiments, disclosed herein is a method of multi-modal iterative in situ assay, wherein the method allows tuning of specific parameters such as resolution, time of acquisition, etc. In some embodiments, the method comprises tuning or modifying one or more parameters, e.g., objective type, magnification, light source, Z-position, X- or Y-coordinates, depth of sequencing, resolution or length (time) of image acquisition, etc., and/or one or more reagents for an in situ analysis (e.g., primary probe sets, secondary probe sets, and/or detection oligonucleotide sets). In some embodiments, one or more parameters and/or one or more reagents of an in situ assay round are tuned or modified based on the analysis using a set of parameters and/or reagents from an earlier (e.g., a first) in situ assay round. Any one or more in situ assay rounds disclosed herein can be based on in situ hybridization (e.g., sequential hybridization) and/or in situ sequencing. Further, any one or more in situ assay rounds disclosed herein can be targeted or non-targeted (e.g., transcriptomic profiling, for instance, using FISSEQ). In some embodiments, a subsequent in situ assay round is targeted for select analytes.

In some embodiments, a method herein reduces the time of acquisition required for an in situ analysis, compared to a reference in situ analysis performed in a work-horse mode (e.g., where later rounds of the analysis are not performed based on information from one or more earlier rounds). In some embodiments, the method herein reduces the time of acquisition required for an in situ analysis (e.g., genomics or transcriptomics) without negatively affecting another parameter of the analysis, e.g., without reducing resolution, signal to noise, number of molecules assayed, and/or size of the tissue sample analyzed. In some embodiments, the method increases the resolution of analytes in situ compared to the reference analysis in work-horse mode. In some embodiments, the method increases the resolution obtained for an in situ analysis without increasing the time required for the signal acquisition and/or data analysis compared to the reference analysis in work-horse mode. In some embodiments, a method herein provides a more sensitive in situ analysis that may allow increased depth, while minimizing the number and/or the time of detection cycles or rounds needed.

In some embodiments, disclosed herein is a method of in situ sequencing that enables multiple modalities of data acquisition. In some embodiments, the method makes the sequencer more flexible, similarly to a microscope. In some embodiments, disclosed herein is an iterative sequencing approach wherein an upstream panel or modality informs the choice of the following panel or modality. In some embodiments, the method enables users to alternate the operation of the opto-fluidics device between a "microscope mode" and a "sequencer mode," e.g., from a "microscope mode" to a "sequencer mode" and/or from a "sequencer mode" to a "microscope mode," in any suitable order and combination. In some embodiments, the method enables users to alternate between a "sequencer mode" to a "microscope mode" and back one or more times. In some embodiments, the method allows the user to obtain as much biological information as possible (e.g., biological information obtained using different reagents (e.g., probe panels, immunohistochemistry or histology) or different imaging modalities) within the same experiment.

In some embodiments, a method herein comprises contacting a sample with a plurality of barcoded probe sets, each for analyzing an analyte (e.g., biomarker) panel. In some instances, detecting all of the analyte (e.g., biomarker) panels by acquiring and/or analyzing signals from detection probes targeting the barcoded probes all at once in the work-horse mode may take a long time (e.g., to acquire and/or analyze optical signals) and/or is practically impossible, for example, due to optical crowding. For example, in linear barcoding, it may not be feasible to substantially increase the number G of genes assayed, because the number of rounds of imaging scales with G (100-fold more genes requires 100-fold more rounds) and with combinatorial barcoding, increases are limited by spatial overlap between fluorescent spots (optical crowding), because the number of spots scales with G. Recent efforts to ameliorate this latter issue with sparser combinatorial barcodes increase the number of rounds of hybridization and, so far, result in a relatively high rate of false positives (Eng et al., "Transcriptome-scale Super-Resolved Imaging in Tissues by RNA SeqFISH+," Nature 568(7751):235-239 (2019)).

In some embodiments, the method addresses one or more issues relating to performing a highly multiplexed analysis. For example, primary probes which are not detectably (e.g., fluorescently) labeled per se can be hybridized to a panel of target analytes in a sample in one contacting step. Instead of contacting the sample with detectably labeled oligonucleotides that directly or indirectly bind to the primary probes for all of the target analytes and detecting the entire panel in one in situ assay, detectably labeled oligonucleotides targeting a subset of the target analyte panel can be contacted with the sample in two or more separate in situ assay rounds, and the corresponding subsets of target analytes can be detected in separate rounds. By distributing the analytes among a plurality of in situ assay rounds, detection parameters such as resolution and/or time of acquisition can be less limiting. Further, optical signals from an earlier in situ assay round may guide the tuning or adjustment of signals to be detected in a later round. For example, in cases where the number of analytes detected in an in situ assay round may have contributed to optical crowding, the number of analytes to be detected in a subsequent round may be reduced.

In some examples, a first in situ analysis is performed by targeting barcoded probe set $P_1$ with detection oligos to detect $B_1$ (e.g., a pan cell phenotyping biomarker panel), and subsequent in situ assay rounds are performed by switching the detection oligos. For example, in a second in situ assay round, detection oligos targeting barcoded probe sets $P_2$ to $P_i$ for detecting $B_2$ to $B_i$ (e.g., one or more cancer biomarker panels) can be used, and the detection oligos may be again switched in a third in situ assay round to those targeting barcoded probe sets $P_{i+1}$ to $P_j$ for detecting $B_{i+1}$ to $B_j$ (e.g., one or more immune biomarker panels), etc. In some embodiments, one panel is detected and/or analyzed in each in situ assay round. In some embodiments, two or more panels are detected and/or analyzed in each in situ assay round.

In some embodiments, the method comprises a step of defining an area of interest in a sample. In some embodiments, the method comprises screening the sample first (e.g., at a low magnification or low resolution) and then zooming in to the area of interest, e.g., by analyzing the same area of interest or a sub-region thereof under a higher magnification or resolution with the same or different probe sets that target the same or different analyte (e.g., biomarker) panels.

In some embodiments, the method speeds up detection during an in situ analysis. In some embodiments, the method comprises performing low-depth sequence analysis (e.g., sequencing) of analytes in a large sample area (e.g., of the entire sample surface) and then performing deeper sequence analysis (e.g., sequencing) of analytes in an area of interest within in the larger sample area. In some embodiments, the area of interest is selected based on the low-depth sequence analysis (e.g., sequencing) of analytes in the larger sample area. In some embodiments, the method is iterative, comprising low-depth sequence analysis (e.g., sequencing) of analytes in the larger area followed by deeper sequence analysis (e.g., sequencing) of analytes in the area of interest, and even deeper sequence analysis (e.g., sequencing) of analytes in a sub-area of the area of interest. In some embodiments, the iterative method is faster than performing deep sequence analysis (e.g., sequencing) of analytes in the full large sample area. In any of the embodiments, a deeper sequencing can comprise more sequencing reads, e.g., by sequencing a nucleic acid sequence (e.g., genomic region, cDNA or mRNA) multiple times, sometimes hundreds or even thousands of times.

In some embodiments, a method disclosed herein comprises one or more assay modules that do not involve in situ sequence analysis, e.g., in situ hybridization (e.g., sequential hybridization) and/or in situ sequencing. The one or more assay modules may detect and/or analyze a nucleic acid analyte and/or a non-nucleic acid analyte, such as a protein. The one or more assay modules may involve staining a sample with a dye, including fluorescent dyes or non-fluorescent dyes, prior to, during, or after one or more in situ assay rounds. In some embodiments, the information contained within or conveyed by the sequencing readouts (e.g., optical sequencing readouts from an in situ analysis) may be used to overlay the readout onto an image of the biological sample (e.g., a sample stained with one or more dyes) and/or information contained within or conveyed by other sequencing readouts. Depending on the resolution of the methods described herein, an image of a biological sample may be obtained from the same position of nucleic acid analysis. In some embodiments, an image of a biological sample may be obtained from a region adjacent to the positions of nucleic acid analysis. Sequencing techniques known in the art may be used to complement the information derived from nucleic acid analysis, depending on the sensitivity of the methods described herein.

In some embodiments, a method disclosed herein comprises detecting one or more analytes in an area of interest, which analyte(s) can be the same as or different from one or more analytes detected in an in situ assay round, e.g., in order to determine the area of interest. For example, in cases where one or more in situ assay rounds detect RNA transcripts, an analyte other than RNA transcripts (e.g., a DNA analyte or protein analyte) may be detected in an area of interest, e.g., in order to determine the area of interest. In some embodiments, the area of interest is determined based on detection of proteins (e.g., with antibody staining). In some embodiments, the area of interest can be determined based on a sample staining such as H&E staining or any one or more staining methods described in Section III-C-vi. In some embodiments, the area of interest of an in situ assay round is determined based on a prior analyte detection or sequence analysis (e.g., nucleic acid hybridization and/or sequencing), such as an earlier in situ assay round that detects the same or different analytes, with or without changing microscope settings such as objective, light source, etc.

In some embodiments, the method comprises detecting or sequencing analytes in a sample at a first sequencing depth in an in situ assay round, and one or more subsequent in situ assay rounds that provide a greater sequencing depth for one or more analytes sequenced at the first sequencing depth. In some embodiments, greater sequencing depth for one or more analytes comprises more sequencing reads for said one or more analytes, e.g., by sequencing a nucleic acid sequence (e.g., genomic region, cDNA or mRNA) multiple times, sometimes hundreds or even thousands of times.

In some embodiments, the method comprises, based on a finding in an initial in situ assay round, switching probes panels (e.g., to target a different analyte or a different set of analytes) in one or more subsequent in situ assay rounds. In some embodiments, the method comprises iterative probe switching from module to module.

In some embodiments, the method allows for tissue-level (e.g., niche-level) in situ analysis followed by cell-level and/or intra-cellular analysis. In some embodiments, the method comprises first detecting a cell type of interest (e.g., a neuronal cell type of interest) followed by zooming in to perform cell-level analysis (e.g., detecting a particular mRNA transcript in two neurons forming a synapse) and/or intra-cellular spatial analysis of a molecule of interest (e.g., detecting localized mRNA translation at the synapse).

A sample disclosed herein can be stained with as many probes as needed, for as many analytes (e.g., DNA loci or mRNA transcripts) as needed. For example, probes for detecting 10, 100, 1000, 10,000, 20,000, 30,000, or 40,000 analytes, such as genes (e.g., DNA loci or mRNA transcripts), can be contacted with a tissue sample. In some embodiments, the method allows a user to choose the analytes to detect and/or analyze in one or more in situ modules. In some embodiments, multiple rounds of analysis (e.g., decoding) are iteratively performed in such a way that an "early round" informs a "later round." For example, a first round of analysis (e.g., decoding in a first in situ assay round) can inform one or more additional and subsequent rounds of analysis (e.g., decoding in subsequent in situ assay rounds). In some embodiments, a second round of decoding can inform a third round of decoding, a third round can inform a fourth round, and so on. In some embodiments of the method, multiple objectives can be used at each given time (e.g., during decoding in each given in situ assay round) to increase or decrease magnification. In some embodiments, probes (e.g., primary probes) targeting a plurality of analytes are detected by contacting the sample with detection oligos at each in situ assay round (e.g., during each round of decoding). In some embodiments, the method comprises contacting the sample with a plurality of primary probes that are not all rendered in the in situ assay. In some embodiments, the method comprises contacting the sample with a plurality of primary probes where one or more of the primary probes are rendered in two or more (e.g., all) rounds of probe detection and/or analysis in the in situ assay. The one or more primary probes may serve as a control across the multiple rounds which may be consecutive rounds or temporally separated by one or more rounds.

In some embodiments, the method comprises contacting the sample (e.g., tissue) with a plurality of probes or functional panels. In some embodiments, the plurality of functional panels comprises a plurality of analyte (e.g., biomarker) panels. In particular examples, the plurality of functional panels can comprise about 10,000 probes for about 3,000 genes. In some embodiments, the genes comprise one or more sets of analyte (e.g., biomarker) panels (e.g., cell type panels, cell phenotyping panels, pathway activity marker panels, etc.).

In some embodiments, the method comprises decoding a first subset of probes using a low magnification objective (e.g., a 4× magnification or lower magnification objective). In some embodiments, the method comprises decoding the first subset of probes over a large area of the sample (e.g., 50 mm×50 mm). In some embodiments, the first analysis is run based on the first subset of probes decoded at a low magnification objective and/or over a large area of the sample. In some embodiments, a cell image is displayed based on the first analysis. In some embodiments, the method further comprises selecting an area of interest based on the observed cell population (e.g., selecting cells based on cell type, activity, or cell phenotype). In some embodiments, selecting the area of interest comprises switching to a higher magnification objective (e.g., a 40× objective). In some embodiments, the method further comprises rendering a second subset of probes using the second set of imaging parameters (e.g., field of view and/or magnification). In some embodiments, the method of in situ sequencing is both multi-modal (change of imaging modalities (e.g., objectives) or probe panels) and iterative (choice of subsequent modalities depends on the previous analysis). In some embodiments, the choice of a deep sequencing probe panel depends on the analysis of the previous less deep panel.

In some embodiments, the method comprises improving sample stability by one or more reactions, such as fixation, crosslinking, and/or embedding (e.g., in a matrix). In some embodiments, the method comprises stabilizing the sample by hydrogel sample embedding and/or exchange of tissue. In some embodiments, the stabilizing comprises locking molecules of interest in place. In some embodiments, the stabilizing comprises locking molecules of interest to a hydrogel.

In some embodiments, the one or more reactions are performed prior to the detection step. In some embodiments, the one or more reactions are performed prior to, during, or after contacting a sample with barcoded probes, e.g., probe sets $P_1, \ldots, P_k, \ldots,$ and $P_n$ for analyzing analyte (e.g., biomarker) panels $B_1, \ldots, B_k, \ldots,$ and $B_n$, respectively, wherein k and n are integers and $2 \leq k \leq n$. In some embodiments, the one or more reactions are performed prior to, during, or after contacting the sample with a first plurality of detectably labeled oligonucleotides for analyzing one or more sets in the barcoded probe sets. In some embodiments, the one or more reactions are performed prior to, during, or after detecting the first plurality of detectably labeled oligonucleotides using a microscope at a first magnification. In some embodiments, the one or more reactions are performed prior to, during, or after analyzing the one or more analyte (e.g., biomarker) panels corresponding to the one or more sets in a first region of the sample. In some embodiments, the one or more reactions are performed prior to, during, or after contacting the sample with a second plurality of detectably labeled oligonucleotides for analyzing another one or more sets of the plurality of barcoded probe sets. In some embodiments, the one or more reactions are performed prior to, during, or after imaging the sample or a region thereof using the microscope at a second magnification. In some embodiments, the one or more reactions are performed prior to, during, or after analyzing one or more analyte (e.g., biomarker) panels in a second region of the sample.

In some embodiments, disclosed herein is an automated method of multi-modal iterative in situ assay. In some embodiments, a machine learning and/or artificial intelligence program controls automation of the method. In some embodiments, the method can be automated without using an automation program.

In some embodiments, the method is coupled with an image analysis software that combines the signal from multiple objectives and/or from multiple iterations. In some embodiments, combining the signal from multiple objectives and/or from multiple iterations allows the user to browse and/or zoom into the images while also integrating the data. In some embodiments, the method allows the software to browse images and select downstream modalities while integrating the data from multiple modalities.

II. Analytes and Labelling Agents

A nucleic acid in a sample that may be processed and/or analyzed using a method disclosed herein may be or be comprised in an analyte (e.g., a nucleic acid analyte, such as genomic DNA, mRNA transcript, or cDNA, or a product thereof, such as an RCA product) and/or may be or be comprised in a labelling agent for one or more analytes (e.g., a nucleic acid analyte or a non-nucleic acid analyte) in a sample. Exemplary analytes and labelling agents are described below.

A. Analytes

The methods, compositions, apparatus, and systems described in this disclosure can be used to detect and analyze a wide variety of different analytes. In some aspects, an analyte disclosed herein can include any biological substance, structure, moiety, or component to be analyzed. In some aspects, a target disclosed herein may similarly include any analyte of interest, such as a biomarker.

The systems, apparatus, methods, and compositions can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample. In some embodiments, each analyte panel comprises 1, 2, 3, 4, 5, 6, 7, 8, 9, 10, or more analytes (e.g., biomarkers). In some embodiments, any one or more of the analyte panels can comprise about 1, about 5, about 10, about 25, about 50, about 100, about 250, about 500, about 1,000, about 2,500, about 5,000 or more analytes (e.g., biomarkers).

Analytes can be derived from a specific type of cell and/or a specific subcellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for in situ analysis) to the analytes in the cell or cell compartment or organelle.

Analytes can be broadly classified into one of two groups: nucleic acid analytes, and non-nucleic acid analytes. A method disclosed herein can be used to analyze nucleic acid analytes and/or non-nucleic acid analytes in any suitable combination.

In some aspects, a method disclosed herein comprises analyzing one or more first analytes (e.g., one or more nucleic acid analytes and/or one or more non-nucleic acid analytes) in a sample under a first magnification of a microscope and/or in a first region of the sample. In some aspects, the method further comprises, based on information from the analysis of the one or more first analytes, selecting one or more second analytes (e.g., one or more nucleic acid analytes and/or one or more non-nucleic acid analytes), selecting a second magnification of the microscope, and/or selecting a second region of the sample for analyzing the one or more second analytes. In some aspects, the one or more first analytes and the one or more second analytes are the same. In some aspects, the one or more first analytes and the one or more second analytes are different. The one or more first analytes and the one or more second analytes can be non-overlapping or have one or more common analytes. The one or more first analytes can have more analytes or fewer analytes than the one or more second analytes. In other embodiments, the one or more first analytes and the one or more second analytes have the same number of analytes. The first and second magnifications of the microscope can be the same or different. The first and second regions of the sample can be the same or different. In some embodiments, the one or more first analytes and the one or more second analytes are different, the first and second magnifications are different, and/or the first and second regions of the sample are different.

In some aspects, a method disclosed herein comprises analyzing a first plurality of analytes (e.g., one or more nucleic acid analytes and/or one or more non-nucleic acid analytes) in a sample under a first magnification of a microscope and/or in a first region of the sample. In some aspects, the method further comprises, based on information from the analysis of the first plurality of analytes, selecting a second plurality of analytes (e.g., one or more nucleic acid analytes and/or one or more non-nucleic acid analytes), selecting a second magnification of the microscope, and/or selecting a second region of the sample for analysis. In some aspects, the first and second pluralities of analytes are the same. In some aspects, the first and second pluralities of analytes are different. The first and second pluralities of analytes can be non-overlapping or have one or more common analytes. The first plurality of analytes can have more analytes or fewer analytes than the second plurality of analytes. In other embodiments, the first plurality of analytes have the same number of analytes as the second plurality of analytes. The first and second magnifications of the microscope can be the same or different. The first and second regions of the sample can be the same or different. In some embodiments, the first and second pluralities of analytes are different, the first and second magnifications are different, and/or the first and second regions of the sample are different.

In some aspects, a method disclosed herein comprises analyzing a first plurality of nucleic acid analytes in a sample under a first magnification of a microscope and/or in a first region of the sample. In some aspects, the method further comprises, based on information from the analysis of the first plurality of nucleic acid analytes, selecting a second plurality of nucleic acid analytes, selecting a second magnification of the microscope, and/or selecting a second region of the sample for analysis. In some aspects, the method further comprises analyzing the second plurality of nucleic acid analytes under the second magnification in the second region of the sample. In some aspects, the second plurality contains more nucleic acid analytes than the first plurality. In some aspects, the second plurality contains fewer nucleic acid analytes than the first plurality. In some aspects, the second plurality contains the same number of nucleic acid analytes as the first plurality. In some aspects, the first and second pluralities contain one or more common nucleic acid analytes. In some aspects, the first and second pluralities do not contain a common nucleic acid analyte. The first and second magnifications of the microscope can be the same or different. The first and second regions of the sample can be the same or different. In some embodiments, the first and second pluralities of nucleic acid analytes are different, the first and second magnifications are different, and/or the first and second regions of the sample are different.

Examples of nucleic acid analytes include DNA analytes such as genomic DNA, methylated DNA, specific methylated DNA sequences, fragmented DNA, mitochondrial DNA, in situ synthesized PCR products, and RNA/DNA hybrids.

Examples of nucleic acid analytes also include RNA analytes such as various types of coding and non-coding RNA. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. Additional examples of RNA analytes include rRNA, tRNA, miRNA, and viral RNA. The RNA can be a transcript (e.g., present in a tissue section). The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In any of the embodiments herein, the method can comprise analyzing one or more non-nucleic acid analytes, such as protein analytes. In some embodiments, each non-nucleic acid analyte is linked to a labelling agent, e.g., an antibody or antigen binding fragment thereof linked to a reporter oligonucleotide.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some embodiments, the analyte is inside a cell or on a cell surface, such as a transmembrane analyte or one that is attached to the cell membrane. In some embodiments, the analyte can be an organelle (e.g., nuclei or mitochondria). In some embodiments, the analyte is an extracellular analyte, such as a secreted analyte.

Cell surface features corresponding to analytes can include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

In certain embodiments, an analyte or a complex or product thereof may be immobilized in a sample, e.g., to one or more other molecules within the sample and/or within a matrix, generally at the location of the analyte within a native biological sample, e.g., under a physiological or pathological condition and/or while the sample is live. The analyte or a complex or product thereof may be immobilized within the sample and/or matrix by steric factors. The analyte or a complex or product thereof may also be immobilized within the sample and/or matrix by covalent or noncovalent bonding. In this manner, the analyte or a complex or product thereof may be considered to be attached to the sample or matrix. By being immobilized to the sample and/or matrix, such as by covalent bonding or cross-linking, the size and/or spatial relationship of the analyte or a complex or product thereof can be maintained. By being immobilized to the sample and/or matrix, such as by covalent bonding or cross-linking, the analyte or a complex or product thereof is resistant to movement or unraveling under mechanical stress.

B. Labelling Agents

In some embodiments, an analyte labelling agent (also referred to at times as a "capture agent") may include an agent that interacts with an analyte (e.g., an analyte in a sample) and with a probe to identify the analyte. In some embodiments, the sample may be contacted with one or more labelling agents prior to, during, or after an in situ assay. In some embodiments, the method comprises one or more post-fixing (also referred to as post-fixation) steps after contacting the sample with one or more labelling agents. In some embodiments, the analyte labelling agent comprises an analyte binding moiety and a labelling agent barcode domain (e.g., an analyte binding moiety barcode).

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected, e.g., using sequencing or array technologies.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry such as a Methyltetrazine-PEG5-NHS Ester reaction, a TCO-PEG4-NHS Ester reaction, or the like, may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some embodiments, the reporter oligonucleotides are releasable from the labelling agent, such as upon application of a stimulus. For example, the reporter oligonucleotide may be attached to the labeling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing, such as an adapter sequence, a unique molecular identifier (UMI) sequence, a sequencer specific flow cell attachment sequence (such as an P5, P7, or partial P5 or P7 sequence), a primer or primer binding sequence, a sequencing primer or primer binding sequence (such as an R1, R2, or partial R1 or R2 sequence).

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

Figure 5:
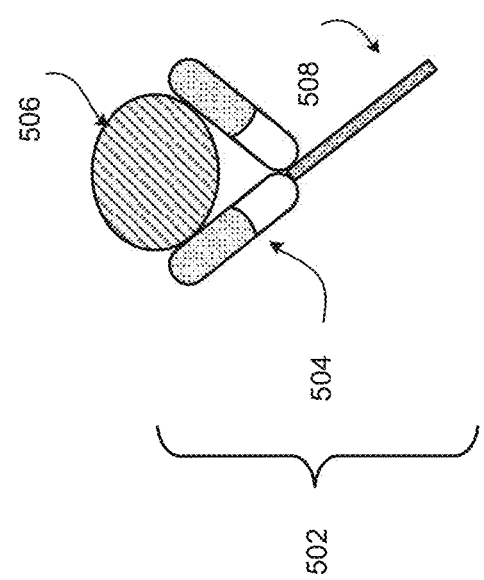
FIG. 5 is a schematic diagram of an exemplary labelling agent.

FIG. 5 is a schematic diagram of an exemplary labelling agent 502 comprising an analyte binding moiety 504 and a reporter 508. The labelling agent 502, via the analyte binding moiety 504, is capable of binding to an analyte 506. The analyte binding moiety can bind to the analyte 506 with high affinity and/or with high specificity. The reporter 508 can comprise a nucleic acid (e.g., a reporter oligonucleotide). The analyte binding moiety 504 can include a polypeptide and/or an aptamer (e.g., an oligonucleotide or peptide molecule that binds to a specific target analyte). The analyte binding moiety 504 can include an antibody or antibody fragment (e.g., an antigen-binding fragment).

Figure 6:
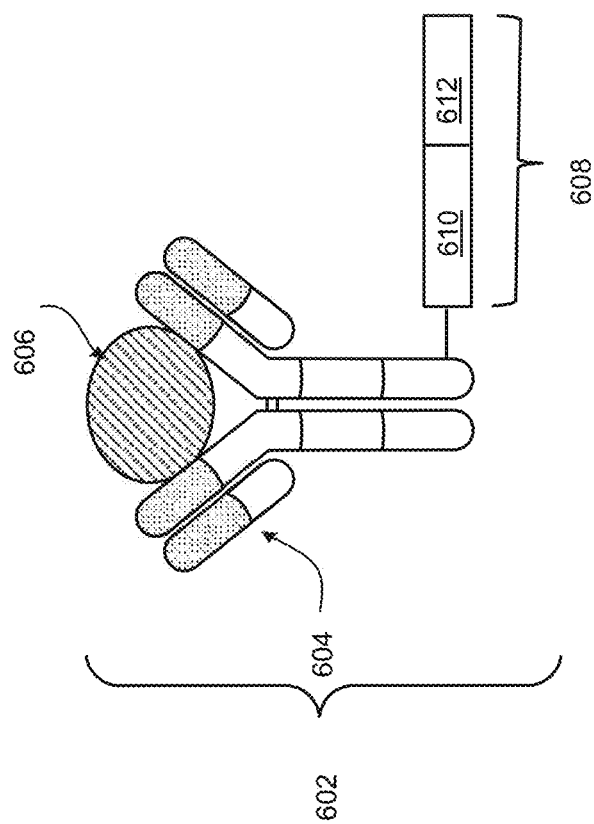
FIG. 6 is a schematic diagram of an exemplary labelling agent.

FIG. 6 is a schematic diagram of another exemplary labelling agent 602 comprising an analyte binding moiety 604 and a reporter oligonucleotide 608. The analyte binding moiety 604 may comprise an antibody or antigen binding fragment thereof that specifically binds to an analyte 606. In some instances, the reporter oligonucleotide 608 can comprise one or more barcode domains 610 and optionally, an additional sequence 612, such as one or more functional sequences.

In some embodiments, an analyte binding moiety may include any molecule or moiety capable of binding to an analyte (e.g., a biological analyte, e.g., a macromolecular constituent). In some embodiments, disclosed herein is a method wherein the analyte binding moiety that binds to a biological analyte can include, but is not limited to, an antibody, or an epitope binding fragment thereof, a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The analyte binding moiety can bind to the macromolecular constituent (e.g., analyte) with high affinity and/or with high specificity. The analyte binding moiety can include a nucleotide sequence (e.g., an oligonucleotide), which can correspond to at least a portion or an entirety of the analyte binding moiety. The analyte binding moiety can include a polypeptide and/or an aptamer (e.g., a polypeptide and/or an aptamer that binds to a specific target molecule, e.g., an analyte). The analyte binding moiety can include an antibody or antibody fragment (e.g., an antigen-binding fragment) that binds to a specific analyte (e.g., a polypeptide).

As used herein, the term "analyte binding moiety barcode" refers to a barcode that is associated with or otherwise identifies the analyte binding moiety. In some embodiments, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some embodiments, an analyte binding moiety includes one or more antibodies or antigen binding fragments thereof. The antibodies or antigen binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte labelling agents comprising a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte labelling agents are the same. In some embodiments in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety, and the cell can be subjected to spatial analysis (e.g., any of the variety of spatial analysis methods described herein). Non-limiting aspects of spatial analysis methodologies are described in U.S. Pat. Pub. Nos. 10,308,982; 9,879,313; 9,868,979; Liu et al., *bioRxiv* 788992, 2020; U.S. Pat. Pub. No. 10,774,372; 10,774,374; WO 2018/091676; U.S. Pat. Pub. No. 10,030,261; 9,593,365; 10,002,316; 9,727,810; 10,640,816; Rodrigues et al., *Science* 363(6434):1463-1467, 2019; Lee et al., *Nat. Protoc.* 10(3):442-458, 2015; U.S. Pat. Pub. No. 10,179,932; 10,138,509; Trejo et al., *PLoS ONE* 14(2):e0212031, 2019; U.S. Patent Application Publication Nos. 2018/0245142; 2019/0177718; Chen et al., *Science* 348(6233):aaa6090, 2015; Gao et al., *BMC Biol.* 15:50, 2017; US 2018/0372736; U.S. Patent Application Publication Nos. 2019/0161796; 2020/0224244; 2019/0194709; US 2013/0171621; U.S. Pat. Nos. 7,709,198; 8,604,182; 8,951,726; 9,783,841; 10,041,949; US 2016/0108458; U.S. Pat. No. 11,008,608; 10,370,698; 10,724,078; 10,364,457; 10,317,321; 10,995,361; U.S. Patent Application Publication Nos. 2017/0241911; 2017/0029875; U.S. Pat. No. 10,059,990; US 2020/0080136; and Gupta et al., *Nature Biotechnol.* 36:1197-1202, 2018, the contents of each of which are herein incorporated by reference in their entirety, and can be used herein in any combination. Further non-limiting aspects of spatial analysis methodologies are described herein.

III. Samples and Sample Processing

A sample disclosed herein can be or comprise any suitable biological sample and/or a sample derived therefrom. A sample may be provided on a substrate or on or in a support. Exemplary biological samples, substrates/supports, and methods of sample processing are described below.

A. Biological Samples

A sample disclosed herein can be or derived from any biological sample. In some embodiments, disclosed herein are methods and compositions for analyzing a biological sample, which may be obtained from a subject for analysis using any of a variety of techniques including, but not limited to, biopsy, surgery, and laser capture microscopy (LCM), and generally includes cells and/or other biological material from the subject. In addition to the subjects described above, a biological sample can also be obtained from a prokaryote such as a bacterium; an archaea; a virus such as Hepatitis C virus or human immunodeficiency virus; or a viroid. A biological sample can be obtained from non-mammalian organisms (e.g., a plants, an insect, an arachnid, a nematode, a fungi, or an amphibian). A biological sample can also be obtained from a eukaryote, such as a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some embodiments, the biological sample may comprise cells which are deposited on a surface.

Cell-free biological samples can include extracellular polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells.

Biological samples can also include fetal cells. For example, a procedure such as amniocentesis can be performed to obtain a fetal cell sample from maternal circulation. Sequencing of fetal cells can be used to identify any of a number of genetic disorders, including, e.g., aneuploidy such as Down's syndrome, Edwards syndrome, and Patau syndrome. Further, cell surface features of fetal cells can be used to identify any of a number of disorders or diseases.

Biological samples can also include immune cells. Sequence analysis of the immune repertoire of such cells, including genomic, proteomic, and cell surface features, can provide a wealth of information to facilitate an understanding the status and function of the immune system. By way of example, determining the status (e.g., negative or positive) of minimal residue disease (MRD) in a multiple myeloma (MM) patient following autologous stem cell transplantation is considered a predictor of MRD in the MM patient (see, e.g., U.S. Patent Application Publication No. 2018/0156784, the entire contents of which are incorporated herein by reference).

Examples of immune cells in a biological sample include, but are not limited to, B cells, T cells (e.g., cytotoxic T cells, natural killer T cells, regulatory T cells, and T helper cells), natural killer cells, cytokine induced killer (CIK) cells, myeloid cells, such as granulocytes (basophil granulocytes, eosinophil granulocytes, neutrophil granulocytes/hypersegmented neutrophils), monocytes/macrophages, mast cells, thrombocytes/megakaryocytes, and dendritic cells.

As discussed above, a biological sample can include a single analyte of interest, or more than one analyte of interest. Methods for performing multiplexed assays to analyze two or more different analytes in a single biological sample are provided.

B. Substrates and Supports

In alternative embodiments, disclosed herein are methods and compositions for analyzing analytes within sample on a substrate, e.g., a solid support, and can include a two-dimensional (2D) surface or a three-dimensional (3D) matrix. In some embodiments, a 2D substrate may comprise a molecular array comprising a 2D surface of single-molecules of proteins, RNA, or DNA. In some embodiments, a 2D molecular array comprises a 2D surface of amplicons, derived from single-molecules of proteins, RNA, or DNA. In some embodiments, a 2D surface may comprise a glass, plastic, or metal surface. In some embodiments, a 2D surface may comprise a glass, plastic or metal surface coated with a polymer, particle, protein, or combination thereof.

In some embodiments, the sample comprises a 3D matrix of single-molecules of proteins, RNA, or DNA. In some embodiments, a 3D matrix comprises a plurality of amplicons, derived from single-molecules of proteins, RNA or DNA. In some embodiments, a 3D matrix may comprise a network of biological molecules that are chemically cross-linked. In some embodiments, a 3D matrix may comprise a synthetic polymer or hydrogel.

In some embodiments, a substrate herein can be any support that is insoluble in aqueous liquid and which allows for positioning of biological samples, analytes, features, and/or reagents (e.g., probes) on the support. In some embodiments, a biological sample can be attached to a substrate. Attachment of the biological sample can be irreversible or reversible, depending upon the nature of the sample and subsequent steps in the analytical method. In certain embodiments, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. Hydrogels are examples of polymers that are suitable for this purpose.

In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

In addition, in some embodiments, a substrate (e.g., the same substrate or a different substrate) can be used to provide support to a biological sample, particularly, for example, a thin tissue section. Accordingly, a "substrate" is a support that is insoluble in aqueous liquid and which allows for positioning of biological samples, analytes, features, and/or probes on the substrate.

A wide variety of different substrates can be used for the foregoing purposes. In general, a substrate can be any suitable support material. Exemplary substrates include, but are not limited to, glass, modified and/or functionalized glass, hydrogels, films, membranes, plastics (including e.g., acrylics, polystyrene, copolymers of styrene and other materials, polypropylene, polyethylene, polybutylene, polyurethanes, Teflon™, cyclic olefins, polyimides etc.), nylon, ceramics, resins, Zeonor, silica or silica-based materials including silicon and modified silicon, carbon, metals, inorganic glasses, optical fiber bundles, and polymers, such as polystyrene, cyclic olefin copolymers (COCs), cyclic olefin polymers (COPs), polypropylene, polyethylene and polycarbonate.

The substrate can also correspond to a flow cell. Flow cells can be formed of any of the foregoing materials, and can include channels that permit reagents, solvents, features, and molecules to pass through the cell.

Among the examples of substrate materials discussed above, polystyrene is a hydrophobic material suitable for binding negatively charged macromolecules because it normally contains few hydrophilic groups. For nucleic acids immobilized on glass slides, by increasing the hydrophobicity of the glass surface the nucleic acid immobilization can be increased. Such an enhancement can permit a relatively more densely packed formation (e.g., provide improved specificity and resolution).

In some embodiments, a substrate is coated with a surface treatment such as poly(L)-lysine. Additionally or alternatively, the substrate can be treated by silanation, e.g. with epoxy-silane, amino-silane, and/or by a treatment with polyacrylamide.

The substrate can generally have any suitable form or format. For example, the substrate can be flat, curved, e.g. convexly or concavely curved towards the area where the interaction between a biological sample, e.g. tissue sample, and the substrate takes place. In some embodiments, the substrate is a flat, e.g., planar, chip or slide. The substrate can contain one or more patterned surfaces within the substrate (e.g., channels, wells, projections, ridges, divots, etc.).

A substrate can be of any desired shape. For example, a substrate can be typically a thin, flat shape (e.g., a square or a rectangle). In some embodiments, a substrate structure has rounded corners (e.g., for increased safety or robustness). In some embodiments, a substrate structure has one or more cut-off corners (e.g., for use with a slide clamp or crosstable). In some embodiments, where a substrate structure is flat, the substrate structure can be any appropriate type of support having a flat surface (e.g., a chip or a slide such as a microscope slide).

Substrates can optionally include various structures such as, but not limited to, projections, ridges, and channels. A substrate can be micropatterned to limit lateral diffusion of one or more analytes and/or reagents. A substrate modified with such structures can be modified to allow association of analytes, features, or probes at individual sites. For example, the sites where a substrate is modified with various structures can be contiguous or non-contiguous with other sites.

In some embodiments, the surface of a substrate can be modified so that discrete sites are formed that can only have or accommodate a single feature. In some embodiments, the surface of a substrate can be modified so that features adhere to random sites.

In some embodiments, the surface of a substrate is modified to contain one or more wells, using techniques such as (but not limited to) stamping techniques, microetching techniques, and molding techniques. In some embodiments in which a substrate includes one or more wells, the substrate can be a concavity slide or cavity slide. For example, wells can be formed by one or more shallow depressions on the surface of the substrate. In some embodiments, where a substrate includes one or more wells, the wells can be formed by attaching a cassette (e.g., a cassette containing one or more chambers) to a surface of the substrate structure.

In some embodiments, a substrate includes one or more markings on a surface of the substrate, e.g., to provide guidance for correlating spatial information with the characterization of the analyte of interest. For example, a substrate can be marked with a grid of lines (e.g., to allow the size of objects seen under magnification to be easily estimated and/or to provide reference areas for counting objects). In some embodiments, fiducial markers can be included on the substrate. Such markings can be made using techniques including, but not limited to, printing, sandblasting, and depositing on the surface.

In some embodiments where the substrate is modified to contain one or more structures, including but not limited to wells, projections, ridges, or markings, the structures can include physically altered sites. For example, a substrate modified with various structures can include physical properties, including, but not limited to, physical configurations, magnetic or compressive forces, chemically functionalized sites, chemically altered sites, and/or electrostatically altered sites.

In some embodiments where the substrate is modified to contain various structures, including but not limited to wells, projections, ridges, or markings, the structures are applied in a pattern. Alternatively, the structures can be randomly distributed.

In some embodiments, a substrate is treated in order to minimize or reduce non-specific analyte hybridization within or between features. For example, treatment can include coating the substrate with a hydrogel, film, and/or membrane that creates a physical barrier to non-specific hybridization. Any suitable hydrogel can be used. For example, hydrogel matrices prepared according to the methods set forth in U.S. Pat. Nos. 6,391,937, 9,512,422, and 9,889,422, and U.S. Patent Application Publication Nos. U.S. 2017/0253918 and U.S. 2018/0052081, can be used. The entire contents of each of the foregoing documents are incorporated herein by reference.

Treatment can include adding a functional group that is reactive or capable of being activated such that it becomes reactive after receiving a stimulus (e.g., photoreactive). Treatment can include treating with polymers having one or more physical properties (e.g., mechanical, electrical, magnetic, and/or thermal) that minimize non-specific binding (e.g., that activate a substrate at certain locations to allow analyte hybridization at those locations).

The substrate (e.g., a biological sample, or a feature on an array) can include tens to hundreds of thousands or millions of individual oligonucleotide molecules (e.g., at least about 10,000, 50,000, 100,000, 500,000, 1,000,000, 10,000,000, 100,000,000, 1,000,000,000, or 10,000,000,000 oligonucleotide molecules).

In some embodiments, the surface of the substrate is coated with a cell-permissive coating to allow adherence of live cells. A "cell-permissive coating" is a coating that allows or helps cells to maintain cell viability (e.g., remain viable) on the substrate. For example, a cell-permissive coating can enhance cell attachment, cell growth, and/or cell differentiation, e.g., a cell-permissive coating can provide nutrients to the live cells. A cell-permissive coating can include a biological material and/or a synthetic material. Non-limiting examples of a cell-permissive coating include coatings that feature one or more extracellular matrix (ECM) components (e.g., proteoglycans and fibrous proteins such as collagen, elastin, fibronectin and laminin), poly-lysine, poly (L)-ornithine, and/or a biocompatible silicone (e.g., CYTOSOFT®). For example, a cell-permissive coating that includes one or more extracellular matrix components can include collagen Type I, collagen Type II, collagen Type IV, elastin, fibronectin, laminin, and/or vitronectin. In some embodiments, the cell-permissive coating includes a solubilized basement membrane preparation extracted from the Engelbreth-Holm-Swarm (EHS) mouse sarcoma (e.g., MATRIGEL®). In some embodiments, the cell-permissive coating includes collagen. A cell-permissive coating can be used to culture adherent cells, or to maintain cell viability of a tissue sample or section while in contact with an array.

C. Processing of Biological Samples

A variety of steps can be performed to prepare or process a biological sample for and/or during an assay. Except where indicated otherwise, the preparative or processing steps described below can generally be combined in any manner and in any order to appropriately prepare or process a particular sample for and/or analysis, e.g., an in situ assay disclosed herein.

In some embodiments, the sample can be treated with one or more reagents useful for an assay such as an in situ assay. In some embodiments, the sample can be treated with one or more enzymes. For example, one or more endonucleases to fragment DNA, DNA polymerase enzymes, and dNTPs used to amplify nucleic acids can be added. Other enzymes that can also be added to the sample include, but are not limited to, polymerase, transposase, ligase, and DNAse, and RNAse. In some embodiments, reverse transcriptase enzymes can be added to the sample, including enzymes with terminal transferase activity, primers, and switch oligonucleotides. Template switching can be used to increase the length of a cDNA, e.g., by appending a predefined nucleic acid sequence to the cDNA. In some embodiments, the cDNA may be analyzed during an in situ assay.

i. Tissue Sectioning

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 µm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 µm. Thicker sections can also be used if desired or convenient, e.g., at least 70, 80, 90, or 100 µm or more. Typically, the thickness of a tissue section is between 1-100 µm, 1-50 µm, 1-30 µm, 1-25 µm, 1-20 µm, 1-15 µm, 1-10 µm, 2-8 µm, 3-7 µm, or 4-6 µm, but as mentioned above, sections with thicknesses larger or smaller than these ranges can also be analysed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analysed successively to obtain three-dimensional information about the biological sample.

ii. Freezing

In some embodiments, the biological sample (e.g., a tissue section as described above) can be prepared by deep freezing at a temperature suitable to maintain or preserve the integrity (e.g., the physical characteristics) of the tissue structure. Such a temperature can be, e.g., less than −20° C., or less than −25° C., −30° C., −40° C., −50° C., −60° C., −70° C., −80° C. −90° C., −100° C., −110° C., −120° C., −130° C., −140° C., −150° C., −160° C., −170° C., −180° C., −190° C., or −200° C. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C.

iii. Formalin Fixation and Paraffin Embedding

In some embodiments, the biological sample can be prepared using formalin-fixation and paraffin-embedding (FFPE), which are established methods. In some embodiments, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

iv. Fixation

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some embodiments, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some embodiments, the methods provided herein comprises one or more post-fixing (also referred to as postfixation) steps. In some embodiments, one or more post-fixing step is performed after contacting a sample with a polynucleotide disclosed herein, e.g., one or more probes such as a circular or padlock probe. In some embodiments, one or more post-fixing step is performed after a hybridization complex comprising a probe and a target is formed in a sample. In some embodiments, one or more post-fixing step is performed prior to a ligation reaction disclosed herein, such as the ligation to circularize a padlock probe.

In some embodiments, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some embodiments, the labelling agent can comprise a reporter oligonucleotide comprising one or more barcode sequences.

A post-fixing step may be performed using any suitable fixation reagent disclosed herein, for example, 3% (w/v) paraformaldehyde in DEPC-PBS.

v. Embedding

As an alternative to paraffin embedding described above, a biological sample can be embedded in any of a variety of other embedding materials to provide structural substrate to the sample prior to sectioning and other handling steps. In general, the embedding material is removed prior to analysis of tissue sections obtained from the sample. Suitable embedding materials include, but are not limited to, waxes, resins (e.g., methacrylate resins), epoxies, and agar.

In some embodiments, the biological sample can be embedded in a hydrogel matrix. Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some embodiments, the hydrogel is formed such that the hydrogel is internalized within the biological sample.

In some embodiments, the biological sample is immobilized in the hydrogel via cross-linking of the polymer material that forms the hydrogel. Cross-linking can be performed chemically and/or photochemically, or alternatively by any other hydrogel-formation method known in the art.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 µm to about 2 mm.

Additional methods and aspects of hydrogel embedding of biological samples are described for example in Chen et al., *Science* 347(6221):543-548, 2015, the entire contents of which are incorporated herein by reference.

vi. Staining and Immunohistochemistry (IHC)

To facilitate visualization, biological samples can be stained using a wide variety of stains and staining techniques. In some embodiments, for example, a sample can be stained using any number of stains and/or immunohistochemical reagents. One or more staining steps may be performed to prepare or process a biological sample for an assay described herein or may be performed during and/or after an assay. In some embodiments, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some embodiments, cells in the sample can be segmented using one or more images taken of the stained sample.

In some embodiments, the stain is performed using a lipophilic dye. In some examples, the staining is performed with a lipophilic carbocyanine or aminostyryl dye, or analogs thereof (e.g, DiI, DiO, DiR, DiD). Other cell membrane stains may include FM and RH dyes or immunohistochemical reagents specific for cell membrane proteins. In some examples, the stain may include but is not limited to, acridine orange, acid fuchsin, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine, or derivatives thereof. In some embodiments, the sample may be stained with haematoxylin and eosin (H&E).

In some embodiments, biological samples can be destained. Methods of destaining or discoloring a biological sample are known in the art, and generally depend on the nature of the stain(s) applied to the sample. For example, in some embodiments, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

vii. Isometric Expansion

In some embodiments, a biological sample embedded in a matrix (e.g., a hydrogel) can be isometrically expanded. Isometric expansion methods that can be used include hydration, a preparative step in expansion microscopy, as described in Chen et al., *Science* 347(6221):543-548, 2015.

Isometric expansion can be performed by anchoring one or more components of a biological sample to a gel, followed by gel formation, proteolysis, and swelling. In some embodiments, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some embodiments, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, cross-linking), and/or the analyte of interest (e.g., different conditions to anchor RNA, DNA, and protein to a gel).

In some embodiments, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl) amino) hexanoic acid (Acryloyl-X SE) (available from ThermoFisher, Waltham, MA), Label-IT Amine (available from MirusBio, Madison, WI) and Label X (described for example in Chen et al., *Nat. Methods* 13:679-684, 2016, the entire contents of which are incorporated herein by reference).

Isometric expansion of the sample can increase the spatial resolution of the subsequent analysis of the sample. The increased resolution in spatial profiling can be determined by comparison of an isometrically expanded sample with a sample that has not been isometrically expanded.

In some embodiments, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some embodiments, the sample is isometrically expanded to at least 2× and less than 20× of its non-expanded size.

viii. Cross-Linking

In some embodiments, the biological sample is reversibly cross-linked prior to or during an in situ assay round. In some aspects, the analytes, polynucleotides and/or amplification product (e.g., amplicon) of an analyte or a probe bound thereto can be anchored to a polymer matrix. For example, the polymer matrix can be a hydrogel. In some embodiments, one or more of the polynucleotide probe(s) and/or amplification product (e.g., amplicon) thereof can be modified to contain functional groups that can be used as an anchoring site to attach the polynucleotide probes and/or amplification product to a polymer matrix. In some embodiments, a modified probe comprising oligo dT may be used to bind to mRNA molecules of interest, followed by reversible crosslinking of the mRNA molecules.

In some embodiments, random-targeted barcoded padlock probes can be used to bind a nucleic acid molecule of interest (e.g., DNA or RNA such as mRNA transcripts) followed by amplification (e.g., rolling circle amplification) with modified nucleotides to lock the amplicon in place. In some aspects, during the amplification step, modified nucleotides can be added to the reaction to incorporate the modified nucleotides in the amplification product. Exemplary of the modified nucleotides comprise amine-modified nucleotides. In some embodiments, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some embodiments, the biological sample is immobilized in a hydrogel via cross-linking of the polymer material that forms the hydrogel. Cross-linking can be performed chemically and/or photochemically, or alternatively by any other hydrogel-formation method known in the art.

A hydrogel may include a macromolecular polymer gel including a network. Within the network, some polymer chains can optionally be cross-linked, although cross-linking does not always occur.

In some embodiments, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

In some embodiments, a hydrogel includes a hybrid material, e.g., the hydrogel material includes elements of both synthetic and natural polymers. Examples of suitable hydrogels are described, for example, in U.S. Pat. Nos. 6,391,937, 9,512,422, and 9,889,422, and in U.S. Patent Application Publication Nos. 2017/0253918, 2018/0052081 and 2010/0055733, the entire contents of each of which are incorporated herein by reference.

In some embodiments, cross-linkers and/or initiators are added to hydrogel subunits. Examples of cross-linkers include, without limitation, bis-acrylamide and diazirine. Examples of initiators include, without limitation, azobisisobutyronitrile (AIBN), riboflavin, and L-arginine. Inclusion of cross-linkers and/or initiators can lead to increased covalent bonding between interacting biological macromolecules in later polymerization steps.

In some embodiments, hydrogels can have a colloidal structure, such as agarose, or a polymer mesh structure, such as gelatin.

In some embodiments, some hydrogel subunits are polymerized (e.g., undergo "formation") covalently or physically cross-linked, to form a hydrogel network. For example, hydrogel subunits can be polymerized by any method including, but not limited to, thermal crosslinking, chemical crosslinking, physical crosslinking, ionic crosslinking, photo-crosslinking, irradiative crosslinking (e.g., x-ray, electron beam), and combinations thereof. Techniques such as lithographic photopolymerization can also be used to form hydrogels.

Polymerization methods for hydrogel subunits can be selected to form hydrogels with different properties (e.g., pore size, swelling properties, biodegradability, conduction, transparency, and/or permeability of the hydrogel). For example, a hydrogel can include pores of sufficient size to allow the passage of macromolecules, (e.g., nucleic acids, proteins, chromatin, metabolites, gRNA, antibodies, carbohydrates, peptides, metabolites, and/or small molecules) into the sample (e.g., tissue section). It is known that pore size generally decreases with increasing concentration of hydrogel subunits and generally increases with an increasing ratio of hydrogel subunits to crosslinker. Therefore, a fixative/hydrogel composition can be prepared that includes a concentration of hydrogel subunits that allows the passage of such biological macromolecules.

In some embodiments, the hydrogel can form the substrate. In some embodiments, the substrate includes a hydrogel and one or more second materials. In some embodiments, the hydrogel is placed on top of one or more second materials. For example, the hydrogel can be pre-formed and then placed on top of, underneath, or in any other configuration with one or more second materials. In some embodiments, hydrogel formation occurs after contacting one or more second materials during formation of the substrate. Hydrogel formation can also occur within a structure (e.g., wells, ridges, projections, and/or markings) located on a substrate.

In some embodiments, hydrogel formation on a substrate occurs before, contemporaneously with, or after probes are provided to the sample. For example, hydrogel formation can be performed on the substrate already containing the probes.

In some embodiments, hydrogel formation occurs within a biological sample. In some embodiments, a biological sample (e.g., tissue section) is embedded in a hydrogel. In some embodiments, hydrogel subunits are infused into the biological sample, and polymerization of the hydrogel is initiated by an external or internal stimulus.

In embodiments in which a hydrogel is formed within a biological sample, functionalization chemistry can be used. In some embodiments, functionalization chemistry includes hydrogel-tissue chemistry (HTC). Any hydrogel-tissue backbone (e.g., synthetic or native) suitable for HTC can be used for anchoring biological macromolecules and modulating functionalization. Non-limiting examples of methods using HTC backbone variants include CLARITY, PACT, ExM, SWITCH and ePACT. In some embodiments, hydrogel formation within a biological sample is permanent. For example, biological macromolecules can permanently adhere to the hydrogel allowing multiple rounds of interrogation. In some embodiments, hydrogel formation within a biological sample is reversible.

In some embodiments, additional reagents are added to the hydrogel subunits before, contemporaneously with, and/ or after polymerization. For example, additional reagents can include but are not limited to oligonucleotides (e.g., probes), endonucleases to fragment DNA, fragmentation buffer for DNA, DNA polymerase enzymes, dNTPs used to amplify the nucleic acid and to attach the barcode to the amplified fragments. Other enzymes can be used, including without limitation, RNA polymerase, transposase, ligase, proteinase K, and DNAse. Additional reagents can also include reverse transcriptase enzymes, including enzymes with terminal transferase activity, primers, and switch oligonucleotides. In some embodiments, optical labels are added to the hydrogel subunits before, contemporaneously with, and/or after polymerization.

In some embodiments, HTC reagents are added to the hydrogel before, contemporaneously with, and/or after polymerization. In some embodiments, a cell labelling agent is added to the hydrogel before, contemporaneously with, and/or after polymerization. In some embodiments, a cell-penetrating agent is added to the hydrogel before, contemporaneously with, and/or after polymerization.

Hydrogels embedded within biological samples can be cleared using any suitable method. For example, electrophoretic tissue clearing methods can be used to remove biological macromolecules from the hydrogel-embedded sample. In some embodiments, a hydrogel-embedded sample is stored before or after clearing of hydrogel, in a medium (e.g., a mounting medium, methylcellulose, or other semi-solid mediums).

A "conditionally removable coating" is a coating that can be removed from the surface of a substrate upon application of a releasing agent. In some embodiments, a conditionally removable coating includes a hydrogel as described herein, e.g., a hydrogel including a polypeptide-based material. Non-limiting examples of a hydrogel featuring a polypeptide-based material include a synthetic peptide-based material featuring a combination of spider silk and a transmembrane segment of human muscle L-type calcium channel (e.g., PEPGEL®), an amphiphilic 16 residue peptide containing a repeating arginine-alanine-aspartate-alanine sequence (RADARADARADARADA) (e.g., PURAMATRIX®), EAK16 (AEAEAKAKAEAEAKAK), KLD12 (KLDLKLDLKLDL), and PGMATRIX™.

In some embodiments, the hydrogel in the conditionally removable coating is a stimulus-responsive hydrogel. A stimulus-responsive hydrogel can undergo a gel-to-solution and/or gel-to-solid transition upon application of one or more external triggers (e.g., a releasing agent). See, e.g., Willner, *Acc. Chem. Res.* 50:657-658, 2017, which is incorporated herein by reference in its entirety. Non-limiting examples of a stimulus-responsive hydrogel include a thermoresponsive hydrogel, a pH-responsive hydrogel, a light-responsive hydrogel, a redox-responsive hydrogel, an analyte-responsive hydrogel, or a combination thereof. In some embodiments, a stimulus-responsive hydrogel can be a multi-stimuli-responsive hydrogel.

A "releasing agent" or "external trigger" is an agent that allows for the removal of a conditionally removable coating from a substrate when the releasing agent is applied to the conditionally removable coating. An external trigger or releasing agent can include physical triggers such as thermal, magnetic, ultrasonic, electrochemical, and/or light stimuli as well as chemical triggers such as pH, redox reactions, supramolecular complexes, and/or biocatalytically driven reactions. See e.g., Echeverria, et al., *Gels* (2018), 4, 54; doi:10.3390/gels4020054, which is incorporated herein by reference in its entirety. The type of "releasing agent" or "external trigger" can depend on the type of conditionally removable coating. For example, a conditionally removable coating featuring a redox-responsive hydrogel can be removed upon application of a releasing agent that includes a reducing agent such as dithiothreitol (DTT). As another example, a pH-responsive hydrogel can be removed upon the application of a releasing agent that changes the pH.

In some embodiments, a method disclosed herein comprises de-crosslinking the reversibly cross-linked biological sample. The de-crosslinking does not need to be complete. In some embodiments, only a portion of crosslinked molecules in the reversibly cross-linked biological sample are de-crosslinked and allowed to migrate.

ix. Disaggregation of Cells

In some embodiments, the biological sample corresponds to cells (e.g., derived from a cell culture, a tissue sample, or cells deposited on a surface). In a cell sample with a plurality of cells, individual cells can be naturally unaggregated. For example, the cells can be derived from a suspension of cells and/or disassociated or disaggregated cells from a tissue or tissue section.

Alternatively, the cells in the sample may be aggregated, and may be disaggregated into individual cells using, for example, enzymatic or mechanical techniques. Examples of enzymes used in enzymatic disaggregation include, but are not limited to, dispase, collagenase, trypsin, and combinations thereof. Mechanical disaggregation can be performed, for example, using a tissue homogenizer. The biological sample may comprise disaggregated cells (e.g., nonadherent or suspended cells) which are deposited on a surface and subjected to an in situ assay disclosed herein.

x. Tissue Permeabilization and Treatment

In some embodiments, a biological sample can be permeabilized to facilitate transfer of analytes out of the sample, and/or to facilitate transfer of species (such as probes) into the sample. If a sample is not permeabilized sufficiently, the amount of analyte captured from the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases). In some embodiments, the biological sample can be incubated with a cellular permeabilizing agent to facilitate permeabilization of the sample. Additional methods for sample permeabilization are described, for example, in Jamur et al., *Method Mol. Biol.* 588:63-66, 2010, the entire contents of which are incorporated herein by reference. Any suitable method for sample permeabilization can generally be used in connection with the samples described herein.

In some embodiments, where a diffusion-resistant medium is used to limit migration of analytes or other species during the analytical procedure, the diffusion-resistant medium can include at least one permeabilization reagent. For example, the diffusion-resistant medium can include wells (e.g., micro-, nano-, or picowells) containing a permeabilization buffer or reagents. In some embodiments, where the diffusion-resistant medium is a hydrogel, the hydrogel can include a permeabilization buffer. In some embodiments, the hydrogel is soaked in permeabilization buffer prior to contacting the hydrogel with a sample. In some embodiments, the hydrogel or other diffusion-resistant medium can contain dried reagents or monomers to deliver permeabilization reagents when the diffusion-resistant medium is applied to a biological sample. In some embodiments, the diffusion-resistant medium, (i.e. hydrogel) is covalently attached to a solid substrate (i.e. an acrylated glass slide). In some embodiments, the hydrogel can be modified to both contain probes and deliver permeabilization reagents. For example, a hydrogel film can be modified to include one or more probes (e.g., primary, secondary, and/or detection probes, etc.). The hydrogel film is then soaked in permeabilization buffer before contacting the hydrogel film to the sample. In some embodiments, the hydrogel is applied to a sample and placed in a permeabilization bulk solution. In some embodiments, the thickness of the hydrogel is proportional to the resolution loss. In some embodiments, the sample is punch, cut, or transferred into the well, wherein a target analyte diffuses through the permeabilization reagent/buffer. In some embodiments, resolution loss may be proportional to gap thickness (e.g. the amount of permeabilization buffer between the sample and the probes). In some embodiments, the diffusion-resistant medium (e.g. hydrogel) is between approximately 50-500 µm thick including 500, 450, 400, 350, 300, 250, 200, 150, 100, or 50 µm thick, or any thickness within 50 and 500 µm.

In some embodiments, permeabilization solution can be delivered to a sample through a porous membrane. In some embodiments, a porous membrane is used to limit diffusive analyte losses, while allowing permeabilization reagents to reach a sample. Membrane chemistry and pore size can be manipulated to minimize analyte loss. In some embodiments, the porous membrane may be made of glass, silicon, paper, hydrogel, polymer monoliths, or other material. In some embodiments, the material may be naturally porous. In some embodiments, the material may have pores or wells etched into solid material. In some embodiments, the permeabilization reagents are flowed through a microfluidic chamber or channel over the porous membrane. In some embodiments, the flow controls the sample's access to the permeabilization reagents. The permeabilization reagents diffuse through the pores of the membrane and into the tissue.

In some embodiments, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some embodiments, the biological sample can be permeabilized by non-chemical permeabilization methods. Non-chemical permeabilization methods are known in the art. For example, non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some embodiments, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to opening up DNA in a cell for hybridization by a probe. For example, proteinase K treatment may be used to free up DNA with proteins bound thereto.

xi. Selective Enrichment of RNA Species

In some embodiments, where RNA is the analyte, one or more RNA analyte species of interest can be selectively enriched. For example, one or more species of RNA of interest can be selected by addition of one or more oligonucleotides to the sample. In some embodiments, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

In some embodiments, one or more nucleic acid probes can be used to hybridize to a target nucleic acid (e.g., cDNA or RNA molecule, such as an mRNA) and ligated in a templated ligation reaction (e.g., RNA-templated ligation (RTL) or DNA-templated ligation (e.g., on cDNA)) to generate a product for analysis. In some aspects, when two or more analytes are analyzed, a first and second probe that is specific for (e.g., specifically hybridizes to) each RNA or cDNA analyte are used. For example, in some embodiments of the methods provided herein, templated ligation is used to detect gene expression in a biological sample. An analyte of interest (such as a protein), bound by a labelling agent or binding agent (e.g., an antibody or epitope binding fragment thereof), wherein the binding agent is conjugated or otherwise associated with a reporter oligonucleotide comprising a reporter sequence that identifies the binding agent, can be targeted for analysis. Probes may be hybridized to the reporter oligonucleotide and ligated in a templated ligation reaction to generate a product for analysis. In some embodiments, gaps between the probe oligonucleotides may first be filled prior to ligation, using, for example, Mu polymerase, DNA polymerase, RNA polymerase, reverse transcriptase, VENT polymerase, Taq polymerase, and/or any combinations, derivatives, and variants (e.g., engineered mutants) thereof. In some embodiments, the assay can further include amplification of templated ligation products (e.g., by multiplex PCR).

In some embodiments, an oligonucleotide with sequence complementarity to the complementary strand of captured RNA (e.g., cDNA) can bind to the cDNA. For example, biotinylated oligonucleotides with sequence complementary to one or more cDNA of interest binds to the cDNA and can be selected using biotinylation-strepavidin affinity using any of a variety of methods known to the field (e.g., streptavidin beads).

Alternatively, one or more species of RNA can be down-selected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics,* 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxyapatite chromatography to enrich transcriptome diversity in RNA-seq applications, *Biotechniques,* 53(6) 373-80, (2012), the entire contents of which are incorporated herein by reference).

IV. In Situ Assays

In some aspects, provided herein are methods comprising in situ assays using microscopy as a readout, e.g., nucleic acid sequencing, hybridization, or other detection or determination methods involving an optical readout. In some aspects, detection or determination of a sequence of one, two, three, four, five, or more nucleotides of a target nucleic acid is performed in situ in a cell in an intact tissue. In some embodiments, the assay comprises detecting the presence or absence of an amplification product (e.g., RCA product). In some embodiments, the present disclosure provides methods for high-throughput profiling of a large number of targets in situ, such as transcripts and/or DNA loci, e.g., for detecting and/or quantifying nucleic acids and/or proteins in cells, tissues, organs or organisms.

In some aspects, provided herein is a method comprising analyzing biological targets based on in situ hybridization of probes comprising nucleic acid sequences. In some embodiments, the method comprises sequential hybridization of detectably-labelled oligonucleotides to barcoded probes that directly or indirectly bind to biological targets in a sample (or products generated therefrom comprising barcode sequences). In some embodiments, a detectably-labelled oligonucleotide directly binds to one or more barcoded probes. In some embodiments, a detectably-labelled oligonucleotide indirectly binds to one or more barcoded probes (or products generated therefrom comprising barcode sequences), e.g., via one or more bridging nucleic acid molecules.

In some aspects, an in situ hybridization based assay is used to localize and analyze nucleic acid sequences (e.g., a DNA or RNA molecule comprising one or more specific sequences of interest) within a native biological sample, e.g., a portion or section of tissue or a single cell. In some embodiments, the in situ assay is used to analyze the presence, absence, an amount or level of mRNA transcripts (e.g., a transcriptome or a subset thereof, or mRNA molecules of interest) in a biological sample, while preserving spatial context. In some embodiments, the present disclosure provides compositions and methods for in situ hybridization using directly or indirectly labeled molecules, e.g., complementary DNA or RNA or modified nucleic acids, as probes that bind or hybridize to a target nucleic acids within a biological sample of interest.

Nucleic acid probes, in some examples, may be labelled with radioisotopes, epitopes, hapten, biotin, or fluorophores, to enable detection of the location of specific nucleic acid sequences on chromosomes or in tissues. In some embodiments, probes are locus specific (e.g., gene specific) and bind or couple to specific regions of a chromosome. In alternative embodiments, probes are alphoid or centromeric repeat probes that bind or couple to repetitive sequences within each chromosome. Probes may also be whole chromosome probes (e.g., multiple smaller probes) that bind or couple to sequences along an entire chromosome.

In some embodiments, provided herein is a method comprising DNA in situ hybridization to measure and localize DNA. In some embodiments, provided herein is a method RNA in situ hybridization to measure and localize RNAs (e.g., mRNAs, lncRNAs, and miRNAs) within a biological sample (e.g., a fixed tissue sample). In some embodiments, RNA in situ hybridization involves single-molecule RNA fluorescence in situ hybridization (FISH). In some embodiments, fluorescently labelled nucleic acid probes are hybridized to pre-determined RNA targets, to visualize gene expression in a biological sample. In some embodiments, a FISH method comprises using a single nucleic acid probe specific to each target, e.g., single-molecule FISH (smFISH). The use of smFISH may produce a fluorescence signal that allows for quantitative measurement of RNA transcripts. In some embodiments, smFISH comprises a set of nucleic acid probes, about 50 base pairs in length, wherein each probe is coupled to a set fluorophores. For example, the set of nucleic acid probes may comprise five probes, wherein each probe coupled to five fluorophores. In some embodiments, said nucleic acid probes are instead each coupled to one fluorophore. For example, a smFISH protocol may use a set of about 40 nucleic acid probes, about 20 base pairs in length, each coupled to a single fluorophore. In some embodiments, the length of the nucleic acid probes varies, comprising 10 to 100 base pairs, such as 30 to 60 base pairs. Alternatively, a plurality of nucleic acid probes targeting different regions of the same RNA transcript may be used. It will be appreciated by those skilled in the art that the type of nucleic acid probes, the number of nucleic acid probes, the number of fluorophores coupled to said probes, and the length of said probes, may be varied to fit the specifications of the individual assay.

In further embodiments smFISH is applied to a multiplexed workflow, wherein consecutive/sequential hybridizations are used (e.g., as in seqFISH or seqFISH+) to impart a temporal barcode on target transcripts. Sequential rounds of fluorescence in situ hybridization may be accompanied by imaging and probe stripping, detecting individual transcripts (e.g., RNA transcripts) within a biological sample of interest (e.g., a tissue sample, a single cell, or extracted RNA). In some embodiments, each round of hybridization comprises a pre-defined set of probes (e.g., between about 10 and about 50 probes such as 24 to 32 probes) that target unique RNA transcripts. In some examples, the pre-defined set of probes is multicolored. Optionally, multiple nucleic acid probes are attached onto the sample, wherein each probe comprises an initiation sequence for amplification, allowing for decreased autofluorescence (e.g., as in single-molecule hybridization chain reaction (smHCR)). In some embodiments, a multiplexed smFISH method described herein may multiplex from 10 s to over 10,000 mRNAs, optionally accompanied by imaging, to efficiently and accurately profile the entire transcriptome. In situ hybridization methods may further comprise using two probes to bind target transcripts (e.g., RNA transcripts), that serve as binding targets for amplification primers. In some embodiments, this process results in signal amplification (e.g., as in RNAscope). In some embodiments, in situ hybridization methods may employ metal tags instead of fluorophores (e.g., imaging mass cytometry). Metal-conjugated antibodies may couple to the metal tags hybridized to transcripts on a biological sample. In some embodiments, mass-cytometry may be used to quantify metal abundances, allowing the concurrent evaluation of RNA and protein within a biological sample.

In some embodiments, a method described herein comprises a multiplexed FISH protocol that is error-robust (e.g., MERFISH). In some embodiments, said protocol comprises non-readout nucleic acid probes (e.g., primary probes) comprising a binding region (e.g., a region that binds to a target such as RNA transcripts) coupled to one or more flanking regions. In some embodiments, each non-readout nucleic acid probe is coupled to two flanking regions. The non-readout nucleic acid probes may hybridize to a transcript (e.g., RNA transcript) within a biological sample (e.g., tissue sample or a single cell), such that florescent readout nucleic acid probes may subsequently serially hybridize to the flanking region(s) of the non-readout nucleic acid probes. In some embodiments, each round of hybridization comprises successive imaging and probe stripping to quench signals from readout nucleic acid probes from previous rounds. RNAs may be imaged by FISH, and errors accumulated during multiple imaging rounds (e.g., imperfect hybridizations) are detected and/or corrected. In some embodiments, expansion microscopy is employed to increase the number of detected RNA targets without signal overlap. In similar embodiments, non-readout nucleic acid probes are cross-linked to target transcripts prior to imaging. Cross-linking may be performed by any method known in the art. In preferred embodiments, cross-linking is performed using hydrogel tissue embedding. Following said cross-linking steps, barcoding may be performed, comprising sequential hybridizations using readout probes coupled to pre-determined colors to generate unique barcodes (e.g., generating pseudo colors from consecutive hybridizations).

In some embodiments, one or more barcodes of a probe are targeted by detectably labeled detection oligonucleotides, such as fluorescently labeled oligonucleotides. In some embodiments, one or more decoding schemes are used to decode the signals, such as fluorescence, for sequence determination. In any of the embodiments herein, barcodes (e.g., primary and/or secondary barcode sequences) can be analyzed using any suitable methods or techniques, comprising those described herein, such as RNA sequential probing of targets (RNA SPOTs), sequential fluorescent in situ hybridization (seqFISH or seqFISH+), single-molecule fluorescent in situ hybridization (smFISH), or multiplexed error-robust fluorescence in situ hybridization (MERFISH). In some embodiments, the methods provided herein comprise analyzing the barcodes by sequential hybridization and detection with a plurality of labelled probes (e.g., detection oligonucleotides). Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); U.S. Pat. No. 10,457,980 B2; US 2016/0369329 A1; US 2020/0080139; and US 2017/0220733 A1, all of which are incorporated by reference in their entirety. In some embodiments, these assays enable signal amplification, combinatorial decoding, and error correction schemes at the same time.

Similar strategies of in situ hybridization using variations of FISH techniques may also be adopted by methods described herein. In some embodiments, a method comprises non-barcoding multiplexed FISH protocols (e.g., ouroboros sm-FISH (osmFISH)). Non-barcoding methods may be limited to detecting a specific number of targets, defined by the number of hybridization rounds performed. In some embodiments, imaging is performed following each hybridization round, wherein the probe is stripped after imaging, allowing for subsequent hybridization and imaging rounds.

Additional embodiments of the present disclosure may include using in situ hybridization protocols that do not rely on probe capture of transcripts from pre-defined locations. In some embodiments, optics-free spatial mapping of transcripts in a biological sample may be used (e.g., a chemically encoded microscopy system). In some embodiments, transcripts are first tagged in situ with unique nucleotide tags (e.g., unique molecular identifiers). This first reaction may be followed by a second in situ amplification reaction, labelled by a new set of unique nucleotide tags (e.g., unique event identifiers). In some embodiments, RNA or DNA sequencing may be used to identify each molecular chain sequence (e.g., concatemers). In further embodiments, an algorithm may be used to evaluate the proximities of the sequences and produce images of the target transcripts, in combination with sequence information.

In some embodiments, provided herein is a method comprising linking sequence information and spatial information of targets within endogenous environments. For example, analysis of nucleic acid sequences may be performed directly on DNA or RNA within an intact biological sample of interest, e.g., by in situ sequencing. In some embodiments, the present disclosure allows for the simultaneous identification and quantification of a plurality of targets, such as 100s, 1000s, or more of transcripts (e.g., mRNA transcripts), in addition to spatial resolution of said transcripts. In some aspects, the spatial resolution of transcripts may be subcellular. Optionally, the spatial resolution may be increased using signal amplification strategies described herein.

In some embodiments, fluorescent dyes are used to target nucleic acid bases or provide signals associated with nucleic acid sequences, and circular or circularizable (e.g., padlock) probes are used to target RNAs of interest in situ. In some embodiments, mRNAs are reverse transcribed into cDNAs, and padlock probes are able to bind or couple to cDNAs. In some embodiments, padlock probes comprise oligonucleotides with ends that are complementary to a target sequence (e.g., target cDNA transcripts). Upon hybridization of padlock probes to the target sequence, enzymes may be used to ligate the ends of the padlock probes, and catalyze the formation of circularized DNA.

In some embodiments, the ends of the padlock probes are in close proximity upon hybridization to the target RNA or cDNA, to allow ligation and circularization of the padlock probe. The padlock probes may additionally comprise one or more barcode sequences. In alternative embodiments, there may be a gap between the ends of the padlock probes upon hybridization to the target RNA or cDNA, that must be filled with nucleic acids (e.g., by DNA polymerization), prior to ligation of the ends of the padlock probes and circularization. In some embodiments, the gap between to ends of the padlock probes is of variable length, e.g., up to four base pairs, and can allow reading out the actual RNA or cDNA sequence. In some embodiments, the DNA polymerase has strand displacement activity. In some embodiments, the DNA polymerase may instead not have strand displacement activity, such as the polymerase used in barcode in situ target sequencing (BaristaSeq) which provides read-length of up to 15 bases using a gap-filling padlock probe approach. See, e.g., Chen et al., *Nucleic Acids Res.* 2018, 46, e22, incorporated herein by reference in its entirety.

A method described herein may comprise DNA circularization and amplification (e.g., rolling circle amplification), at the location of padlock probes in the sample. In some embodiments, amplification results in multiple repeats of padlock probe sequences. Sequencing and/or decoding of the amplified padlock probes may be performed using sequencing-by-ligation. In alternative methods, sequencing-by-hybridization or sequencing-by-synthesis are used. In some embodiments, amplicons are stabilized by crossing-linking described herein, during the sequencing process. In some embodiments, the in situ sequencing methods presented in this disclosure may be automated on a microfluidic platform.

Additional approaches to in situ sequencing will be appreciated by those skilled in the art. For example, in some embodiments, barcoded padlocks probes may not be reverse transcribed. Instead, a second primer binds (e.g., ligates) directly to an RNA sequence adjacent to the padlock probe. In some embodiments, amplification (e.g., rolling circle amplification) is performed, wherein the amplification product becomes embedded within a hydrogel by any suitable method known in the art (e.g., hydrogel-tissue chemistry), which is then cleaned of unbound proteins and lipids. Embedded amplification products may, for example, be sequenced using variations of the sequencing-by-ligation approach, to determine the barcode sequence of each padlock probe. In some embodiments, the combinations of chemistry and sequencing described herein may be used to analyze spatial orientation of target transcripts in 3D.

In some embodiments, an in situ sequencing methods described in the present disclosure may be untargeted. In some embodiments, untargeted in situ sequencing may comprise genome/transcriptome-wide profiling of gene expression within a biological sample of interest, e.g., as in fluorescent in situ RNA sequencing (FISSEQ). In some embodiments, RNA species are captured and converted into cross-linked cDNA amplicons (e.g., cDNA cross-linked to the cellular protein matrix of the sample). In some examples, cDNA synthesis is performed using modified amine bases to promote the cross-linking process. The synthesis of cross-linked cDNA amplicons may be followed by amplification (e.g., rolling circle amplification) as described elsewhere herein. In some embodiments, sequencing-by-ligation may be used to sequence the amplification products. In some embodiments, the sequencing step includes partition sequencing to selectively sequence of subsets of amplification products. In some embodiments, the strategies described herein allow for the detection of RNA, DNA, and/or proteins, in tandem. In some embodiments, in situ sequencing may be combined with ex situ sequencing, e.g., as in in situ transcriptome accessibility sequencing (INSTA-Seq).

In some embodiments, in situ sequencing involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (i.e., nucleotide sequence) of the incorporated nucleotides or labeled primer extension products can be determined, and consequently, the nucleotide sequence of the corresponding template nucleic acid. Aspects of in situ sequencing are described, for example, in Mitra et al., (2003) *Anal. Biochem.* 320, 55-65, and Lee et al., (2014) *Science,* 343(6177), 1360-1363, the contents of each of which are herein incorporated by reference in their entirety. In addition, examples of methods and systems for performing in situ sequencing are described in US 2019/0177718, US 2019/0194709, and in U.S. Pat. Nos. 10,138,509, 10,494,662, and 10,179,932, the contents of each of which are herein incorporated by reference in their entirety. Exemplary techniques for in situ sequencing or detection comprise, but are not limited to, STARmap (described for example in Wang et al., (2018) *Science,* 361(6499) 5691 and US 2021/0164039), MERFISH (described for example in Moffitt, (2016) *Methods in Enzymology,* 572, 1-49; US 2019/0276881; US 2019/0264270; and WO 2020/123742), and FISSEQ (described for example in US 2019/0032121), the contents of each of which are herein incorporated by reference in their entirety.

A. Iterative Multi-Modal Analysis

In some embodiments, a sample for in situ analysis is placed in a well or flow-cell, connected to a fluidic device. In some embodiments, the sample and optionally the well or flow-cell is mounted on an optical device (e.g., a microscope). In some embodiments, a method disclosed herein may combine microscopy and sequencing or sequence detection technologies and methods. In some embodiments, the microscope is configured to work in one or more modalities. In some embodiments, the microscope is configured to work in two or more different modalities. In some embodiments, the two or more different modalities comprise different objective types, different magnifications, different light sources, different Z-positions, and/or different X- or Y-coordinates.

In some embodiments, disclosed herein is a method of multi-modal iterative in situ assay, wherein the method may solve problems related to optical crowding of the molecule or molecules of interest. In some embodiments, the method is optimized to reduce optical crowding of the molecule or molecules of interest while acquiring images covering a large tissue area (e.g., a tissue area as large as possible while minimizing optical crowding). In some embodiments, the method is optimized to reduce optical crowding of the molecules of interest while detecting a large number of molecules of interest.

In some embodiments, disclosed herein is a method of multi-modal iterative in situ assay, wherein the method is optimized to maximize a signal to noise ratio. In some embodiments, the method is optimized to maximize a signal to noise ratio while acquiring images covering a large tissue area (e.g., a tissue area as large as possible while maximizing signal to noise). In some embodiments, the method is optimized to maximize a signal to noise ratio while detecting a large number of molecules of interest.

In some embodiments, disclosed herein is a method of multi-modal iterative in situ assay, wherein the method comprises imaging a sample using a microscope that is not limited to a work-horse mode, e.g., on that works primarily as an in situ sequencer. In some examples, the method comprises selecting a different magnification and/or a different region based on analysis of one or more analyte (e.g., biomarker) panels detected at a first magnification and/or in a first region of a sample, thus also using a work-horse microscope in a more flexible way to utilize features useful for imaging.

In some embodiments, a method disclosed herein comprises contacting a sample with barcoded probe sets for analyzing analyte (e.g., biomarker) panels in the sample. In a first round, the sample can be contacted with a first plurality of detectably labeled oligonucleotides for analyzing one or more sets in the barcoded probe sets, and detecting the first plurality of detectably labeled oligonucleotides using a microscope at a first magnification, and/or analyzing the one or more analyte (e.g., biomarker) panels corresponding to the one or more sets in the barcoded probe sets in a first region of the sample. In some embodiments, the method further comprises, based on analysis of a first plurality of detectably labeled oligonucleotides corresponding to one or more analyte (e.g., biomarker) panels, selecting a second plurality of detectably labeled oligonucleotides for analyzing another one or more sets of the plurality of barcoded probe sets, wherein the sample or a region thereof is contacted with the second plurality of detectably labeled oligonucleotides, which are different from the first plurality of detectably labeled oligonucleotides. Optionally, the method can further comprise selecting a different magnification and/or a different region based on the analysis of the first plurality of detectably labeled oligonucleotides. Similarly, a third plurality of detectably labeled oligonucleotides (e.g., for analyzing a biomarker panel different from those analyzed in the first and/or second rounds), a different magnification, and/or a different region can be selected based on the analysis of the first and/or second plurality of detectably labeled oligonucleotides. The analyte detection and analysis can be reiterated, using the microscope in alternating work-horse and microscope modes.

FIG. 1 shows an exemplary workflow of a method of in situ analysis described herein, wherein the method comprises selecting a different magnification and/or a different region based on analysis of one or more biomarker panels detected at a first magnification and/or over a first region. In some embodiments of the method as shown in FIG. 1, the method comprises contacting (101) a sample with a plurality of barcoded probe sets (e.g., $P_1, \ldots, P_k, \ldots,$ and $P_n$, wherein k and n are integers and $2 \leq k \leq n$), each for analyzing a biomarker panel. Then the sample is contacted (102) with a first plurality of detectably labeled oligonucleotides DO1 for analyzing one or more sets in the barcoded probe sets. A user can select (103) a first magnification of a microscope and/or a first region of the sample for detecting (104) the first plurality of detectably labeled oligonucleotides using the microscope, e.g., as an optical sequencer. In some cases, the initial analysis and detection of the one or more barcoded probe sets (102-104) may comprise sequential hybridization of labelled probes in cycles to create a spatiotemporal signal signature or code that identifies the analyte. In this initial round, the first magnification can be the lowest or a relatively lower magnification, and the first region can be the entire region of a sample (e.g., a tissue slice) or a relatively large region of the sample. After signal acquisition, a user can analyze (105) the one or more biomarker panels corresponding to the one or more sets in the first region of the sample. Based on the analyzing step, a user can select (106) a second magnification, wherein the sample or a region thereof is imaged using the microscope at the second magnification, and/or selecting a second region of the sample, wherein one or more analyte (e.g., biomarker) panels in the second region are analyzed. In some embodiments, any subsequent analysis and detection of the one or more analyte panels may comprise sequential hybridization of labelled probes in cycles to create a spatiotemporal signal signature or code that identifies the analyte.

In some embodiments, the first magnification (M1) and second magnification (M2) are different, and/or the first region (R1) and second region (R2) are different. In some embodiments of the method as shown in FIG. 1, M1 and M2 are the same magnification of the microscope and R1 and R2 are different regions of the sample. In some embodiments, M2 is a higher magnification than M1. In some embodiments, R1 and R2 are the same region of the sample. In some embodiments, R1 and R2 are different regions of the sample. In some embodiments, R1 and R2 are overlapping regions. In some embodiments, R2 is a sub-region of R1. In some embodiments, R1 and R2 are the same region of the sample, optionally wherein R1 and R2 are the entire region of the sample or a portion thereof. In some embodiments, R1 and R2 are different regions of the sample, optionally wherein one of R1 and R2 is the entire region of the sample and the other is a portion of the sample. In some embodiments, R1 and R2 are overlapping regions. In some embodiments, R2 is a subregion within R1. In some embodiments, the imaging using the microscope at M2 in the second iteration of the detecting step (104) is of a sub-region of R1. In some embodiments, M2 is higher than M1 and R2 is imaged using M2. In some embodiments, the analysis in the first iteration of the analysis step (105) provides information of one or more cell types, one or more types of biomarkers, a number or level of a biomarker, and/or a number or level of cells detected in R1 of the sample. In some embodiments, the analysis in a second iteration of the analysis step (105) following the selection of a different magnification and/or a different region (106) provides information of one or more cell types, one or more types of biomarkers, a number or level of a biomarker, and/or a number or level of cells detected in R1 or R2 of the sample.

In some embodiments of the method as shown in FIG. 1, the method further comprises a third iteration, wherein the third iteration comprises selecting (106) a different magnification M3 and/or a different region R3, and detecting (104) the labeled oligonucleotides and analyzing (105) the one or more biomarker panels using M3 and/or R3. In some embodiments, the method comprises, based on the analysis of one or more biomarker panels in the second iteration, (i) selecting a third magnification M3, wherein the sample or a region thereof is imaged using the microscope at M3, and/or (ii) selecting a third region R3 of the sample, wherein one or more biomarker panels in R3 are analyzed, wherein one or more of M3, and R3 is different from M3, and R3, respectively. In some embodiments, M3 is higher than M2 and R3 is a sub-region of R2. In some embodiments, the same barcoded probe set for analyzing a corresponding biomarker panel can be analyzed in two rounds of the in situ analysis, either using a different M1 and M2 magnification of the microscope in the first and second round or observing a different R1 and R2 of the sample in the first and second round.

Figure 2:
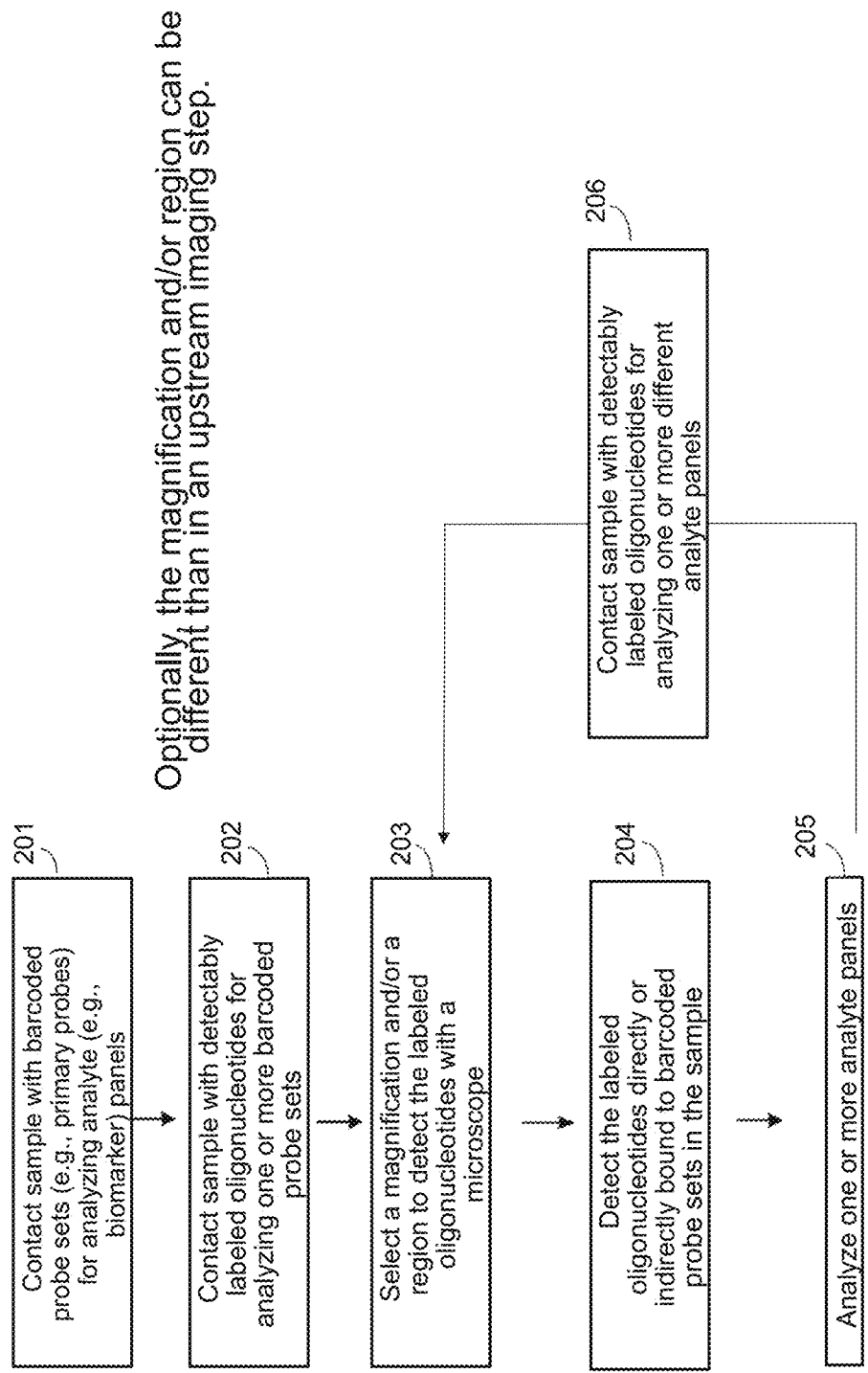
FIG. 2 shows an exemplary workflow of a method described herein.

FIG. 2 shows an exemplary workflow of a method of in situ analysis described herein, wherein the method comprises selecting a different plurality of detectably labeled oligonucleotides corresponding to one or more biomarker panels based on analysis of a first plurality of detectably labeled oligonucleotides corresponding to one or more biomarker and contacting the sample with the different plurality of detectably labeled oligonucleotides. In some embodiments of the method as shown in FIG. 2, the method comprises contacting (201) a sample with a plurality of barcoded probe sets (e.g., $P_1, \ldots, P_k, \ldots,$ and $P_n$ wherein k and n are integers and $2 \leq k \leq n$), each for analyzing a biomarker panel. The method may further comprise contacting (202) the sample with a first plurality of detectably labeled oligonucleotides DO1 for analyzing one or more sets in the barcoded probe sets, and detecting (204) the first plurality of detectably labeled oligonucleotides using a microscope at a first magnification. The first magnification (M1) and/or the region (R1) in which signals are detected may be selected in an optional selection step (203). In some cases, the initial analysis and detection of the one or more barcoded probe sets (202-204) may comprise sequential hybridization of labelled probes in cycles to create a spatiotemporal signal signature or code that identifies the analyte. The method further comprises analyzing (205) the one or more biomarker panels corresponding to the one or more sets in the first region R1 of the sample. Based on the analyzing step, a second plurality of detectably labeled oligonucleotides DO2 can be selected for analyzing another one or more sets of the plurality of barcoded probe sets, wherein the sample or a region thereof is contacted (206) with DO2, wherein DO2 is different from DO1. Optionally, the method further comprises selecting (203) a second magnification M2, wherein the sample or a region thereof is imaged using the microscope at M2, and/or selecting a second region R2 of the sample, wherein one or more biomarker panels in R2 are analyzed, wherein one or more of M2 and R2 is different from M1 and R1, respectively, in the second iteration of the detecting step (204). In some cases, the analysis and detection of DO2 may comprise sequential hybridization of labelled probes in cycles to create a spatiotemporal signal signature or code that identifies the analyte.

In some embodiments of the method as shown in FIG. 2, DO2 comprises one or more detectably labeled oligonucleotides that are not in DO1. In some embodiments, DO2 comprises one or more detectably labeled oligonucleotides for analyzing at least one biomarker panel that is not identical to the one or more biomarker panels analyzed in step the analysis step 205 of the first iteration. In some embodiments, M1 and M2 are the same magnification of the microscope. In some embodiments, R1 and R2 are the same region of the sample. In some embodiments, M1 and M2 are the same magnification and R1 and R2 are the same region of the sample. In some embodiments, M2 is a higher magnification than M1. In some embodiments, R1 and R2 are different regions of the sample. In some embodiments, R1 and R2 are overlapping regions. In some embodiments, R2 is a sub-region of R1. In some embodiments, R1 and R2 are the same region of the sample, optionally wherein R1 and R2 are the entire region of the sample or a portion thereof. In some embodiments, R1 and R2 are different regions of the sample, optionally wherein one of R1 and R2 is the entire region of the sample and the other is a portion of the sample. In some embodiments, R1 and R2 are overlapping regions. In some embodiments, R2 is a subregion within R1. In some embodiments, the detecting in the first iteration of step (204) comprises detecting optical signals from DO1 in a hybridization reaction. In some embodiments, the detecting step (204) using a microscope at M2 is of a sub-region of R1. In some embodiments, M2 is higher than M1 and R2 is imaged using M2.

In some embodiments of the method as shown in FIG. 2, the one or more biomarker panels analyzed in the first iteration of the analyzing step (205) correspond to a first subset of the plurality of barcoded probe sets contacted with the sample. In some embodiments, DO2 is for analyzing a second subset of the plurality of barcoded probe sets contacted (206) with the sample in the second iteration of the analyzing step (205). In some embodiments, the one or more biomarker panels corresponding to the first subset of barcoded probe sets and the second subset of barcoded probe sets are non-overlapping. In some embodiments, the one or more biomarker panels corresponding to the first subset of barcoded probe sets and the second subset of barcoded probe sets comprise one or more common biomarkers.

In some embodiments, the detecting (204) and analyzing (205) of DO2 in the second iteration provides greater sequencing depth and/or greater resolution than the first subset of barcoded probe sets analyzed. In some embodiments, the one or more biomarker panels corresponding to first and/or second subset of barcoded probe sets are indicative of a pathway and/or a cell type. In some embodiments, the one or more biomarker panels corresponding to the second subset of barcoded probe sets comprise a subpanel of the one or more biomarker panels corresponding to the first subset of barcoded probe sets. In some embodiments, the first plurality of detectably labeled oligonucleotides hybridize to the one or more sets of barcoded probe sets, and/or the second plurality of detectably labeled oligonucleotides hybridize to the another one or more sets of barcoded probe sets. In some embodiments, the first plurality of detectably labeled oligonucleotides hybridize, directly or indirectly, to molecules comprising the barcode sequences or complementary sequences thereof of the one or more sets of barcoded probe sets, and/or the second plurality of detectably labeled oligonucleotides hybridize, directly or indirectly, to molecules comprising the barcode sequences or complementary sequences thereof of the another one or more sets of barcoded probe sets. In some embodiments, the molecules are amplification products (e.g., rolling circle amplification products) of the one or more sets and/or the another one or more sets. In some embodiments, an image of a detected biomarker in the one or more biomarker panels, and/or an image of a detected biomarker in at least one biomarker panel, is displayed on a display operably connected to the microscope. In some embodiments, the second iteration of the detecting step (204) comprises detecting optical signals from the second plurality of detectably labeled oligonucleotides in a hybridization reaction. In some embodiments, the first iteration and second iteration of the detecting step (204) comprise detecting optical signals in a sequencing reaction from the first and second plurality of detectably labeled oligonucleotides, respectively. In some embodiments, the analysis in the first iteration of the analysis step (205) provides information of one or more cell types, one or more types of biomarkers, a number or level of a biomarker, and/or a number or level of cells detected in the sample, and the analysis in the second iteration of the analysis step (205) provides information of one or more cell types, one or more types of biomarkers, a number or level of a biomarker, and/or a number or level of cells detected in the sample, wherein one or more of the cell types and/or biomarkers is different than in the first iteration.

In some embodiments of the method as shown in FIG. 2, the method further comprises a third iteration, wherein the third iteration comprises selecting (206) a third plurality of detectably labeled oligonucleotides DO3 for analyzing (205) a third one or more sets of the plurality of barcoded probe sets, wherein the sample or a region thereof is contacted (206) with DO3. In some embodiments of the method as shown in FIG. 2, the method further comprises selecting (203) a different magnification M3 and/or a different region R3 and detecting the labeled oligonucleotides (204) and analyzing the one or more biomarker panels (205) using M3 and/or R3. In some embodiments, the method comprises, based on the analysis of one or more biomarker panels in the second iteration, (i) selecting a third magnification M3, wherein the sample or a region thereof is imaged using the microscope at M3, and/or (ii) selecting a third region R3 of the sample, wherein one or more biomarker panels in R3 are analyzed, wherein one or more of M3, and R3 is different from M3, and R3, respectively. In some embodiments, M3 is higher than M2 and R3 is a sub-region of R2. In some embodiments, any subsequent analysis and detection of the one or more different analyte panels may comprise sequential hybridization of labelled probes in cycles to create a spatiotemporal signal signature or code that identifies the analyte(s).

In some embodiments, one or more additional steps may be performed in the exemplary workflow, for example, between steps 101 and 102 or between steps 201 and 202, the sample may be subjected to a wash step (e.g., to remove unbound probes), and/or optionally contacted with intermediate probes (secondary probe). In some instances, an amplification step can be performed (e.g., a rolling circle amplification step using a probe as a template).

In some aspects, the provided methods involve analyzing, e.g., detecting or determining, one or more analytes present in the sample, e.g., after each in situ assay round. In some examples, the analysis is performed in 105 or 205, and may include analyzing signals detected in steps 104 or 204, respectively. In some cases, the analysis is performed on one or more images captured, and may comprise processing the image(s) and/or quantifying signals observed. For example, the analysis may comprise processing information of one or more cell types, one or more types of biomarkers, a number or level of a biomarker, and/or a number or level of cells detected in a particular region of the sample. In some embodiments, the analysis comprises detecting a sequence e.g., a barcode present in the sample. In some embodiments, the analysis includes quantification of puncta (e.g., if amplification products are detected). In some cases, the analysis includes determining whether particular cells and/or signals are present that correlate with one or more biomarkers from a particular panel. In some embodiments, the obtained information may be compared to a positive and negative control, or to a threshold of a feature to determine if the sample exhibits a certain feature or phenotype. In some cases, the information may comprise signals from a cell, a region, and/or comprise readouts from multiple detectable labels. In some case, the analysis further includes displaying the information from the analysis or detection step. In some embodiments, software may be used to automate the processing, analysis, and/or display of data. In some cases, the information from an analysis step may be used to inform a next round of the in situ assay.

In some embodiments, provided methods optionally comprise a step of removing a plurality of detectably labeled oligonucleotides after an imaging step (e.g., in a washing step). In some embodiments, provided methods comprise a removing step after an imaging step. In some embodiments, provided methods comprise a removing step after each imaging step but the last imaging step. In some embodiments, provided methods comprise a removing step after each imaging step.

A removing step in provided methods can serve one or more of a variety of purposes. In some embodiments, a removing step removes a plurality of detectably labeled oligonucleotides from targets (or barcoded probes) so that targets (or barcoded probes) are available for interacting with another plurality of detectably labeled oligonucleotides. In some embodiments, a removing step removes a plurality of detectably labeled oligonucleotides so that detectable moieties of one plurality of detectably labeled oligonucleotides do not interfere with detection of another plurality of detectably labeled oligonucleotides bound to targets (or barcoded probes). In some embodiments, a removing step removes at least 50%, at least 55%, at least 60%, at least 65%, at least 70%, at least 75%, at least 80%, at least 85%, at least 90%, at least 95%, or at least 99% detectably labeled oligonucleotides bound to targets (or barcoded probes). In some embodiments, a removing step removes at least 50%, at least 55%, at least 60%, at least 65%, at least 70%, at least 75%, at least 80%, at least 85%, at least 90%, at least 95%, or at least 99% of the detectable signal. In some embodiments, a removing step removes 100% of the detectable signal. In some embodiments, after a removing step no signal can be detected by an imaging step prior to hybridization of another plurality of detectably labeled oligonucleotides to the targets (or barcoded probes).

A removing step optionally preserves targets (e.g., transcripts or DNA loci) and/or barcoded probes bound to targets for further use, for example, further detection or quantification by additional contacting and/or imaging steps. In some embodiments, a removing step preserves at least 80% targets and/or barcoded probes bound to the targets. Percentage of preserved targets can be measured, for example, by comparing data collected before and after a removing step, optionally using the same contacting and imaging protocols. In some embodiments, a removing step preserves at least 85% targets and/or barcoded probes bound to the targets. In some embodiments, a removing step preserves at least 90%, at least 95%, or at least 99% targets and/or barcoded probes bound to the targets.

Methods for removing detectably labeled oligonucleotides are widely known in the art. In some embodiments, a removing step comprising degrading a detectably labeled oligonucleotide. In some embodiments, a detectably labeled oligonucleotide is removed by enzymatic digestion. In some embodiments, a removing step comprising contacting a plurality of detectably labeled oligonucleotides with an enzyme that digests a detectably labeled oligonucleotide.

Suitable enzymes are widely used in the art. For example, depending on the type(s) of detectably labeled oligonucleotides and/or targets, either DNase or RNase can be used. In some embodiments, a detectably labeled oligonucleotide comprising a DNA sequence for detecting/quantifying a RNA target is digested by a DNase, e.g., DNase I. In some embodiments, a detectably labeled oligonucleotide comprising an RNA sequence for detecting/quantifying a DNA target is digested by a RNase.

In some embodiments, detectably labeled oligonucleotides are selected based on the biomarker panel(s) of interest, in view of the biomarker panel(s) analyzed in a previous round of signal acquisition and analysis. In some embodiments, barcoded probe sets for analyzing analyte (e.g., biomarker) panels remain bound (e.g., hybridized) to analytes of interest in a sample, while different subsets of the analytes of interest are interrogated in separate rounds of signal acquisition and analysis, by using detectably labeled oligonucleotides that target barcoded probe(s) for different analytes of interest in each round. In some cases, a sample is initially provided with a plurality of barcoded probe sets for analyzing a plurality of analyte (e.g., biomarker) panels, but not all of the plurality of barcoded probe sets are rendered by contacting the sample with detection probes for all of barcoded probes at once. For example, the method comprises selectively rendering certain barcoded probe set(s) and/or certain barcoded probes within given set(s) in a round based on the information gained from one or more earlier rounds of the iterative in situ analysis. In some cases, not all of the plurality of barcoded probe sets are rendered during the in situ analysis.

In some embodiments the plurality of barcoded probe sets can correspond to one or more signatures indicative of activity of a signaling pathway or a cell type. In some embodiments, the plurality of barcoded probe sets can correspond to gene ontology signatures associated with a disease status (e.g., oncology gene signatures) or a set of neuronal pathways.

In some embodiments, the present disclosure provides technologies for selecting and imaging a set of targets, such as a set of transcripts and/or DNA loci (e.g., a set of 100 targets as exemplified). In some embodiments, target genes are chosen from the in situ database from the Allen brain atlas (ABA). Multiple criteria can be used to select genes of interest, e.g., those likely to represent the cellular identity in the cortex region. Computational selection of an optimal set of genes from overlapping criteria is well-known (Alon, N; Moshkovitz, Dana; Safra, Shmuel (2006), "Algorithmic construction of sets for k-restrictions", ACM Trans. Algorithms (ACM) 2 (2): 153-177, ISSN 1549-6325; 8. Cormen, T H.; Leiserson, Charles E.; Rivest, Ronald L.; Stein, Clifford (2001), Introduction to Algorithms, Cambridge, Mass.: MIT Press and McGraw-Hill, pp. 1033-1038, ISBN 0-262-03293-7; 12. Feige, U (1998), "A threshold of ln n for approximating set cover", Journal of the ACM (ACM) 45 (4): 634-652, ISSN 0004-5411).

In some embodiments, the one or more analyte (e.g., biomarker) panels corresponding to first and/or second subset of the barcoded probe sets is indicative of a pathway and/or a cell type. For example, analyte (e.g., biomarker) panels can be selected using known methods and databases, e.g., based on gene ontology pathways from a database. In some embodiments, a panel of probes that target a set of biomarkers and genes that are indicative of various pathways/cell types, such as gene ontology pathways, can be selected, designed, and used. For example, curated gene sets of BioCarta and Reactome pathways can be downloaded from the Broad Institute's Molecular Signatures Database. In another example, gene sets can also be constructed from Kyoto Encyclopedia of Genes and Genomes (KEGG) pathways.

In some embodiments, a biomarker panel herein is indicative of a pathway. In some embodiments, the pathway is an immune cell pathway. In some embodiments, the pathway is associated with a disease (e.g., cancer). In some embodiments, the pathway is In some embodiments, the pathway comprises any one or more of a Toll-like receptor signaling pathway, a Jak-STAT signaling pathway, a NF-kappa B signaling pathway, a chemokine signaling pathway, a TNF signaling pathway, a T cell receptor signaling pathway, a RIG-I-like receptor signaling pathway, a NOD-like receptor signaling pathway, an antigen processing and presentation pathway, a B cell receptor signaling pathway, a PI3K-Akt signaling pathway, a cytosolic DNA-sensing pathway, a MAPK signaling pathway, a sphingolipid signaling pathway, a p53 signaling pathway, an HIF-1 signaling pathway, a VEGF signaling pathway, a Rap1 signaling pathway, a Ras signaling pathway, an Estrogen signaling pathway, a cAMP signaling pathway, a FoxO signaling pathway, a glucagon signaling pathway, a Hedgehog signaling pathway, a Hippo signaling pathway, an Insulin signaling pathway, an mTOR signaling pathway, a Notch signaling pathway, a TGF-beta signaling pathway, a Toll-like receptor signaling pathway, a Wnt signaling pathway, a Thyroid hormone signaling pathway, a cancer-associated signaling pathway, an ErbB signaling pathway, an AMPK signaling pathway, microRNAs in cancer, or a signaling pathway regulating pluripotency of stem cells.

In some embodiments, a biomarker panel herein is indicative of a tissue or cell type. In some embodiments, the tissue or cell type is any one of Blood, Plasma, Spleen, Peripheral blood, Monocyte, B-cell, T-cell, Neutrophil, Thymus, Leukocyte, Liver, Peripheral blood leukocyte, Synovial membrane tissue, Tonsil, Natural killer cell, Lymphoid, Peripheral blood monocyte, Lymphocyte, Cord blood, Lymph, Macrophage, Leukemia, Dendritic cell, Platelet, Lung, Foreskin, Endothelial cell, Lymphocytes, Bone marrow, Colon, Coronary artery, Embryonic kidney, Endothelial cell, Epithelium, Eye, Fetal brain, Fetal brain cortex, Fibroblast, Hippocampus, Kidney, Liver, Mammary gland, Muscle, Ovary, Pancreas, Placenta, Skeletal muscle, Skin, or Uterus.

In some embodiments, a biomarker panel herein is indicative of a cancer tissue or cell type. In some embodiments, the cancer tissue or cell type is any one of Acute myeloid leukemia, Adenocarcinoma, Bladder Cancer, Brain Cancer, Breast, Cancer, Cervical Cancer, Colon Cancer, Colorectal Cancer, Endometrial Cancer, Epithelial Ovarian Cancer, Esophageal Adenocarcinoma, Esophageal Cancer, Gastric Cancer, Head and Neck Cancer, Kidney Cancer, Liver Cancer, Lung Cancer, Melanoma, Non-small cell lung cancer, Oral Cancer, Ovarian Cancer, Pancreatic cancer, Prostate Cancer, Rectal Cancer, Stomach Cancer, Testicular Cancer, Thyroid Cancer, or Urinary Bladder Cancer.

In some embodiments, a biomarker panel herein is indicative of a cellular process. In some embodiments, the cellular process is one of an immune response, an inflammatory response, an innate immune response, an adaptive immune response, a chemokine-mediated signaling pathway, chemotaxis, regulation of immune response, signal transduction, a cellular response to lipopolysaccharide, positive regulation of inflammatory response, a response to lipopolysaccharide, a humoral immune response, a defense response to a virus, a cell surface receptor signaling pathway, positive regulation of T cell proliferation, positive regulation of ERK1 and ERK2 cascade, a type I interferon signaling pathway, monocyte chemotaxis, leukocyte migration, a cellular response to interleukin-1, positive regulation of interferon-gamma production, a response to a virus, T cell costimulation, cell-cell signaling, a cytokine-mediated signaling pathway, a cellular response to interferon-gamma, positive regulation of transcription from RNA polymerase II promoter, a T cell receptor signaling pathway, positive regulation of I-kappaB kinase/NF-kappaB signaling, a cellular defense response, a cellular response to tumor necrosis factor, an interferon-gamma-mediated signaling pathway, positive regulation of tumor necrosis factor production, a tumor necrosis factor-mediated signaling pathway, lymphocyte chemotaxis, a lipopolysaccharide-mediated signaling pathway, positive regulation of NF-kappaB transcription factor activity, positive regulation of B cell proliferation, an apoptotic process, positive regulation of interleukin-12 production, T cell activation.

In some embodiments, a biomarker panel herein is associated with a cellular process associated with a cancer. In some embodiments, the cellular process is one of transcriptional misregulation in cancer, focal adhesion, proteoglycans in cancer, cell cycle, apoptosis, natural killer cell mediated cytotoxicity, central carbon metabolism in cancer, nucleotide excision repair, DNA replication, ubiquitin mediated proteolysis, chromosomal rearrangement, transcription regulation, ATP-binding, nucleotide-binding, DNA repair, differentiation, or acetylation.

In some embodiments, a biomarker panel herein is associated with a disease or condition. In some embodiments, the disease or condition is aging, cancer, an immune condition, an infection, a metabolic disease or condition, a neurologic disease or condition, a pharmacogenomics disease or condition, a renal disease or condition, or a reproductive disease or condition.

In some embodiments, a biomarker panel herein comprises an immunity marker, innate immunity marker, cytokine marker, signaling pathway marker, glycoprotein marker, inflammatory response marker, secreted marker, chemotaxis marker, adaptive immunity marker, receptor marker, host-virus interaction marker, antiviral defense marker, apoptosis marker, host cell receptor for virus entry, cytolysis marker, cell adhesion marker, signal-anchor, cell cycle marker, complement alternate pathway marker, tyrosine-protein kinase marker, proto-oncogene marker, MHC II, activator, MHC I, cell division marker, acetylation marker, aging marker, alternative splicing marker, Alzheimer disease marker, angiogenesis marker, ATP-binding marker, brain development marker, cell aging marker, cell cycle marker, cell division marker, cell proliferation marker, cell-cell adhesion marker, cellular response to hypoxia marker, chromatin regulator marker, differentiation marker, DNA damage marker, DNA repair marker, DNA repair marker, DNA replication marker, DNA replication marker, DNA-binding marker, forebrain development marker, host-virus interaction marker, kinase marker, lipid biosynthesis marker, liver regeneration marker, mitosis marker, neuron differentiation marker, nucleotide-binding marker, oncogene marker, osteoblast differentiation marker, phosphoprotein marker, placenta development marker, proto-oncogene marker, regulation of cell proliferation marker, response to drug marker, somatic stem cell population maintenance marker, telomere maintenance via recombination marker, transcription regulation marker, transferase marker, tumor suppressor marker, tyrosine-protein kinase marker, wound healing marker, adaptive immunity marker, disease mutation marker, DNA recombination marker, DNA replication, DNA-binding marker, ECM-receptor interaction marker, extracellular matrix marker, growth factor, hydroxylation marker, kinase marker, lipoprotein, mitogen marker, neurogenesis marker, nucleus marker, pharmaceutical marker, phosphoprotein marker, polymorphism marker, primary immunodeficiency marker, protein phosphatase marker, serine/threonine-protein kinase marker, stress response marker, transferase marker, tumor suppressor marker, or tyrosine-protein kinase marker.

Any one or more of the biomarkers and biomarker panels disclosed herein may be interrogated in one or more rounds of signal acquisition and analysis, and a result of the one or more rounds may be used to inform the selection of biomarkers or biomarker panels for detection and analysis in one or more subsequent rounds.

B. Probes and Probe Hybridization

Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set, and RNA-templated ligation probes. The specific probe or probe set design can vary. In some embodiments, a primary probe (e.g., a DNA probe that directly binds to an RNA target) is amplified through rolling circle amplification, e.g., using a circular probe or a circularizable probe (such as a circularized probe from padlock ligation) as a template. In some embodiments, the primary probes, such as a padlock probe or a probe set that comprises a padlock probe, contain one or more barcodes. In some embodiments, one or more barcodes are indicative of a sequence in the target nucleic acid, such as a single nucleotide of interest (e.g., SNPs or point mutations), a dinucleotide sequence, a short sequence of about 5 nucleotides in length, or a sequence of any suitable length.

In some embodiments, provided herein is a probe or probe set capable of DNA-templated ligation, such as from a cDNA molecule. See, e.g., U.S. Pat. No. 8,551,710, which is hereby incorporated by reference in its entirety. In some embodiments, provided herein is a probe or probe set capable of RNA-templated ligation. See, e.g., U.S. Pat. Pub. 2020/0224244 which is hereby incorporated by reference in its entirety. In some embodiments, the probe set is a SNAIL probe set. See, e.g., U.S. Pat. Pub. 20190055594, which is hereby incorporated by reference in its entirety. In some embodiments, provided herein is a probe or probe set capable of proximity ligation, for instance a proximity ligation assay for RNA (e.g., PLAYR) probe set. See, e.g., U.S. Pat. Pub. 20160108458, which is hereby incorporated by reference in its entirety.

In some embodiments, a circular probe can be indirectly hybridized to the target nucleic acid. In some embodiments, the circular construct is formed from a probe set capable of proximity ligation, for instance a proximity ligation in situ hybridization (PLISH) probe set. See, e.g., U.S. Pat. Pub. 2020/0224243 which is hereby incorporated by reference in its entirety.

Figure 3A:
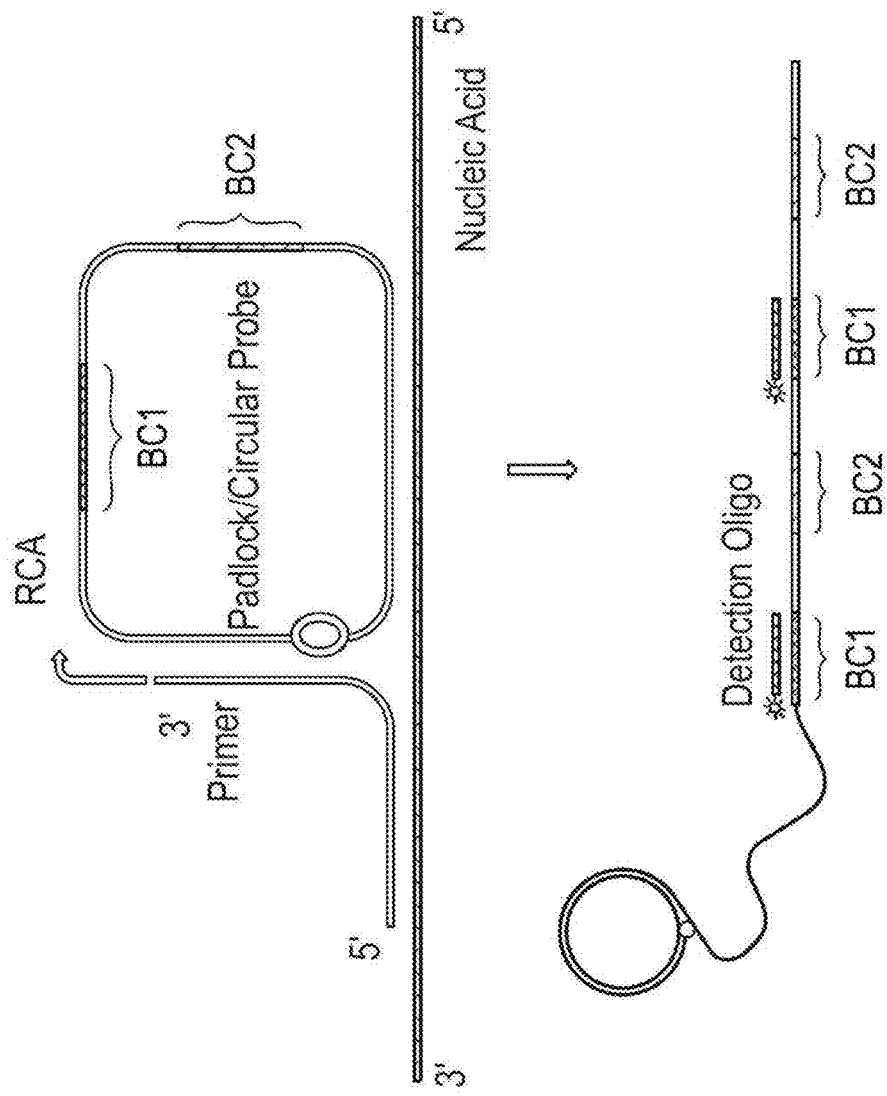
FIG. 3A shows an exemplary in situ assay, where an exemplary primary probe set (e.g., padlock/circular probe and primer) binds to an RNA target, and exemplary detection oligos hybridize to a barcode sequence of the primary probe or an amplification product (e.g., RCA product) thereof. In the case of a padlock probe, the padlock can be ligated using the primer as a DNA splint.

An exemplary probe set and hybridization complex are shown in FIG. 3A, where a padlock or circular probe directly hybridizes to an RNA transcript. A splint primer can be used to facilitate DNA-templated padlock ligation. The padlock or circular probe may comprise a targeting (e.g., target-hybridizing) sequence and one or more target barcode regions, such as primary barcode sequences BC1 and BC2 shown in FIG. 3A. After probe hybridization and/or any circularization steps to provide a circular probe, in some embodiments the circular probe is amplified, e.g., in a RCA reaction, to generate an amplified molecule (bottom panel of FIG. 3A) comprising the primary/target barcodes (e.g., BC1) or complementary sequences thereof. In some embodiments, after amplification, the method further comprises detecting the amplification product using a detectably labeled oligonucleotide (such as a fluorescently labeled detection oligo) that is capable of hybridizing to one or more of the barcode sequences (e.g., BC1 or BC2) or complementary sequences thereof.

Figure 3B:
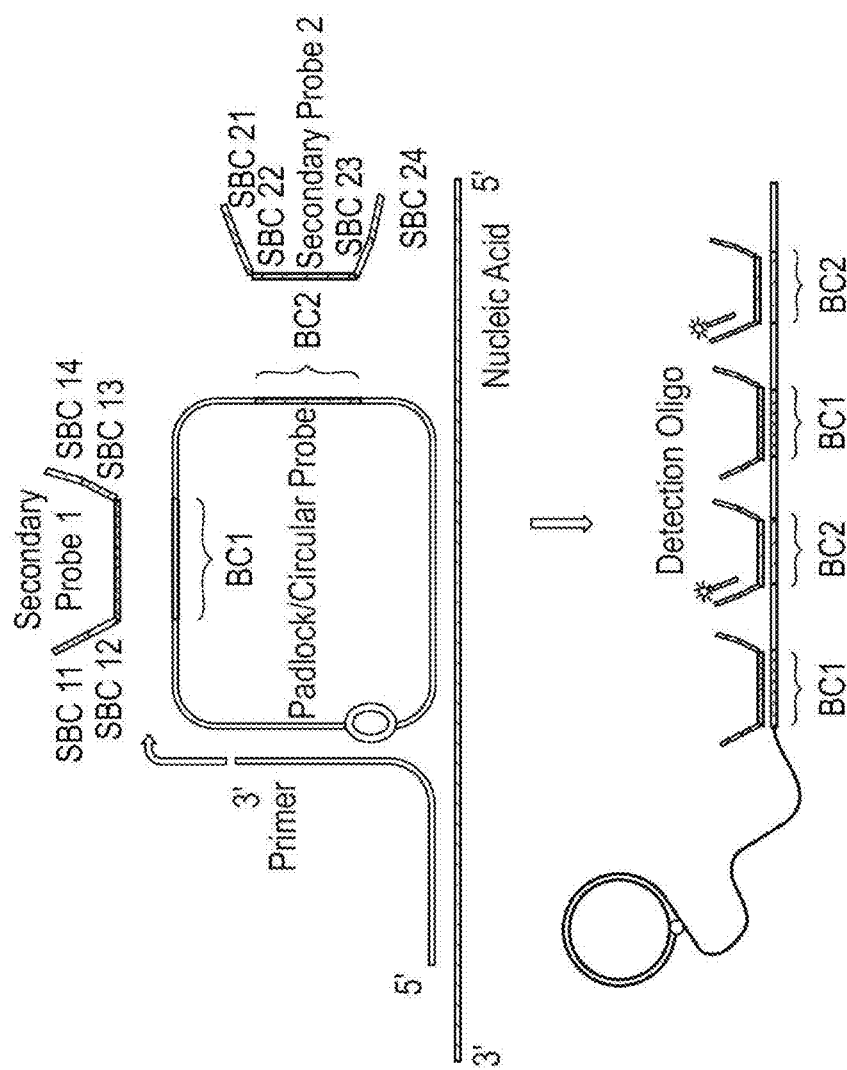
FIG. 3B shows an exemplary in situ assay, where an exemplary primary probe set (e.g., padlock/circular probe and primer) binds to an RNA target, exemplary secondary probes each hybridizes to a barcode sequence of the primary probe or an amplification product (e.g., RCA product) thereof, and detection oligos hybridize to a barcode sequence of a secondary probe. In the case of a padlock probe, the padlock can be ligated using the primer as a DNA splint.

Another exemplary probe set and hybridization complex are shown in FIG. 3B, where a padlock or circular probe directly hybridizes to an RNA transcript. A splint primer can be used to facilitate DNA-templated padlock ligation. The padlock or circular probe may comprise a targeting (e.g., target-hybridizing) sequence and one or more target barcode regions, such as primary barcode sequences BC1 and BC2 shown in FIG. 3B. After probe hybridization and/or any circularization steps to provide a circular probe, in some embodiments the circular probe is amplified, e.g., in a RCA reaction, to generate an amplified molecule (bottom panel of FIG. 3B) comprising the primary/target barcodes (e.g., BC1) or complementary sequences thereof. In some embodiments, after amplification, the method further comprises using a detection probe (e.g., a secondary probe) comprising (1) a barcode-binding region that hybridizes to the primary/target barcode region of the targeting probe directly or indirectly, and (2) two or more detection barcode regions (e.g., SBC11 and SBC12) that each hybridizes to a detectably labeled oligonucleotide. For example, FIG. 3B shows two detection probes, Secondary Probe 1 and Secondary Probe 2. Secondary Probe 1 comprises a barcode-binding region that hybridizes to BC1 of the targeting probe directly or indirectly, and four detection barcode regions, Secondary Barcodes (SBC) 11, SBC12, SBC13, and SBC14. Each of SBC11, SBC12, SBC13, and SBC14 is capable of hybridizing to a detectably labeled oligonucleotide, such as a fluorescently labeled detection oligo. Likewise, Secondary Probe 2 comprises a barcode-binding region that hybridizes to BC2 of the targeting probe directly or indirectly, and four detection barcode regions, Secondary Barcodes (SBC) 21, SBC22, SBC23, and SBC24, each of which is capable of hybridizing to a detectably labeled oligonucleotide, such as a fluorescently labeled detection oligo. In some embodiments, two or more of the secondary barcodes are different from each other. For example, all of the secondary barcodes of the secondary probes that bind to the same primary probe may be different, e.g., each secondary barcode may specifically hybridize to a detection oligo and be uniquely identified by the detection oligo sequence.

Although FIG. 3B shows secondary probes hybridized to the primary probe for ease of illustration, it should be appreciated that in some embodiments, the primary probe or a probe set comprising the primary probe hybridizes to the RNA target first, followed by amplification of the primary probe which is circular or circularized after target hybridization, e.g., using RCA. FIG. 3B shows an RCA product of the primary probe, where the primary barcodes BC1 and BC2 sequences or complementary sequences thereof are amplified. Thus, the RCA product is capable of hybridizing to a plurality of Secondary Probes 1 as well as a plurality of Secondary Probes 2.

In any of the embodiments disclosed herein, disclosed herein is a multiplexed assay where multiple target nucleic acids (e.g., genes or RNA transcripts) are probed with multiple primary probes (e.g., padlock primary probes), and optionally multiple secondary probes hybridizing to the primary barcodes (or complementary sequences thereof) are all hybridized at once, followed by sequential secondary barcode detection and decoding of the signals.

Figure 3C:
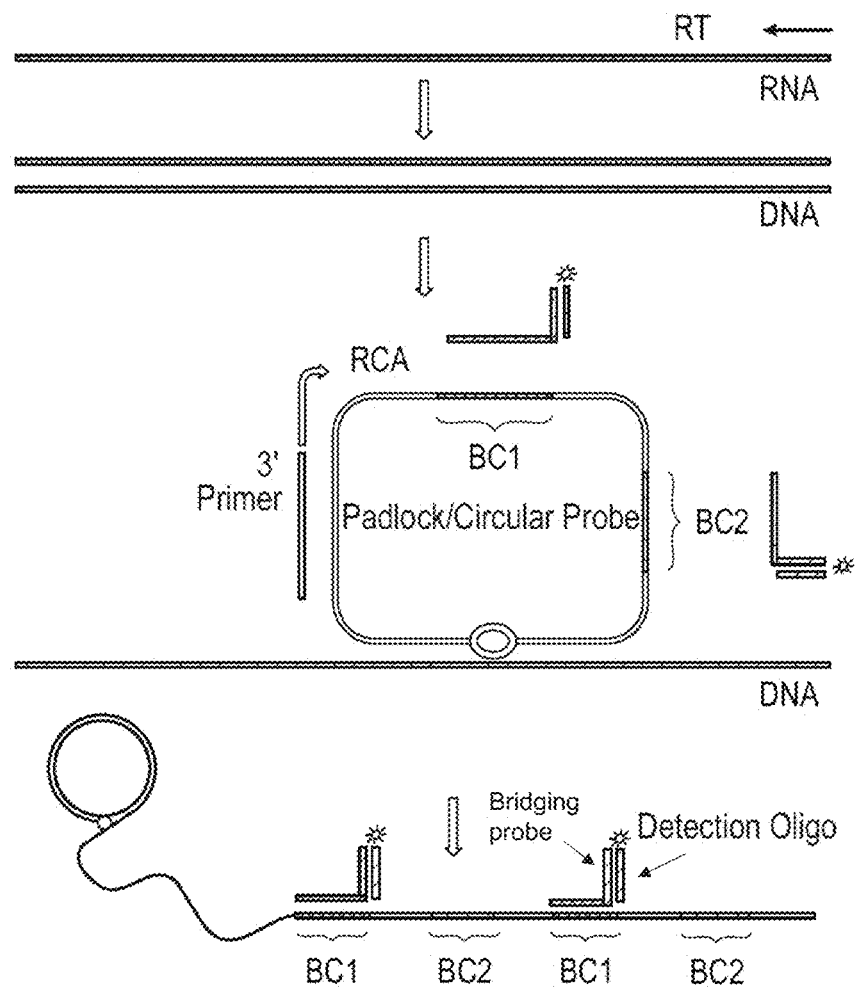
FIG. 3C shows an exemplary in situ assay. An RNA target is reverse transcribed to generate a DNA molecule, and an exemplary primary probe then hybridizes to the DNA molecule. In the case of a padlock probe, the padlock can be ligated using the DNA generated from the RNA as a splint. In some embodiments, the primary probe can directly hybridize to the RNA target and use the RNA as a splint for the ligation. An exemplary bridging probe hybridizes to a barcode sequence of the primary probe or an amplification product (e.g., RCA product) thereof, and detection oligos hybridize to the bridging probe.

FIG. 3C provides another exemplary in situ assay workflow. An RNA target is reverse transcribed to generate a DNA molecule, and a primary probe then hybridizes to the DNA molecule. In the case of a padlock probe, the padlock can be ligated using the DNA generated from the RNA as a splint. Instead of using secondary barcoded probes in FIG. 3B, FIG. 3C shows a bridging probe capable of hybridizing to a barcode sequence of the primary probe or an amplification product (e.g., RCA product) thereof (bottom panel of FIG. 3C). A bridging probe may comprise a sequence that does not hybridize to a barcode sequence (or complement thereof) of the primary probe but capable of hybridizing to one or more detectably labelled detection oligos. Exemplary methods of using detection oligos in a barcoding system via sequence-by-hybridization chemistry for spatial detection of RNA transcripts are described in US20210340618, the content of which is herein incorporated by reference in its entirety, and in Gyllborg et al., "Hybridization-based In Situ Sequencing (HybISS): spatial transcriptomic detection in human and mouse brain tissue," bioRxiv 2020.02.03.931618, which is incorporated herein by reference in its entirety.

Figure 4:
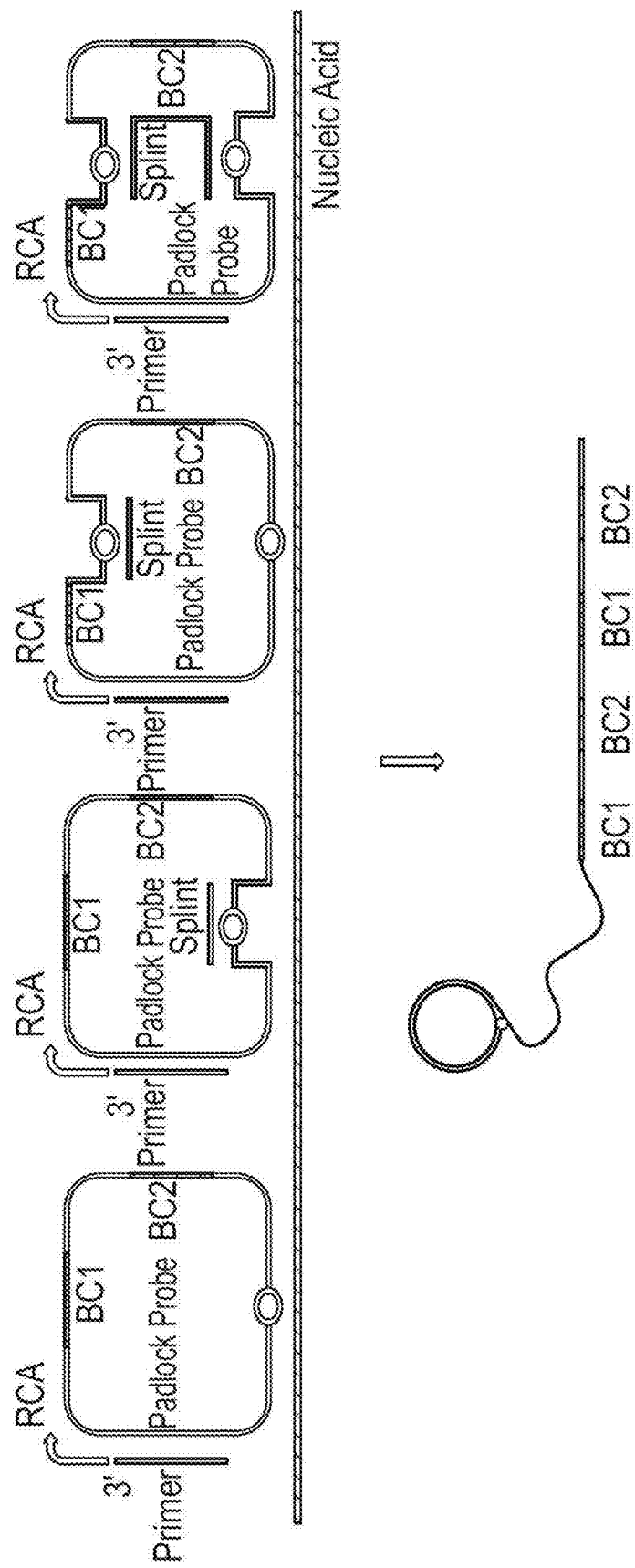
FIG. 4 shows exemplary in situ assays. Various primary probes can hybridize to an RNA target and be ligated using RNA-templated ligation and/or DNA-templated ligation to form a circularized probe comprising one or more barcode sequences. A secondary probe or bridging probe may be hybridized to the circularized probe or an amplification product thereof (e.g., as shown in FIGS. 3A-3C). Detection oligos may be hybridized to the circularized probe or an amplification product thereof, a secondary probe or an amplification product thereof, or a bridging probe (e.g., as shown in FIGS. 3A-3C).

FIG. 4 provides other exemplary in situ assay workflows. Various primary probes can hybridize to an RNA target and be ligated using RNA-templated ligation and/or DNA-templated ligation to form a circularized probe comprising one or more barcode sequences. A secondary probe or bridging probe may be hybridized to the circularized probe or an amplification product thereof (e.g., as shown in FIGS. 3A-3C). Detection oligos may be hybridized to the circularized probe or an amplification product thereof, a secondary probe or an amplification product thereof, or a bridging probe (e.g., as shown in FIGS. 3A-3C). For example, the padlock probe can be circularized using RNA-templated ligation, see, e.g., the first and third padlock probes in FIG. 4. An RNA-templated ligase can be used to close the circle of a linear DNA probe to circularize the padlock, and the ligation efficiency can be increased through the incorporation of ribonucleotides into DNA padlock probes. See, e.g., US 2020/0224244, which is incorporated herein by reference in its entirety. In some embodiments, padlock probe ligation efficiency may be increased by using DNA splint oligonucleotides such as those shown in the second and fourth padlock probes in FIG. 4. In some embodiments, the two halves (e.g., as shown in the fourth padlock probe in FIG. 4 before ligation) may serve as a DNA splint for each other for ligation. Any suitable methods of RNA-templated ligation or DNA-templated ligation may be used in the in situ assay and are encompassed in the present disclosure.

Figure 7A:
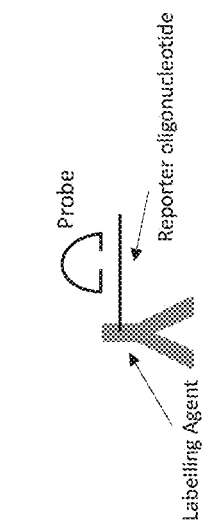
FIGS. 7A-7F show exemplary in situ assays, e.g., for a non-nucleic acid analyte, using a labelling agent disclosed herein.

Exemplary binding or labelling agents for in situ analysis are shown in FIG. 5, FIG. 6, and FIGS. 7A-7F. FIG. 7A shows exemplary binding or labelling agents (e.g., an antibody or antigen binding fragment thereof) comprising a reporter oligonucleotide. In some embodiments, the reporter oligonucleotide comprises a sequence corresponding to the labelling agent and therefore corresponds to (e.g., uniquely identifies) an analyte (e.g., a protein analyte) or cell feature that the labelling agent labels. In some embodiments, the labelling agent can comprise a reporter oligonucleotide comprising one or more barcode sequences. Thus, the reporter oligonucleotide can be a nucleic acid analyte disclosed herein, and can be analyzed using any methods disclosed herein. For example, as shown in FIG. 7A, a probe such as a padlock probe may be used to analyze a reporter oligonucleotide. In some examples, the reporter oligonucleotide of a labelling agent that specifically recognizes a protein can be analyzed using in situ hybridization (e.g., sequential hybridization) and/or in situ sequencing (e.g., using padlock probes and rolling circle amplification of ligated padlock probes). Further, the reporter oligonucleotide of the labelling agent and/or a complement thereof and/or a product (e.g., a hybridization product, a ligation product, an extension product (e.g., by a DNA or RNA polymerase), a replication product, a transcription/reverse transcription product, and/or an amplification product) thereof can be captured by a capture agent disclosed herein and analyzed.

Figure 7B:
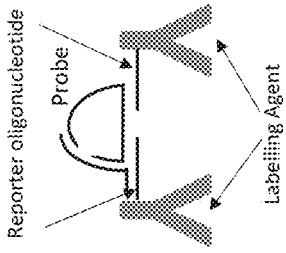
Figure 7C:
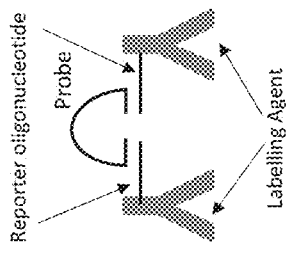
Figure 7D:
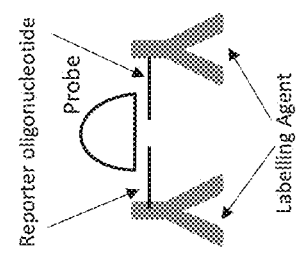
Figure 7E:
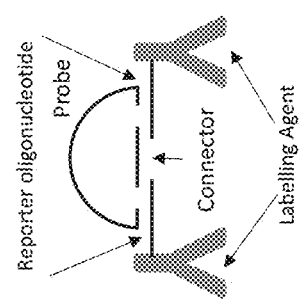

In some embodiments, an analyte (a nucleic acid analyte or non-nucleic acid analyte) can be specifically bound by one or more reporter oligonucleotide (e.g., antibodies) each of which is attached to a reporter oligonucleotide. In some embodiments, an analyte (a nucleic acid analyte or non-nucleic acid analyte) can be specifically bound by two labelling agents (e.g., antibodies) each of which is attached to a reporter oligonucleotide (e.g., DNA) that can participate in ligation, replication, and sequence decoding reactions, e.g., using a probe or probe set (e.g. a padlock probe as shown in FIG. 7B, a SNAIL probe set as shown in FIG. 7C, a circular probe as shown in FIG. 7D, or a padlock probe and a connector as shown in FIG. 7E). In some embodiments, the probe set may comprise two or more probe oligonucleotides, each comprising a region that is complementary to each other. For example, a proximity ligation reaction can include reporter oligonucleotides attached to pairs of antibodies that can be joined by ligation if the antibodies have been brought in proximity to each other, e.g., by binding the same target protein (complex), and the DNA ligation products that form are then used to template PCR amplification, as described for example in Söderberg et al., Methods. (2008), 45(3): 227-32, the entire contents of which are incorporated herein by reference. In some embodiments, a proximity ligation reaction can include reporter oligonucleotides attached to antibodies that each bind to one member of a binding pair or complex, for example, for analyzing a binding between members of the binding pair or complex. For detection of analytes using oligonucleotides in proximity, see, e.g., U.S. Patent Application Publication No. 2002/0051986, the entire contents of which are incorporated herein by reference. In some embodiments, two analytes in proximity can be specifically bound by two labelling agents (e.g., antibodies) each of which is attached to a reporter oligonucleotide (e.g., DNA) that can participate, when in proximity when bound to their respective targets, in ligation, replication, and/or sequence decoding reactions.

In FIGS. 7A, 7B, and 7E the one or more reporter oligonucleotide (and optionally one or more other nucleic acid molecules such as a connector shown in FIG. 7E) aids in the ligation of the probe. Upon ligation, the probe may form a circularized probe. In some embodiments, one or more suitable probes can be used and ligated, wherein the one or more probes comprise a sequence that is complementary to the one or more reporter oligonucleotides (or portion thereof). The probe may comprise one or more barcode sequences. In some embodiments, the one or more reporter oligonucleotide may serve as a primer for rolling circle amplification (RCA) of the circularized probe. In some embodiments, a nucleic acid other than the one or more reporter oligonucleotide is used as a primer for rolling circle amplification (RCA) of the circularized probe. For example, a nucleic acid capable of hybridizing to the circularized probe at a sequence other than sequence(s) hybridizing to the one or more reporter oligonucleotide can be used as the primer for RCA. In other examples, the primer in a SNAIL probe set (e.g., as shown in FIG. 7C) used as the primer for RCA.

Figure 7F:
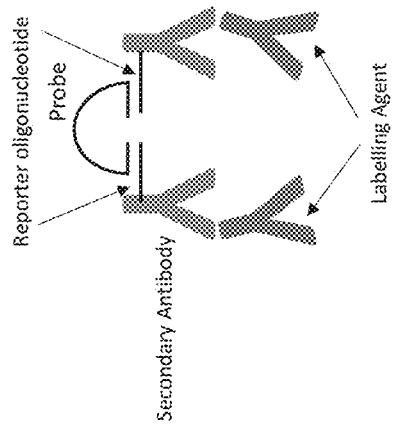

In FIG. 7F, one or more analytes can be specifically bound by two primary antibodies, each of which in turn recognized by a secondary antibody each attached to a reporter oligonucleotide (e.g., DNA). The secondary antibodies attached to reporter oligonucleotides, probes and probe sets, connectors, and/or primers can include any of those shown in FIGS. 7A-7E. Each nucleic acid molecule can aid in the ligation of the probe to form a circularized probe. In some instances, the probe can comprise one or more barcode sequences. Further, the reporter oligonucleotide may serve as a primer for rolling circle amplification of the circularized probe. The nucleic acid molecules, circularized probes, and RCA products can be analyzed using any suitable method disclosed herein for in situ analysis as well as spatial analysis.

In some embodiments, one or more probes directly or indirectly targeting one or more analytes (e.g., nucleic acids, proteins or cell features) are contacted with the sample prior to or during an in situ assay round. The one or more probes may include a labelling agent (e.g., an antibody comprising a reporter oligonucleotide), a padlock probe or probe set, templated ligation probes, an analyte capture agent, or any combination thereof. In some embodiments, one or more probes directly or indirectly targeting one or more analytes (e.g., nucleic acids, proteins or cell features) are contacted with the sample prior to an in situ assay round, wherein the one or more probes may include a labelling agent (e.g., an antibody comprising a reporter oligonucleotide), templated ligation probes, an analyte capture agent, or any combination thereof.

C. Ligation

In some embodiments, the provided methods involve ligating one or more polynucleotides that are part of a hybridization complex that comprises a target nucleic acid for in situ analysis. In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as *E. coli* DNA ligase, Tth DNA ligase, *Thermococcus* sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some embodiments, the ligase is a T4 RNA ligase. In some embodiments, the ligase is a splintR ligase. In some embodiments, the ligase is a single stranded DNA ligase. In some embodiments, the ligase is a T4 DNA ligase. In some embodiments, the ligase is a ligase that has an DNA-splinted DNA ligase activity. In some embodiments, the ligase is a ligase that has an RNA-splinted DNA ligase activity.

In some embodiments, the ligation herein is a direct ligation. In some embodiments, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, i.e., separated by one or more intervening nucleotides or "gaps". In some embodiments, said ends are not ligated directly to each other, but instead occurs either via the intermediacy of one or more intervening (so-called "gap" or "gap-filling" (oligo) nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo)nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific embodiments, the gap may be a gap of about 1, 2, 3, 4, 5, 6, 7, 8, 9 or 10 or more nucleotides, of any integer (or range of integers) of nucleotides in between the indicated values. In some embodiments, the gap between said terminal regions may be filled by a gap oligonucleotide or by extending the 3' end of a polynucleotide. In some cases, ligation involves ligating the ends of the probe to at least one gap (oligo)nucleotide, such that the gap (oligo)nucleotide becomes incorporated into the resulting polynucleotide. In some embodiments, the ligation herein is preceded by gap filling. In other embodiments, the ligation herein does not require gap filling.

In some embodiments, ligation of the polynucleotides produces polynucleotides with melting temperature higher than that of unligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

D. Amplification

In some embodiments, the methods disclosed herein may comprise the step of amplifying one or more polynucleotides, for instance the padlock probe or a circular probe formed from the padlock probe. In some embodiments, the amplifying is achieved by performing rolling circle amplification (RCA). In other embodiments, a primer that hybridizes to the padlock probe is added and used as such for amplification.

In some embodiments, a removing step is performed to remove molecules that are not specifically hybridized to the target nucleic acid and/or the circular probe. In some embodiments, the removing step is performed to remove unligated probes. In some embodiments, the removing step is performed after ligation and prior to amplification.

In some embodiments, the amplification is performed at a temperature between or between about 20° C. and about 60° C. In some embodiments, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some embodiments, upon addition of a DNA polymerase in the presence of appropriate dNTP precursors and other cofactors, a primer is elongated to produce multiple copies of the circular template. This amplification step can utilize isothermal amplification or non-isothermal amplification. In some embodiments, after the formation of the hybridization complex and association of the amplification probe, the hybridization complex is rolling-circle amplified to generate a cDNA nanoball (i.e., amplicon) containing multiple copies of the cDNA. Techniques for rolling circle amplification (RCA) are known in the art such as linear RCA, a branched RCA, a dendritic RCA, or any combination thereof (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49(11): 2540-2550; Schweitzer et al. Proc. Natl Acad. Sci. USA 97:101 13-119, 2000; Faruqi et al, BMC Genomics 2:4, 2000; Nallur et al, Nucl. Acids Res. 29:el 18, 2001; Dean et al. Genome Res. 11:1095-1099, 2001; Schweitzer et al, Nature Biotech. 20:359-365, 2002; U.S. Pat. Nos. 6,054, 274, 6,291,187, 6,323,009, 6,344,329 and 6,368,801). Exemplary polymerases for use in RCA comprise DNA polymerase such phi29 (φ29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some embodiments, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some embodiments, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some aspects, the polynucleotides and/or amplification product (e.g., amplicon) can be anchored to a polymer matrix. For example, the polymer matrix can be a hydrogel. In some embodiments, one or more of the polynucleotide probe(s) can be modified to contain functional groups that can be used as an anchoring site to attach the polynucleotide probes and/or amplification product to a polymer matrix.

Exemplary modification and polymer matrix that can be employed in accordance with the provided embodiments comprise those described in, for example, US 2018/0051322, WO 2017/079406, U.S. Pat. No. 10,266,888, US 2016/0024555, US 2018/0251833 and U.S. Pat. No. 10,545, 075, the contents of each of which are herein incorporated by reference in their entirety. In some examples, the scaffold also contains modifications or functional groups that can react with or incorporate the modifications or functional groups of the probe set or amplification product. In some examples, the scaffold can comprise oligonucleotides, polymers or chemical groups, to provide a matrix and/or support structures.

The amplification products may be immobilized within the matrix generally at the location of the nucleic acid being amplified, thereby creating a localized colony of amplicons. The amplification products may be immobilized within the matrix by steric factors. The amplification products may also be immobilized within the matrix by covalent or noncovalent bonding. In this manner, the amplification products may be considered to be attached to the matrix. By being immobilized to the matrix, such as by covalent bonding or cross-linking, the size and spatial relationship of the original amplicons is maintained. By being immobilized to the matrix, such as by covalent bonding or cross-linking, the amplification products are resistant to movement or unraveling under mechanical stress.

In some aspects, the amplification products are copolymerized and/or covalently attached to the surrounding matrix thereby preserving their spatial relationship and any information inherent thereto. For example, if the amplification products are those generated from DNA or RNA within a cell embedded in the matrix, the amplification products can also be functionalized to form covalent attachment to the matrix preserving their spatial information within the cell thereby providing a subcellular localization distribution pattern. In some embodiments, the provided methods involve embedding the one or more polynucleotide probe sets and/or the amplification products in the presence of hydrogel subunits to form one or more hydrogel-embedded amplification products. In some embodiments, the hydrogel-tissue chemistry described comprises covalently attaching nucleic acids to in situ synthesized hydrogel for tissue clearing, enzyme diffusion, and multiple-cycle sequencing while an existing hydrogel-tissue chemistry method cannot. In some embodiments, to enable amplification product embedding in the tissue-hydrogel setting, amine-modified nucleotides are comprised in the amplification step (e.g., RCA), functionalized with an acrylamide moiety using acrylic acid N-hydroxysuccinimide esters, and copolymerized with acrylamide monomers to form a hydrogel.

E. Detection

In some aspects, the methods disclosed herein involve the use of one or more probes or probe sets that directly or indirectly hybridize to a target nucleic acid, such as an RNA molecule. In some aspects, a sample is contacted with a plurality of barcoded probe sets, each for analyzing an analyte (e.g., biomarker) panel. The sample can be contacted, in separate rounds, with different detectably labeled oligonucleotides for analyzing one or more sets in the barcoded probe sets (and thereby analyzing the one or more analyte panels corresponding to the one or more sets). The detectably labeled oligonucleotides can be changed between rounds while the barcoded probes remain bound to analytes in the sample.

In some embodiments, a detectably labeled oligonucleotide directly hybridizes to its target, e.g., a transcript or DNA locus. In some embodiments, a detectably labeled oligonucleotide specifically interacts with (recognizes) its target through binding or hybridization to one or more intermediate, e.g., an oligonucleotide, that is bound, hybridized, or otherwise specifically linked to the target. In some embodiments, an intermediate oligonucleotide is a barcoded probe.

In some embodiments, an intermediate oligonucleotide or probe is hybridized against its target with an overhang such that a second oligonucleotide with complementary sequence ("bridge oligonucleotide" or "bridge probe") can bind to it. In some embodiments, an intermediate oligonucleotide targets a nucleic acid and is optionally labeled with a detectable moiety, and comprises an overhang sequence after hybridization with the target. In some embodiments, an intermediate oligonucleotide comprises a sequence that hybridizes to a target, an overhang sequence, and optionally a detectable moiety. In some embodiments, an intermediate oligonucleotide (e.g., barcoded probes that directly bind analytes in a sample) comprises a sequence that hybridizes to a target and an overhang sequence. In some embodiments, an intermediate does not have a detectable moiety. In some embodiments, a second oligonucleotide is a detectably labeled oligonucleotide. In some embodiments, a second detectably labeled oligonucleotide is labeled with a dye. In some embodiments, a detectably labeled oligonucleotide is labeled with an HCR polymer. In some embodiments, intermediate oligonucleotides bound to targets are preserved through multiple contacting, removing and/or imaging steps; sequential barcodes are provided through combinations of detectable labels that are linked to intermediate oligonucleotides through bridge probes in the contacting and imaging steps. For example, when detectably labeled oligonucleotides are used as bridge probes, barcodes are provided by detectably labeled oligonucleotides that hybridize with intermediate oligonucleotides through their overhang sequences. After an imaging step, bridge oligonucleotides are optionally removed as described herein. In some embodiments, one intermediate oligonucleotide is employed for a target. In some embodiments, two or more intermediate oligonucleotides are employed for a target. In some embodiments, three or more intermediate oligonucleotides are employed for a target. In some embodiments, four or more intermediate oligonucleotides are employed for a target. In some embodiments, five or more intermediate oligonucleotides are employed for a target.

In some embodiments, each intermediate oligonucleotide hybridizes with a different sequence of a target. In some embodiments, each intermediate oligonucleotide of a target comprises the same overhang sequence. In some embodiments, each detectably labeled oligonucleotide for a target comprises the same sequence complimentary to the same overhang sequence shared by all intermediate oligonucleotides of the target. In some embodiments, an intermediate oligonucleotide comprises a sequence complimentary to a target, and a sequence complimentary to a detectably labeled oligonucleotide.

In some embodiments, each detectably labeled oligonucleotide in a set has a different target, e.g., a transcript or DNA locus. In some embodiments, two or more detectably labeled oligonucleotides in a set have the same target. In some embodiments, two or more detectably labeled oligonucleotides target the same transcript. In some embodiments, two or more detectably labeled oligonucleotides target the same DNA locus. In some embodiments, about 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90 or 100 detectably labeled oligonucleotides the same target. In some embodiments, two or more detectably labeled oligonucleotides target the same target. In some embodiments, five or more detectably labeled oligonucleotides target the same target.

In some embodiments, among other things, using multiple detectably labeled oligonucleotides for the same target increases signal intensity. In some embodiments, each detectably labeled oligonucleotide in a set targeting the same target interacts with a different portion of a target.

In some embodiments, all detectably labeled oligonucleotides for a target in a set have the same detectable moieties. In some embodiments, all detectably labeled oligonucleotides are labeled in the same way. In some embodiments, all the detectably labeled oligonucleotides for a target have the same fluorophore.

In some embodiments, detectably labeled oligonucleotides for a target are positioned within a targeted region of a target. A targeted region can have various lengths. In some embodiments, a targeted region is about 20 bp in length. In some embodiments, a targeted region is about 30 bp in length. In some embodiments, a targeted region is about 40 bp in length. In some embodiments, a targeted region is about 50 bp in length. In some embodiments, a targeted region is about 60 bp in length. In some embodiments, a targeted region is about 80 bp in length. In some embodiments, a targeted region is about 100 bp in length. In some embodiments, a targeted region is about 150 bp in length. In some embodiments, a targeted region is about 200 bp in length. In some embodiments, a targeted region is about 250 bp in length. In some embodiments, a targeted region is about 300 bp in length. In some embodiments, a targeted region is about 350 bp in length. In some embodiments, a targeted region is about 400 bp in length. In some embodiments, a targeted region is about 450 bp in length. In some embodiments, a targeted region is about 500 bp in length. In some embodiments, a targeted region is about 600 bp in length. In some embodiments, a targeted region is about 700 bp in length. In some embodiments, a targeted region is about 800 bp in length. In some embodiments, a targeted region is about 900 bp in length. In some embodiments, a targeted region is about 1,000 bp in length. In some embodiments, detectably labeled oligonucleotides for a target are positioned in proximity to each other on the target.

In some embodiments, targets of one set of detectably labeled oligonucleotides are also targets of another set. In some embodiments, targets of one set of detectably labeled oligonucleotides overlap with those of another set. In some embodiments, the overlap is more than 10%, 20%, 30%, 40%, 50%, 60%, 70%, 80%, 90%, 95%, or 100%. In some embodiments, targets of one set of detectably labeled oligonucleotides are the same as targets of another set. In some embodiments, each set of detectably labeled oligonucleotides targets the same targets.

As used herein, a detectably labeled oligonucleotide is labeled with a detectable moiety. In some embodiments, a detectably labeled oligonucleotide comprises one detectable moiety. In some embodiments, a detectably labeled oligonucleotide comprises two or more detectable moieties. In some embodiments, a detectably labeled oligonucleotide has one detectable moiety. In some embodiments, a detectably labeled oligonucleotide has two or more detectable moiety.

Probes and methods for binding and identifying a target nucleic acid have been described in, e.g., US2003/0013091, US2007/0166708, US2010/0015607, US2010/0261026, US2010/0262374, US2010/0112710, US2010/0047924, and US2014/0371088, each of which is incorporated herein by reference in its entirety.

In some embodiments, a detectable moiety is or comprises a nanomaterial. In some embodiments, a detectable moiety is or compresses a nanoparticle. In some embodiments, a detectable moiety is or comprises a quantum dot. In some embodiments, a detectable moiety is a quantum dot. In some embodiments, a detectable moiety comprises a quantum dot. In some embodiments, a detectable moiety is or comprises a gold nanoparticle. In some embodiments, a detectable moiety is a gold nanoparticle. In some embodiments, a detectable moiety comprises a gold nanoparticle.

One of skill in the art understands that, in some embodiments, selection of label for a particular probe in a particular cycle may be determined based on a variety of factors, including, for example, size, types of signals generated, manners attached to or incorporated into a probe, properties of the cellular constituents including their locations within the cell, properties of the cells, types of interactions being analyzed, and etc.

For example, in some embodiments, probes are labeled with either Cy3 or Cy5 that has been synthesized to carry an N-hydroxysuccinimidyl ester (NETS-ester) reactive group. Since NHS-esters react readily with aliphatic amine groups, nucleotides can be modified with aminoalkyl groups. This can be done through incorporating aminoalkyl-modified nucleotides during synthesis reactions. In some embodiments, a label is used in every 60 bases to avoid quenching effects.

In some embodiments, sequence analysis of the target and/or barcoded probes can be performed by sequential fluorescence hybridization (e.g., sequencing by hybridization). Sequential fluorescence hybridization can involve sequential hybridization of detection probes comprising an oligonucleotide and a detectable label. In some embodiments, a method disclosed herein can comprise sequential fluorescence hybridization of detectable probes, including detectably labeled probes (e.g., fluorophore conjugated oligonucleotides) and/or probes (e.g., bridging probes as shown in FIG. 3C) that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, WO 2020/099640, US 2021/0340618, and WO 2021/138676, all of which are incorporated herein by reference.

In some embodiments, sequencing can be performed by sequencing-by-synthesis (SBS). In some embodiments, a sequencing primer is complementary to sequences at or near the one or more barcode(s). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, U.S. Pat. No. 10,953,379, US 2005/0100900, U.S. Pat. Nos. 9,970,055, 10,710,046, US 2012/0270305, US 2013/0260372, and US 2013/0079232, the contents of each of which are herein incorporated by reference in their entirety.

In some embodiments, sequencing can be performed using single molecule sequencing by ligation. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. *Science* (2005), 309: 1728-1732, and in U.S. Pat. Nos. 5,599,675; 5,750,341; 6,969,488; 6,172,218; and 6,306,597, the contents of each of which are herein incorporated by reference in their entirety.

In some embodiments, the barcodes of the detection probes are targeted by detectably labeled detection oligonucleotides, such as fluorescently labeled oligonucleotides. In some embodiments, one or more decoding schemes are used to decode the signals, such as fluorescence, for sequence determination. In any of the embodiments herein, barcodes (e.g., primary and/or secondary barcode sequences) can be analyzed (e.g., detected or sequenced) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides). Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); U.S. Pat. No. 10,457,980 B2; US 2016/0369329 A1; U.S. Pat. No. 10,510,435A1; and US 2017/0220733 A1, all of which are incorporated by reference in their entirety. In some embodiments, these assays enable signal amplification, combinatorial decoding, and error correction schemes at the same time.

In some embodiments, nucleic acid hybridization can be used for sequencing. These methods utilize labeled nucleic acid decoder probes that are complementary to at least a portion of a barcode sequence. Multiplex decoding can be performed with pools of many different probes with distinguishable labels. Non-limiting examples of nucleic acid hybridization sequencing are described for example in U.S. Pat. No. 8,460,865, and in Gunderson et al., *Genome Research* 14:870-877 (2004), the contents of each of which are herein incorporated by reference in their entirety.

In some embodiments, real-time monitoring of DNA polymerase activity can be used during sequencing. For example, nucleotide incorporations can be detected through fluorescence resonance energy transfer (FRET), as described for example in Levene et al., *Science* (2003), 299, 682-686, Lundquist et al., *Opt. Lett.* (2008), 33, 1026-1028, and Korlach et al., *Proc. Natl. Acad. Sci. USA* (2008), 105, 1176-1181, the contents of each of which are herein incorporated by reference in their entirety.

In some aspects, the analysis and/or sequence determination can be carried out at room temperature for best preservation of tissue morphology with low background noise and error reduction. In some embodiments, the analysis and/or sequence determination comprises eliminating error accumulation as sequencing proceeds.

In some embodiments, the analysis and/or sequence determination involves washing to remove unbound polynucleotides, thereafter revealing a fluorescent product for imaging.

In some aspects, the detection (comprising imaging) is carried out using any of a number of different types of microscopy, e.g., confocal microscopy, two-photon microscopy, light-field microscopy, intact tissue expansion microscopy, and/or CLARITY™-optimized light sheet microscopy (COLM).

In some embodiments, fluorescence microscopy is used for detection and imaging of the detection probe. In some aspects, a fluorescence microscope is an optical microscope that uses fluorescence and phosphorescence instead of, or in addition to, reflection and absorption to study properties of organic or inorganic substances. In fluorescence microscopy, a sample is illuminated with light of a wavelength which excites fluorescence in the sample. The fluoresced light, which is usually at a longer wavelength than the illumination, is then imaged through a microscope objective. Two filters may be used in this technique; an illumination (or excitation) filter which ensures the illumination is near monochromatic and at the correct wavelength, and a second emission (or barrier) filter which ensures none of the excitation light source reaches the detector. Alternatively, these functions may both be accomplished by a single dichroic filter. The "fluorescence microscope" comprises any microscope that uses fluorescence to generate an image, whether it is a more simple set up like an epifluorescence microscope, or a more complicated design such as a confocal microscope, which uses optical sectioning to get better resolution of the fluorescent image.

In some embodiments, confocal microscopy is used for detection and imaging of the detection probe. Confocal microscopy uses point illumination and a pinhole in an optically conjugate plane in front of the detector to eliminate out-of-focus signal. As only light produced by fluorescence very close to the focal plane can be detected, the image's optical resolution, particularly in the sample depth direction, is much better than that of wide-field microscopes. However, as much of the light from sample fluorescence is blocked at the pinhole, this increased resolution is at the cost of decreased signal intensity—so long exposures are often required. As only one point in the sample is illuminated at a time, 2D or 3D imaging requires scanning over a regular raster (i.e., a rectangular pattern of parallel scanning lines) in the specimen. The achievable thickness of the focal plane is defined mostly by the wavelength of the used light divided by the numerical aperture of the objective lens, but also by the optical properties of the specimen. The thin optical sectioning possible makes these types of microscopes particularly good at 3D imaging and surface profiling of samples. CLARITY™-optimized light sheet microscopy (COLM) provides an alternative microscopy for fast 3D imaging of large clarified samples. COLM interrogates large immunostained tissues, permits increased speed of acquisition and results in a higher quality of generated data.

Other types of microscopy that can be employed comprise bright field microscopy, oblique illumination microscopy, dark field microscopy, phase contrast, differential interference contrast (DIC) microscopy, interference reflection microscopy (also known as reflected interference contrast, or RIC), single plane illumination microscopy (SPIM), super-resolution microscopy, laser microscopy, electron microscopy (EM), Transmission electron microscopy (TEM), Scanning electron microscopy (SEM), reflection electron microscopy (REM), Scanning transmission electron microscopy (STEM) and low-voltage electron microscopy (LVEM), scanning probe microscopy (SPM), atomic force microscopy (ATM), ballistic electron emission microscopy (BEEM), chemical force microscopy (CFM), conductive atomic force microscopy (C-AFM), electrochemical scanning tunneling microscope (ECSTM), electrostatic force microscopy (EFM), fluidic force microscope (FluidFM), force modulation microscopy (FMM), feature-oriented scanning probe microscopy (FOSPM), kelvin probe force microscopy (KPFM), magnetic force microscopy (MFM), magnetic resonance force microscopy (MRFM), near-field scanning optical microscopy (NSOM) (or SNOM, scanning near-field optical microscopy, SNOM, Piezoresponse Force Microscopy (PFM), PSTM, photon scanning tunneling microscopy (PSTM), PTMS, photothermal microspectroscopy/microscopy (PTMS), SCM, scanning capacitance microscopy (SCM), SECM, scanning electrochemical microscopy (SECM), SGM, scanning gate microscopy (SGM), SHPM, scanning Hall probe microscopy (SHPM), SICM, scanning ion-conductance microscopy (SICM), SPSM spin polarized scanning tunneling microscopy (SPSM), SSRM, scanning spreading resistance microscopy (SSRM), SThM, scanning thermal microscopy (SThM), STM, scanning tunneling microscopy (STM), STP, scanning tunneling potentiometry (STP), SVM, scanning voltage microscopy (SVM), and synchrotron x-ray scanning tunneling microscopy (SXSTM), and intact tissue expansion microscopy (exM).

V. Terminology

Specific terminology is used throughout this disclosure to explain various aspects of the apparatus, systems, methods, and compositions that are described.

Having described some illustrative embodiments of the disclosure, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

As used herein, the singular forms "a," "an," and "the" include plural referents unless the context clearly dictates otherwise. For example, "a" or "an" means "at least one" or "one or more."

The term "about" as used herein refers to the usual error range for the respective value readily known to the skilled person in this technical field. Reference to "about" a value or parameter herein includes (and describes) embodiments that are directed to that value or parameter per se.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

(i) Barcode

A "barcode" is a label, or identifier, that conveys or is capable of conveying information (e.g., information about an analyte in a sample). A barcode can be part of an analyte, or independent of an analyte. A barcode can be attached to an analyte. A particular barcode can be unique relative to other barcodes.

Barcodes can have a variety of different formats. For example, barcodes can include polynucleotide barcodes, random nucleic acid and/or amino acid sequences, and synthetic nucleic acid and/or amino acid sequences. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI").

Barcodes can spatially-resolve molecular components found in biological samples, for example, at single-cell resolution (e.g., a barcode can be or can include a "spatial barcode"). In some embodiments, a barcode includes both a UMI and a spatial barcode. In some embodiments, a barcode includes two or more sub-barcodes that together function as a single barcode. For example, a polynucleotide barcode can include two or more polynucleotide sequences (e.g., sub-barcodes) that are separated by one or more non-barcode sequences.

(ii) Nucleic Acid and Nucleotide

The terms "nucleic acid" and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage including any of a variety of those known in the art. Naturally-occurring nucleic acids generally have a deoxyribose sugar (e.g., found in deoxyribonucleic acid (DNA)) or a ribose sugar (e.g. found in ribonucleic acid (RNA)).

A nucleic acid can contain nucleotides having any of a variety of analogs of these sugar moieties that are known in the art. A nucleic acid can include native or non-native nucleotides. In this regard, a native deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G). Useful non-native bases that can be included in a nucleic acid or nucleotide are known in the art.

(iii) Probe and Target

A "probe" or a "target," when used in reference to a nucleic acid or sequence of a nucleic acids, is intended as a semantic identifier for the nucleic acid or sequence in the context of a method or composition, and does not limit the structure or function of the nucleic acid or sequence beyond what is expressly indicated.

(iv) Oligonucleotide and Polynucleotide

The terms "oligonucleotide" and "polynucleotide" are used interchangeably to refer to a single-stranded multimer of nucleotides from about 2 to about 500 nucleotides in length. Oligonucleotides can be synthetic, made enzymatically (e.g., via polymerization), or using a "split-pool" method. Oligonucleotides can include ribonucleotide monomers (i.e., can be oligoribonucleotides) and/or deoxyribonucleotide monomers (i.e., oligodeoxyribonucleotides). In some examples, oligonucleotides can include a combination of both deoxyribonucleotide monomers and ribonucleotide monomers in the oligonucleotide (e.g., random or ordered combination of deoxyribonucleotide monomers and ribonucleotide monomers). An oligonucleotide can be 4 to 10, 10 to 20, 21 to 30, 31 to 40, 41 to 50, 51 to 60, 61 to 70, 71 to 80, 80 to 100, 100 to 150, 150 to 200, 200 to 250, 250 to 300, 300 to 350, 350 to 400, or 400-500 nucleotides in length, for example. Oligonucleotides can include one or more functional moieties that are attached (e.g., covalently or non-covalently) to the multimer structure. For example, an oligonucleotide can include one or more detectable labels (e.g., a radioisotope or fluorophore).

(v) Subject

A "subject" is an animal, such as a mammal (e.g., human or a non-human simian), or avian (e.g., bird), or other organism, such as a plant. Examples of subjects include, but are not limited to, a mammal such as a rodent, mouse, rat, rabbit, guinea pig, ungulate, horse, sheep, pig, goat, cow, cat, dog, primate (i.e. human or non-human primate); a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, or honey bee; an arachnid such as a spider; a fish such as zebrafish; a reptile; an amphibian such as a frog or *Xenopus laevis*; a *Dictyostelium discoideum*; a fungi such as *Pneumocystis carinii, Takifugu rubripes*, yeast, *Saccharamoyces cerevisiae* or *Schizosaccharomyces pombe*; or a *Plasmodium falciparum*.

(vi) Splint Oligonucleotide

A "splint oligonucleotide" is an oligonucleotide that, when hybridized to other polynucleotides, acts as a "splint" to position the polynucleotides next to one another so that they can be ligated together. In some embodiments, the splint oligonucleotide is DNA or RNA. The splint oligonucleotide can include a nucleotide sequence that is partially complimentary to nucleotide sequences from two or more different oligonucleotides. In some embodiments, the splint oligonucleotide assists in ligating a "donor" oligonucleotide and an "acceptor" oligonucleotide. In general, an RNA ligase, a DNA ligase, or another other variety of ligase is used to ligate two nucleotide sequences together.

In some embodiments, the splint oligonucleotide is between 10 and 50 oligonucleotides in length, e.g., between 10 and 45, 10 and 40, 10 and 35, 10 and 30, 10 and 25, or 10 and 20 oligonucleotides in length. In some embodiments, the splint oligonucleotide is between 15 and 50, 15 and 45, 15 and 40, 15 and 35, 15 and 30, 15 and 30, or 15 and 25 nucleotides in length.

(vii) Adaptor, Adapter, and Tag

An "adaptor," an "adapter," and a "tag" are terms that are used interchangeably in this disclosure, and refer to species that can be coupled to a polynucleotide sequence (in a process referred to as "tagging") using any one of many different techniques including (but not limited to) ligation, hybridization, and tagmentation. Adaptors can also be nucleic acid sequences that add a function, e.g., spacer sequences, primer sequences/sites, barcode sequences, unique molecular identifier sequences.

(viii) Hybridizing, Hybridize, Annealing, and Anneal

The terms "hybridizing," "hybridize," "annealing," and "anneal" are used interchangeably in this disclosure, and refer to the pairing of substantially complementary or complementary nucleic acid sequences within two different molecules. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

(ix) Primer

A "primer" is a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence.

(x) Primer Extension

A "primer extension" refers to any method where two nucleic acid sequences become linked (e.g., hybridized) by an overlap of their respective terminal complementary nucleic acid sequences (i.e., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

(xi) Proximity Ligation

A "proximity ligation" is a method of ligating two (or more) nucleic acid sequences that are in proximity with each other through enzymatic means (e.g., a ligase). In some embodiments, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference).

A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

(xii) Nucleic Acid Extension

A "nucleic acid extension" generally involves incorporation of one or more nucleic acids (e.g., A, G, C, T, U, nucleotide analogs, or derivatives thereof) into a molecule (such as, but not limited to, a nucleic acid sequence) in a template-dependent manner, such that consecutive nucleic acids are incorporated by an enzyme (such as a polymerase or reverse transcriptase), thereby generating a newly synthesized nucleic acid molecule. For example, a primer that hybridizes to a complementary nucleic acid sequence can be used to synthesize a new nucleic acid molecule by using the complementary nucleic acid sequence as a template for nucleic acid synthesis. Similarly, a 3' polyadenylated tail of an mRNA transcript that hybridizes to a poly (dT) sequence (e.g., capture domain) can be used as a template for single-strand synthesis of a corresponding cDNA molecule.

(xiii) PCR Amplification

A "PCR amplification" refers to the use of a polymerase chain reaction (PCR) to generate copies of genetic material, including DNA and RNA sequences. Suitable reagents and conditions for implementing PCR are described, for example, in U.S. Pat. Nos. 4,683,202, 4,683,195, 4,800,159, 4,965,188, and 5,512,462, the entire contents of each of which are incorporated herein by reference. In a typical PCR amplification, the reaction mixture includes the genetic material to be amplified, an enzyme, one or more primers that are employed in a primer extension reaction, and reagents for the reaction. The oligonucleotide primers are of sufficient length to provide for hybridization to complementary genetic material under annealing conditions. The length of the primers generally depends on the length of the amplification domains, but will typically be at least 4 bases, at least 5 bases, at least 6 bases, at least 8 bases, at least 9 bases, at least 10 base pairs (bp), at least 11 bp, at least 12 bp, at least 13 bp, at least 14 bp, at least 15 bp, at least 16 bp, at least 17 bp, at least 18 bp, at least 19 bp, at least 20 bp, at least 25 bp, at least 30 bp, at least 35 bp, and can be as long as 40 bp or longer, where the length of the primers will generally range from 18 to 50 bp. The genetic material can be contacted with a single primer or a set of two primers (forward and reverse primers), depending upon whether primer extension, linear or exponential amplification of the genetic material is desired.

In some embodiments, the PCR amplification process uses a DNA polymerase enzyme. The DNA polymerase activity can be provided by one or more distinct DNA polymerase enzymes. In certain embodiments, the DNA polymerase enzyme is from a bacterium, e.g., the DNA polymerase enzyme is a bacterial DNA polymerase enzyme. For instance, the DNA polymerase can be from a bacterium of the genus *Escherichia, Bacillus, Thermophilus*, or *Pyrococcus*.

Suitable examples of DNA polymerases that can be used include, but are not limited to: *E. coli* DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® Quick-Load® DNA polymerase, Hemo KlenTaq® DNA polymerase, REDTaq® DNA polymerase, Phusion® DNA polymerase, Phusion® High-Fidelity DNA polymerase, Platinum Pfx DNA polymerase, AccuPrime Pfx DNA polymerase, Phi29 DNA polymerase, Klenow fragment, Pwo DNA polymerase, Pfu DNA polymerase, T4 DNA polymerase and T7 DNA polymerase enzymes.

The term "DNA polymerase" includes not only naturally-occurring enzymes but also all modified derivatives thereof, including also derivatives of naturally-occurring DNA polymerase enzymes. For instance, in some embodiments, the DNA polymerase can have been modified to remove 5'-3' exonuclease activity. Sequence-modified derivatives or mutants of DNA polymerase enzymes that can be used include, but are not limited to, mutants that retain at least some of the functional, e.g. DNA polymerase activity of the wild-type sequence. Mutations can affect the activity profile of the enzymes, e.g. enhance or reduce the rate of polymerization, under different reaction conditions, e.g. temperature, template concentration, primer concentration, etc. Mutations or sequence-modifications can also affect the exonuclease activity and/or thermostability of the enzyme.

In some embodiments, PCR amplification can include reactions such as, but not limited to, a strand-displacement amplification reaction, a rolling circle amplification reaction, a ligase chain reaction, a transcription-mediated amplification reaction, an isothermal amplification reaction, and/or a loop-mediated amplification reaction.

In some embodiments, PCR amplification uses a single primer that is complementary to the 3' tag of target DNA fragments. In some embodiments, PCR amplification uses a first and a second primer, where at least a 3' end portion of the first primer is complementary to at least a portion of the 3' tag of the target nucleic acid fragments, and where at least a 3' end portion of the second primer exhibits the sequence of at least a portion of the 5' tag of the target nucleic acid fragments. In some embodiments, a 5' end portion of the first primer is non-complementary to the 3' tag of the target nucleic acid fragments, and a 5' end portion of the second primer does not exhibit the sequence of at least a portion of the 5' tag of the target nucleic acid fragments. In some embodiments, the first primer includes a first universal sequence and/or the second primer includes a second universal sequence.

In some embodiments (e.g., when the PCR amplification amplifies captured DNA), the PCR amplification products can be ligated to additional sequences using a DNA ligase enzyme. The DNA ligase activity can be provided by one or more distinct DNA ligase enzymes. In some embodiments, the DNA ligase enzyme is from a bacterium, e.g., the DNA ligase enzyme is a bacterial DNA ligase enzyme. In some embodiments, the DNA ligase enzyme is from a virus (e.g., a bacteriophage). For instance, the DNA ligase can be T4 DNA ligase. Other enzymes appropriate for the ligation step include, but are not limited to, Tth DNA ligase, Taq DNA ligase, *Thermococcus* sp. (strain 9oN) DNA ligase (9oN™ DNA ligase, available from New England Biolabs, Ipswich, MA), and Ampligase™ (available from Epicentre Biotechnologies, Madison, WI). Derivatives, e.g. sequence-modified derivatives, and/or mutants thereof, can also be used.

In some embodiments, genetic material is amplified by reverse transcription polymerase chain reaction (RT-PCR). The desired reverse transcriptase activity can be provided by one or more distinct reverse transcriptase enzymes, suitable examples of which include, but are not limited to: M-MLV, MuLV, AMV, HIV, ArrayScript™, MultiScribe™, ThermoScript™, and SuperScript® I, II, III, and IV enzymes. "Reverse transcriptase" includes not only naturally occurring enzymes, but all such modified derivatives thereof, including also derivatives of naturally-occurring reverse transcriptase enzymes.

In addition, reverse transcription can be performed using sequence-modified derivatives or mutants of M-MLV, MuLV, AMV, and HIV reverse transcriptase enzymes, including mutants that retain at least some of the functional, e.g. reverse transcriptase, activity of the wild-type sequence. The reverse transcriptase enzyme can be provided as part of a composition that includes other components, e.g. stabilizing components that enhance or improve the activity of the reverse transcriptase enzyme, such as RNase inhibitor(s), inhibitors of DNA-dependent DNA synthesis, e.g. actinomycin D. Many sequence-modified derivative or mutants of reverse transcriptase enzymes, e.g. M-MLV, and compositions including unmodified and modified enzymes are commercially available, e.g. ArrayScript™, MultiScribe™, ThermoScript™, and SuperScript® I, II, III, and IV enzymes.

Certain reverse transcriptase enzymes (e.g. Avian Myeloblastosis Virus (AMV) Reverse Transcriptase and Moloney Murine Leukemia Virus (M-MuLV, MMLV) Reverse Transcriptase) can synthesize a complementary DNA strand using both RNA (cDNA synthesis) and single-stranded DNA (ssDNA) as a template. Thus, in some embodiments, the reverse transcription reaction can use an enzyme (reverse transcriptase) that is capable of using both RNA and ssDNA as the template for an extension reaction, e.g. an AMV or MMLV reverse transcriptase.

In some embodiments, the quantification of RNA and/or DNA is carried out by real-time PCR (also known as quantitative PCR or qPCR), using techniques well known in the art, such as but not limited to "TAQMAN™" or "SYBR®", or on capillaries ("LightCycler® Capillaries"). In some embodiments, the quantification of genetic material is determined by optical absorbance and with real-time PCR. In some embodiments, the quantification of genetic material is determined by digital PCR. In some embodiments, the genes analyzed can be compared to a reference nucleic acid extract (DNA and RNA) corresponding to the expression (mRNA) and quantity (DNA) in order to compare expression levels of the target nucleic acids.

(xiv) Antibody

An "antibody" is a polypeptide molecule that recognizes and binds to a complementary target antigen. Antibodies typically have a molecular structure shape that resembles a Y shape. Naturally-occurring antibodies, referred to as immunoglobulins, belong to one of the immunoglobulin classes IgG, IgM, IgA, IgD, and IgE. Antibodies can also be produced synthetically. For example, recombinant antibodies, which are monoclonal antibodies, can be synthesized using synthetic genes by recovering the antibody genes from source cells, amplifying into an appropriate vector, and introducing the vector into a host to cause the host to express the recombinant antibody. In general, recombinant antibodies can be cloned from any species of antibody-producing animal using suitable oligonucleotide primers and/or hybridization probes. Recombinant techniques can be used to generate antibodies and antibody fragments, including non-endogenous species.

Synthetic antibodies can be derived from non-immunoglobulin sources. For example, antibodies can be generated from nucleic acids (e.g., aptamers), and from non-immunoglobulin protein scaffolds (such as peptide aptamers) into which hypervariable loops are inserted to form antigen binding sites. Synthetic antibodies based on nucleic acids or peptide structures can be smaller than immunoglobulin-derived antibodies, leading to greater tissue penetration.

Antibodies can also include affimer proteins, which are affinity reagents that typically have a molecular weight of about 12-14 kDa. Affimer proteins generally bind to a target (e.g., a target protein) with both high affinity and specificity. Examples of such targets include, but are not limited to, ubiquitin chains, immunoglobulins, and C-reactive protein. In some embodiments, affimer proteins are derived from cysteine protease inhibitors, and include peptide loops and a variable N-terminal sequence that provides the binding site.

Antibodies can also refer to an "epitope binding fragment" or "antibody fragment," which as used herein, generally refers to a portion of a complete antibody capable of binding the same epitope as the complete antibody, albeit not necessarily to the same extent. Although multiple types of epitope binding fragments are possible, an epitope binding fragment typically comprises at least one pair of heavy and light chain variable regions (VH and VL, respectively) held together (e.g., by disulfide bonds) to preserve the antigen binding site, and does not contain all or a portion of the Fc region. Epitope binding fragments of an antibody can be obtained from a given antibody by any suitable technique (e.g., recombinant DNA technology or enzymatic or chemical cleavage of a complete antibody), and typically can be screened for specificity in the same manner in which complete antibodies are screened. In some embodiments, an epitope binding fragment comprises an F(ab')$_2$ fragment, Fab' fragment, Fab fragment, Fd fragment, or Fv fragment. In some embodiments, the term "antibody" includes antibody-derived polypeptides, such as single chain variable fragments (scFv), diabodies or other multimeric scFvs, heavy chain antibodies, single domain antibodies, or other polypeptides comprising a sufficient portion of an antibody (e.g., one or more complementarity determining regions (CDRs)) to confer specific antigen binding ability to the polypeptide.

(xv) Affinity Group

An "affinity group" is a molecule or molecular moiety which has a high affinity or preference for associating or binding with another specific or particular molecule or moiety. The association or binding with another specific or particular molecule or moiety can be via a non-covalent interaction, such as hydrogen bonding, ionic forces, and van der Waals interactions. An affinity group can, for example, be biotin, which has a high affinity or preference to associate or bind to the protein avidin or streptavidin. An affinity group, for example, can also refer to avidin or streptavidin which has an affinity to biotin. Other examples of an affinity group and specific or particular molecule or moiety to which it binds or associates with include, but are not limited to, antibodies or antibody fragments and their respective antigens, such as digoxigenin and anti-digoxigenin antibodies, lectin, and carbohydrates (e.g., a sugar, a monosaccharide, a disaccharide, or a polysaccharide), and receptors and receptor ligands.

Any pair of affinity group and its specific or particular molecule or moiety to which it binds or associates with can have their roles reversed, for example, such that between a first molecule and a second molecule, in a first instance the first molecule is characterized as an affinity group for the second molecule, and in a second instance the second molecule is characterized as an affinity group for the first molecule.

(xvi) Label, Detectable Label, and Optical Label

The terms "detectable label," "optical label," and "label" are used interchangeably herein to refer to a directly or indirectly detectable moiety that is associated with (e.g., conjugated to) a molecule to be detected, e.g., a probe for in situ assay, or analyte. The detectable label can be directly detectable by itself (e.g., radioisotope labels or fluorescent labels) or, in the case of an enzymatic label, can be indirectly detectable, e.g., by catalyzing chemical alterations of a substrate compound or composition, which substrate compound or composition is directly detectable. Detectable labels can be suitable for small scale detection and/or suitable for high-throughput screening. As such, suitable detectable labels include, but are not limited to, radioisotopes, fluorophores, chemiluminescent compounds, bioluminescent compounds, and dyes.

The detectable label can be qualitatively detected (e.g., optically or spectrally), or it can be quantified. Qualitative detection generally includes a detection method in which the existence or presence of the detectable label is confirmed, whereas quantifiable detection generally includes a detection method having a quantifiable (e.g., numerically reportable) value such as an intensity, duration, polarization, and/or other properties. In some embodiments, the detectable label is bound to a feature. For example, detectably labeled features can include a fluorescent, a colorimetric, or a chemiluminescent label attached to an analyte, probe, or bead (see, for example, Rajeswari et al., *J. Microbiol Methods* 139:22-28, 2017, and Forcucci et al., *J. Biomed Opt.* 10:105010, 2015, the entire contents of each of which are incorporated herein by reference).

In some embodiments, a plurality of detectable labels can be attached to a feature, probe, or composition to be detected. For example, detectable labels can be incorporated during nucleic acid polymerization or amplification (e.g., Cy5®-labelled nucleotides, such as Cy5®-dCTP). Any suitable detectable label can be used. In some embodiments, the detectable label is a fluorophore. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DiA (4-Di-16-ASP), DiD (DilC18 (5)), DIDS, Dil (DilC18(3)), DiO (DiOC18(3)), DiR (DilC18(7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1,6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARF®-1 (high pH), SNARF®-1 (low pH), Sodium Green™, SpectrumAqua®, SpectrumGreen® #1, SpectrumGreen® #2, SpectrumOrange®, SpectrumRed®, SYTO® 11, SYTO® 13, SYTO® 17, SYTO® 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66W, YFP (Yellow Fluorescent Protein), YOYO®-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), and Dy 750 (NHS Ester).

Fluorescence detection in tissue samples can often be hindered by the presence of strong background fluorescence. "Autofluorescence" is the general term used to distinguish background fluorescence (that can arise from a variety of sources, including aldehyde fixation, extracellular matrix components, red blood cells, lipofuscin, and the like) from the desired immunofluorescence from the fluorescently labeled antibodies or probes. Tissue autofluorescence can lead to difficulties in distinguishing the signals due to fluorescent antibodies or probes from the general background. In some embodiments, a method disclosed herein utilizes one or more agents to reduce tissue autofluorescence, for example, Autofluorescence Eliminator (Sigma/EMD Millipore), TrueBlack Lipofuscin Autofluorescence Quencher (Biotium), MaxBlock Autofluorescence Reducing Reagent Kit (MaxVision Biosciences), and/or a very intense black dye (e.g., Sudan Black, or comparable dark chromophore).

As mentioned above, in some embodiments, a detectable label is or includes a luminescent or chemiluminescent moiety. Common luminescent/chemiluminescent moieties include, but are not limited to, peroxidases such as horseradish peroxidase (HRP), soybean peroxidase (SP), alkaline phosphatase, and luciferase. These protein moieties can catalyze chemiluminescent reactions given the appropriate substrates (e.g., an oxidizing reagent plus a chemiluminescent compound. A number of compound families are known to provide chemiluminescence under a variety of conditions. Non-limiting examples of chemiluminescent compound families include 2,3-dihydro-1,4-phthalazinedione luminol, 5-amino-6,7,8-trimethoxy- and the dimethylamino[ca]benz analog. These compounds can luminesce in the presence of alkaline hydrogen peroxide or calcium hypochlorite and base. Other examples of chemiluminescent compound families include, e.g., 2,4,5-triphenylimidazoles, para-dimethylamino and -methoxy substituents, oxalates such as oxalyl active esters, p-nitrophenyl, N-alkyl acridinum esters, luciferins, lucigenins, or acridinium esters. In some embodiments, a detectable label is or includes a metal-based or mass-based label. For example, small cluster metal ions, metals, or semiconductors may act as a mass code. In some examples, the metals can be selected from Groups 3-15 of the periodic table, e.g., Y, La, Ag, Au, Pt, Ni, Pd, Rh, Ir, Co, Cu, Bi, or a combination thereof.

EXAMPLE

The following example is included for illustrative purposes only and is not intended to limit the scope of the present disclosure.

Example 1: Multi-Modal and Iterative Analysis of a Plurality of Functional Analyte Panels This example illustrates a method of multi-modal in situ transcriptomics, the method comprising (a) contacting a sample with a plurality of barcoded probe sets, each for analyzing an analyte (e.g., biomarker) panel; (b), contacting the sample with a first plurality of detectably labeled oligonucleotides for analyzing one or more sets in the barcoded probe sets; (c) detecting the first plurality of detectably labeled oligonucleotides using a microscope at a first magnification, (d) analyzing the one or more analyte (e.g., biomarker) panels corresponding to the one or more sets; and (e) based on the analyzing step: i) selecting a second plurality of detectably labeled oligonucleotides for analyzing another one or more sets of the plurality of barcoded probe sets, and contacting the sample with the second plurality of detectably labeled oligonucleotides; ii) selecting a second magnification of the microscope, and imaging the sample or a portion thereof at the second magnification; and/or iii) selecting a region of interest of the sample and imaging the region of interest.

In one example, the user first contacts the sample with 10 different barcoded probe sets ($P_1$, $P_2$, $P_3$, $P_4$, $P_5$, $P_6$, $P_7$, $P_8$, $P_9$, and $P_{10}$) corresponding to 10 analyte (e.g., biomarker) panels ($B_1$, $B_2$, $B_3$, $B_4$, $B_5$, $B_6$, $B_7$, $B_8$, $B_9$, and $B_{10}$). For example, the 10 barcoded probe sets can comprise 10,000 probes targeting 3,000 genes. In one example, the 10 analyte (e.g., biomarker) panels could be: Pan cell phenotyping ($B_1$), Immune subset 1 ($B_2$), Immune subset 2 ($B_3$), immune subset 3 ($B_4$), Cancer subset 1 ($B_5$), cancer panel 2 ($B_6$), cancer panel 3 ($B_7$), pathway 1 ($B_8$), pathway 2 ($B_9$) pathway 3 ($B_{10}$). In an example, analyte (e.g., biomarker) panels can be selected based on gene ontology (GO) terms.

The user can then contact the sample with a first plurality of detectably labeled oligonucleotides for analyzing one or more sets of the barcoded probe sets. For example, the first plurality of detectably labeled oligonucleotides can be for detection of the pan-cell phenotyping panel ($B_1$, labeled by barcoded probe set $P_1$). The user can then render the detected biomarker panel using a first imaging modality, such as using a 4× or lower magnification objective over a large area of the sample (e.g., 50 mm×50 mm). A first analysis module can be run and the cells can be displayed to the user.

The user can select then the area of interest based on the observed population (for example, having identified the tumor cells using the analysis of the pan-cell phenotyping marker panel). The user can then adjust the imaging modalities (for example, switch to a 40× objective to image the area of interest) and select a second plurality of detectably labeled oligonucleotides to render in the area of interest. The user can contact the sample with the second plurality of detectably labeled oligonucleotides (for example, Immune subset 2 ($B_3$, labeled by barcoded probe set $P_2$), cancer subset 1 ($B_5$, labeled by barcoded probe set $P_5$), and pathway 3 ($B_{10}$, labeled by barcoded probe set $P_{10}$)) and render the selected biomarker panel(s) using the selected imaging modality (40× magnification). A second analysis module can be run to render, for example, 200 genes on the area and cells of interest. In some examples, the second analysis module can be the final analysis module. In some examples, the process can be repeated through any number of additional iterations (e.g., a third iteration, with imaging modalities and/or detectably labeled probe sets selected based on the results of the first and/or second analysis module; a fourth iteration, with imaging modalities and/or detectably labeled probe sets selected based on the results of the first, second, and/or the third analysis module; etc.). In some examples, each iteration may comprise using a particular combination of the plurality of detectably labeled oligonucleotides, the magnification, and/or the region for signal detection and/or analysis, where in each iteration the plurality of detectably labeled oligonucleotides, the magnification, and/or the region can be the same as or different from that of one or more other iterations. In some examples, the imaging modalities and/or detectably labeled probe sets in a particular module or iteration can be selected based on the results of only one upstream analysis module or iteration (e.g., the one immediately upstream of the particular module or iteration), or on the results of two or more upstream analysis modules or iterations. In some examples, the combination of the plurality of detectably labeled oligonucleotides, the magnification, and/or the region in a particular module or iteration can be selected based on the results of one or more upstream modules or iterations.

The example described above is both multi-modal (change of objectives and panels) and iterative (choice of deep panel depends on the previous less deep panel).

The present disclosure is not intended to be limited in scope to the particular disclosed embodiments, which are provided, for example, to illustrate various aspects of the disclosure. Various modifications to the compositions and methods described will become apparent from the description and teachings herein. Such variations may be practiced without departing from the true scope and spirit of the disclosure and are intended to fall within the scope of the present disclosure.

The invention claimed is:

1. A method for analyzing a sample, comprising:
   (a) contacting the sample with a plurality of barcoded probe sets, wherein a probe of the plurality of barcoded probe sets is capable of binding directly or indirectly to a target sequence in or associated with an analyte, and amplifying the plurality of barcoded probe sets to form a plurality of amplification products;
   (b) analyzing a first subset of the plurality of barcoded probe sets by detecting a first subset of amplification products of the plurality of amplification products, wherein the detecting comprises performing sequential cycles comprising:
      (i) binding detectably labeled probes directly or indirectly to the first subset of amplification products, and
      (ii) detecting optical signals from the detectably labeled probes bound directly or indirectly to the first subset of amplification products to generate a spatiotemporal signal signature or code associated with a first plurality of analytes;
   (c) selecting a second subset of the plurality of barcoded probe sets associated with a second plurality of analytes based on the spatiotemporal signal signature or code associated with the first plurality of analytes, wherein the first plurality of analytes and the second plurality of analytes are different; and
   (d) analyzing the second subset of the plurality of barcoded probe sets by detecting a second subset of amplification products of the plurality of amplification products, wherein the detecting comprises performing sequential cycles comprising:
      (i) binding detectably labeled probes directly or indirectly to the second subset of amplification products, and
      (ii) detecting optical signals from the detectably labeled probes bound directly or indirectly to the second subset of amplification products to generate a spatiotemporal signal signature or code associated with the second plurality of analytes.

2. The method of claim 1, wherein the second subset of the plurality of barcoded probe sets analyzed in (d) comprises: (i) one or more barcoded probes that are not in the first subset of the plurality of barcoded probe sets analyzed in (b) and (ii) one or more barcoded probes that are in the first subset of the plurality of barcoded probe sets analyzed in (b).

3. The method of claim 1, wherein the analyzing in (d) comprises imaging the sample using a second magnification (M2) that is the same as a first magnification (M1) used for the analyzing in (b).

4. The method of claim 1, wherein the analyzing in (d) comprises imaging the sample using a second magnification (M2) that is higher than a first magnification (M1) used for the analyzing in (b).

5. The method of claim 1, wherein the analyzing in (d) comprises imaging a second region (R2) of the sample that is different from a first region (R1) of the sample imaged for the analyzing in (b).

6. The method of claim 1, wherein the analyzing in (d) comprises imaging a second region (R2) of the sample that is a subregion of a first region (R1) of the sample imaged for the analyzing in (b).

7. The method of claim 1, wherein the second subset of the plurality of barcoded probe sets analyzed in (d) comprises at least a subset of the first subset of the plurality of barcoded probe sets analyzed in (b).

8. The method of claim 1, wherein the sample is a tissue sample.

9. The method of claim 8, wherein the analyzing in (b) and (d) is performed on an intact sample.

10. The method of claim 1, wherein the second subset of the plurality of barcoded probe sets are non-overlapping with the first subset of the plurality of barcoded probe sets analyzed in (b).

11. The method of claim 1, wherein the second plurality of analytes comprises at least a subset of the first plurality of analytes.

12. The method of claim 1, wherein the first plurality of analytes and the second plurality of analytes are non-overlapping.

13. The method of claim 1, wherein the analyzing in (d) comprises imaging a second region (R2) of the sample that is overlapping with a first region (R1) of the sample imaged for the analyzing in (b).

14. The method of claim 1, wherein one or more cell types is identified in (b).

15. The method of claim 1, wherein the amplifying the plurality of barcoded probe sets to form the plurality of amplification products comprises performing rolling circle amplification of the plurality of barcoded probe sets.

16. A method for analyzing a sample comprising:
(a) contacting the sample with a plurality of barcoded probe sets, wherein a probe of a first subset of the plurality of barcoded probe sets is capable of binding directly or indirectly to a target sequence in or associated with an analyte;
(b) analyzing a first subset of the plurality of barcoded probe sets by detecting the first subset of the plurality of barcoded probe sets, wherein the detecting comprises performing sequential cycles comprising:
(i) binding detectably labeled probes directly or indirectly to the first subset of the plurality of barcoded probe sets, and
(ii) detecting optical signals from the detectably labeled probes bound directly or indirectly to probes of the first subset of the plurality of barcoded probe sets to generate a spatiotemporal signal signature or code associated with a first plurality of analytes;
(c) selecting a second subset of the plurality of barcoded probe sets associated with a second plurality of analytes based on the spatiotemporal signal signature or code associated with the first plurality of analytes, wherein the first plurality of analytes and the second plurality of analytes are different; and
(d) analyzing the second subset of the plurality of barcoded probe sets by detecting the second subset of the plurality of barcoded probe sets, wherein the detecting comprises performing sequential cycles comprising:
(i) binding detectably labeled probes directly or indirectly to the second subset of the plurality of barcoded probe sets, and
(ii) detecting optical signals from the detectably labeled probes bound directly or indirectly to probes of the second subset of the plurality of barcoded probe sets to generate a spatiotemporal signal signature or code associated with the second plurality of analytes.

17. The method of claim 16, wherein the second subset of the plurality of barcoded probe sets analyzed in (d) comprises: (i) one or more barcoded probes that are not in the first subset of the plurality of barcoded probe sets analyzed in (b); and (ii) one or more barcoded probes that are in the first subset of the plurality of barcoded probe sets analyzed in (b).

18. The method of claim 16, wherein the first plurality of analytes and the second plurality of analytes are non-overlapping.

19. The method of claim 16, wherein the second subset of the plurality of barcoded probe sets are non-overlapping with the first subset of the plurality of barcoded probe sets analyzed in (b).

20. The method of claim 16, wherein one or more cell types is identified in (b).

21. The method of claim 16, wherein the sample is a tissue sample.

* * * * *